United States Patent [19]

Tsuyuki et al.

[11] Patent Number: 5,424,877
[45] Date of Patent: Jun. 13, 1995

[54] OBSERVATION OPTICAL SYSTEM FOR ENDOSCOPES

[75] Inventors: Hiroshi Tsuyuki; Akira Kikuchi, both of Tokyo, Japan

[73] Assignee: Olympus Optical Co., Ltd., Tokyo, Japan

[21] Appl. No.: 44,603

[22] Filed: Apr. 9, 1993

[30] Foreign Application Priority Data

Apr. 10, 1992 [JP] Japan .................................. 4-116673
Apr. 15, 1992 [JP] Japan .................................. 4-119909

[51] Int. Cl.6 ........................ G02B 13/22; G02B 13/04
[52] U.S. Cl. ..................................... 359/663; 359/753
[58] Field of Search ............... 359/708, 692, 715, 663, 359/682, 753

[56] References Cited

U.S. PATENT DOCUMENTS

| Re. 33,689 | 9/1991 | Nishioka | 359/708 |
| 5,005,957 | 4/1991 | Kanamori et al. | 359/715 |
| 5,087,989 | 2/1992 | Igarashi | 359/692 |

FOREIGN PATENT DOCUMENTS 59-226315 12/1984 Japan .
2277015 11/1990 Japan .
3-39915 2/1991 Japan .
3200911 9/1991 Japan .

*Primary Examiner*—Scott J. Sugarman
*Attorney, Agent, or Firm*—Cushman, Darby & Cushman

[57] ABSTRACT

An observation optical system for endoscopes configured so as to allow observation of objects located in liquids, comprising an objective lens system and relay lenses for relaying an image formed by the objective lens system, and satisfies the following conditions (1) and (2):

$$0.08 \leq N_w f \tan[\sin^{-1}\{(1/N_w) \sin \theta_{A1}\}]/I_1 \leq 1.18 \qquad (1)$$

$$0.9 \leq N_w f \tan[\sin^{-1}\{(1/N_w) \sin \theta_{A0.5}\}]/I_{0.5} \leq 1.1 \qquad (2)$$

wherein the reference symbol f represents a focal length of the objective lens system, the reference symbol $N_w$ designates a refractive index of a liquid, the reference symbols $\theta_{A1}$ and $\theta_{A0.5}$ denote field angles at the maximum image height and a half of the maximum image height in water respectively, and the reference symbols $I_1$ and $I_{0.5}$ represent a maximum image height and a half of the maximum image height.

14 Claims, 41 Drawing Sheets

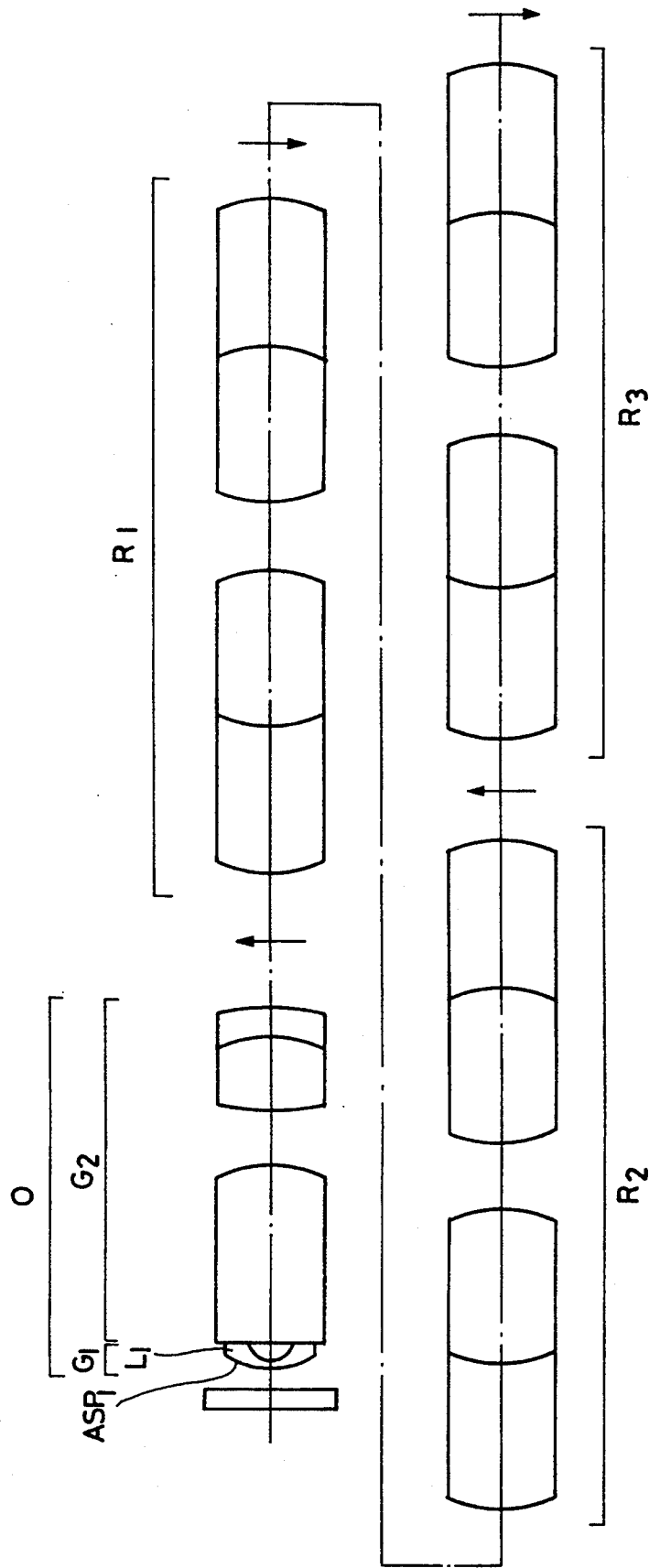

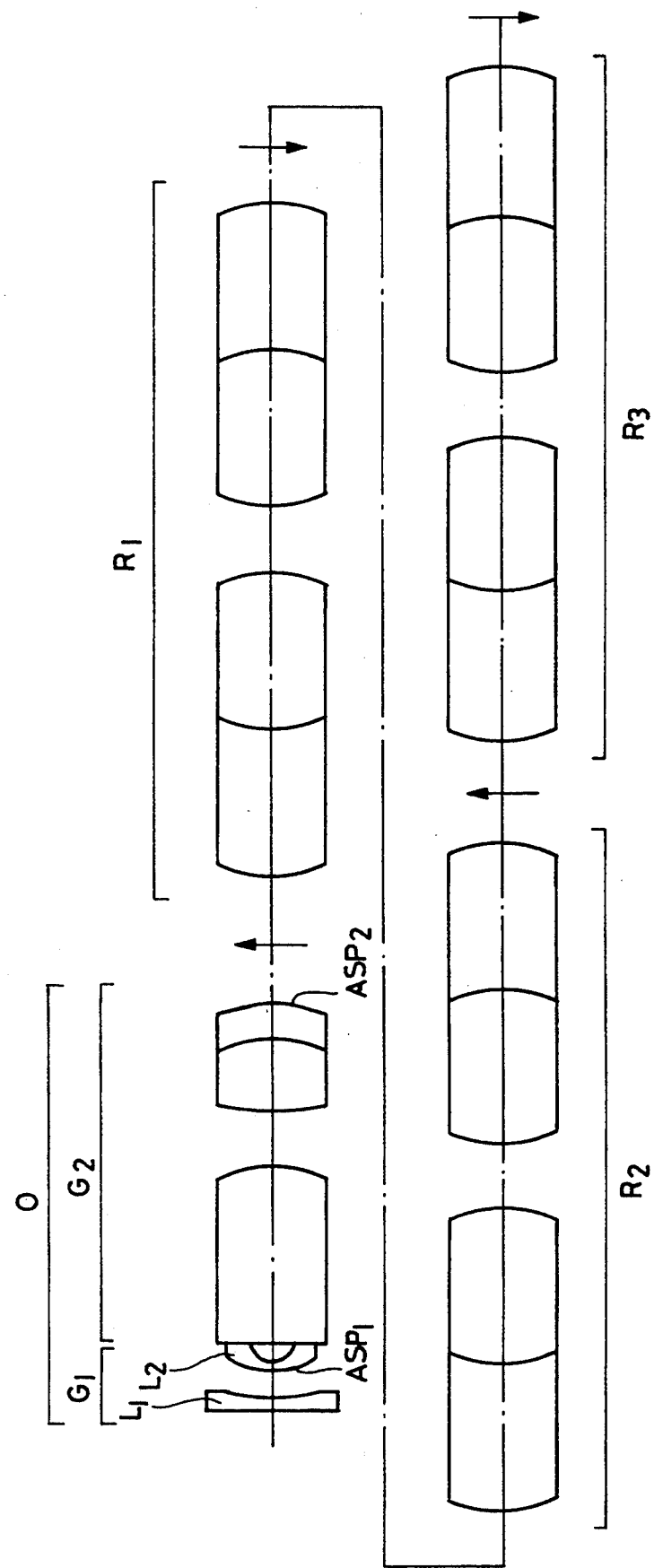

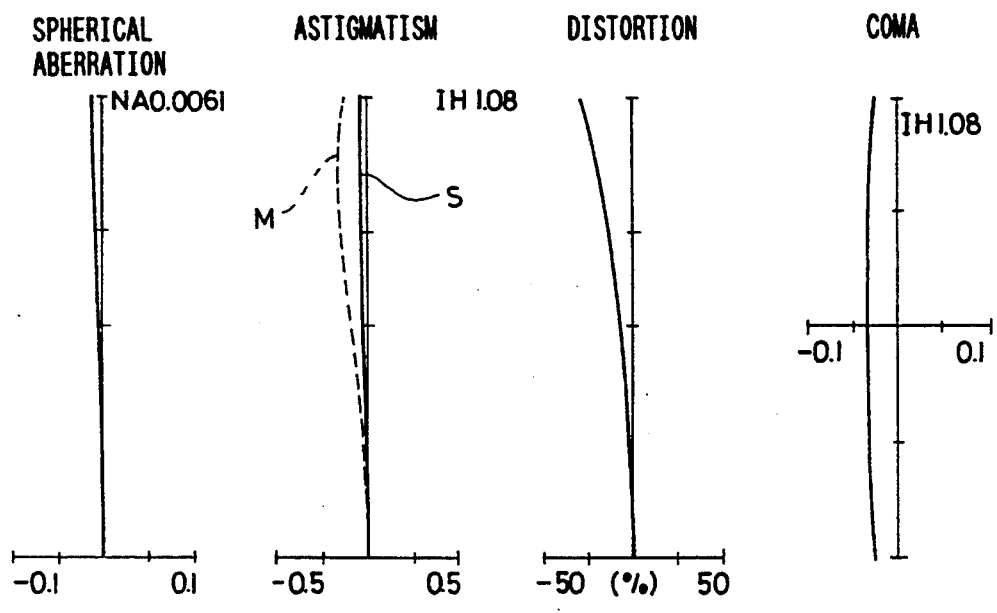
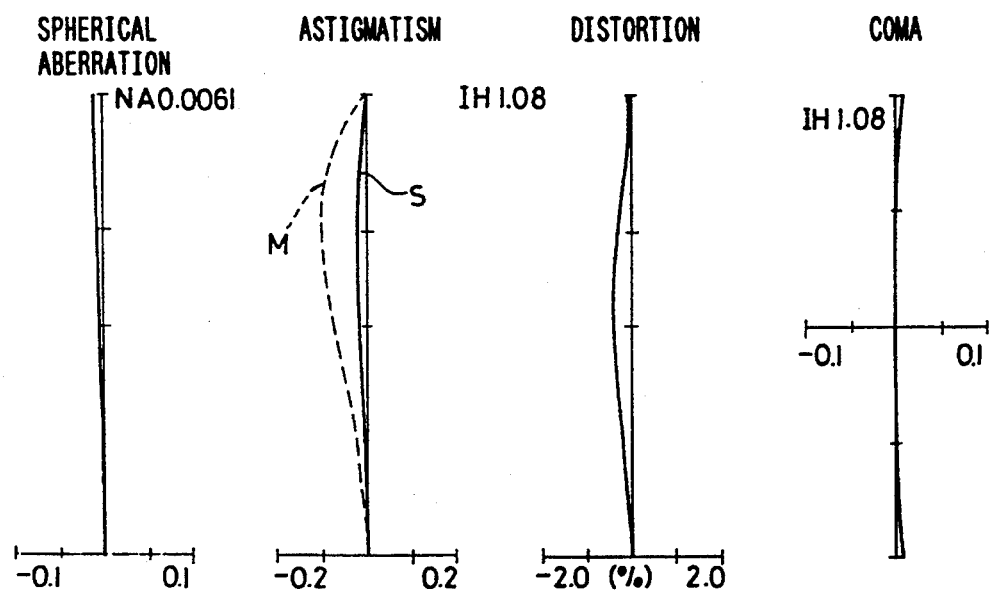

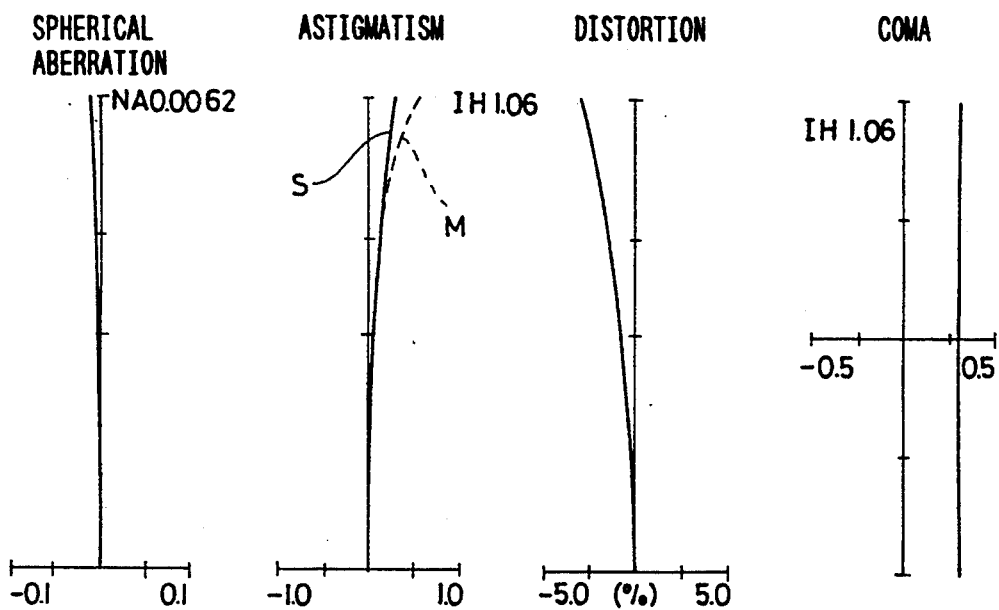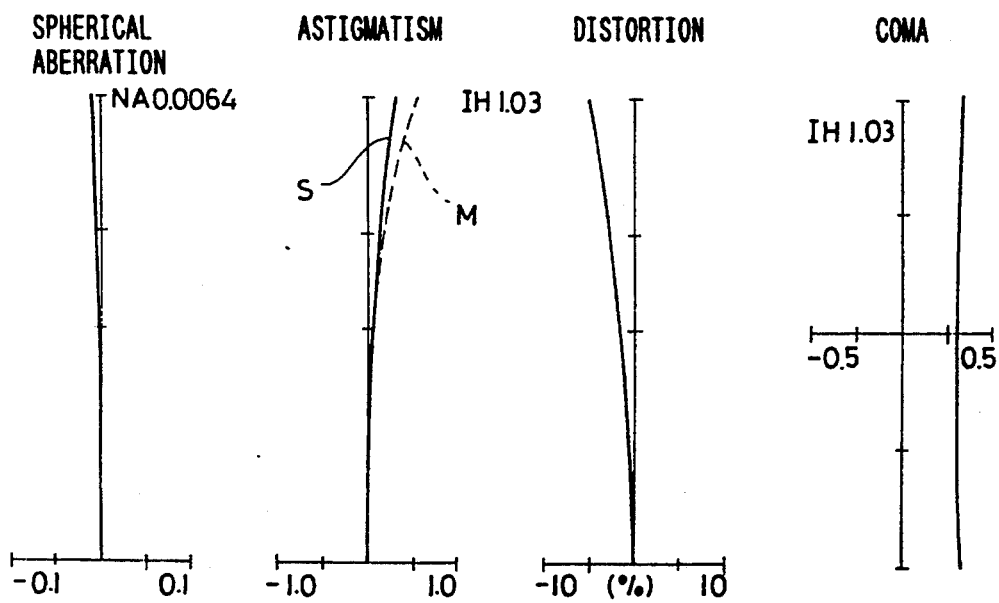

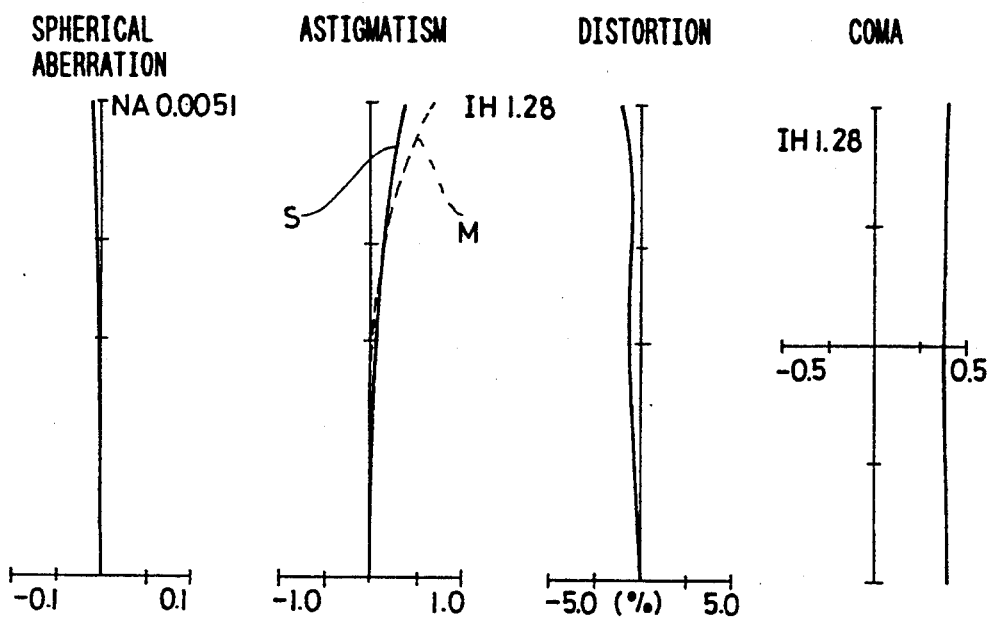
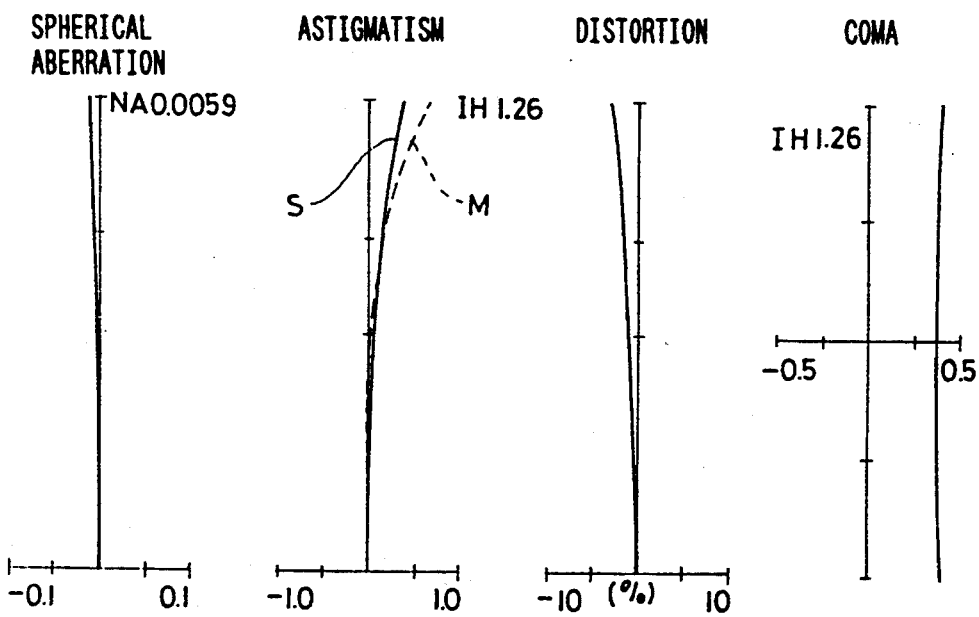

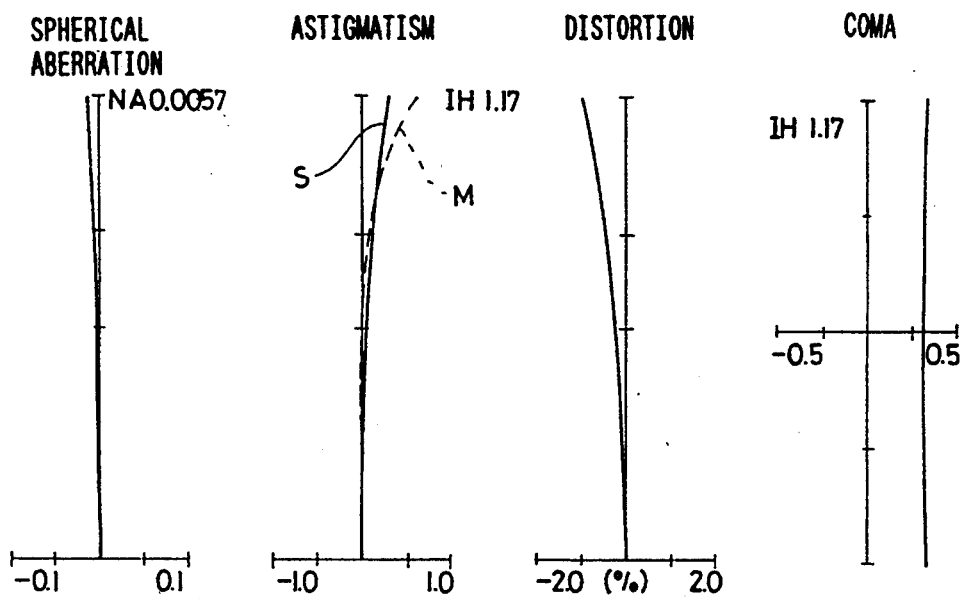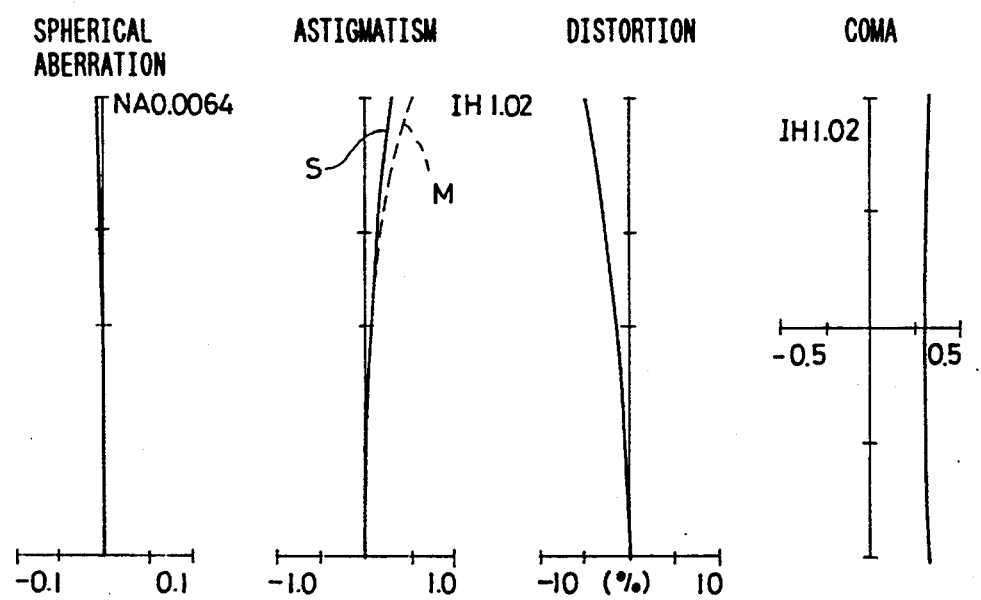

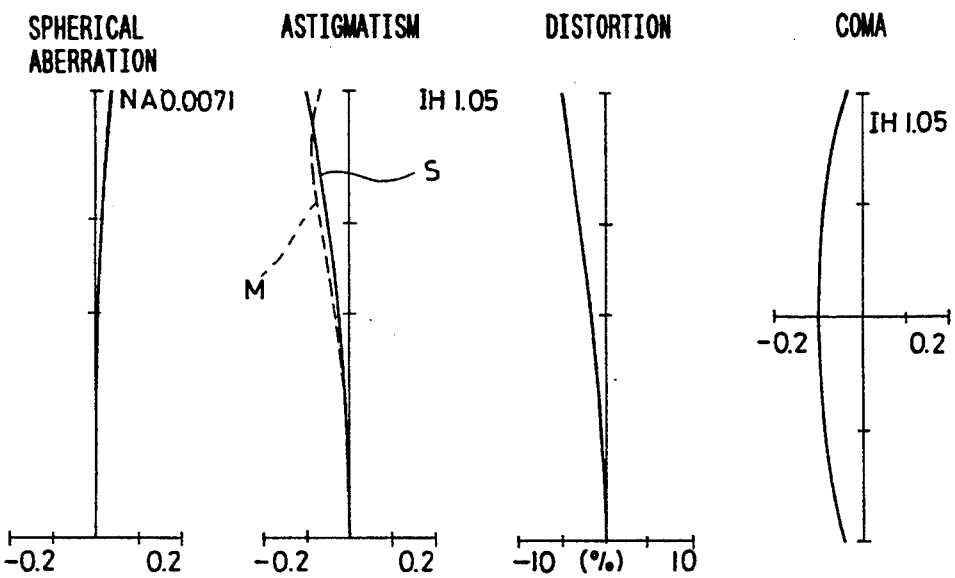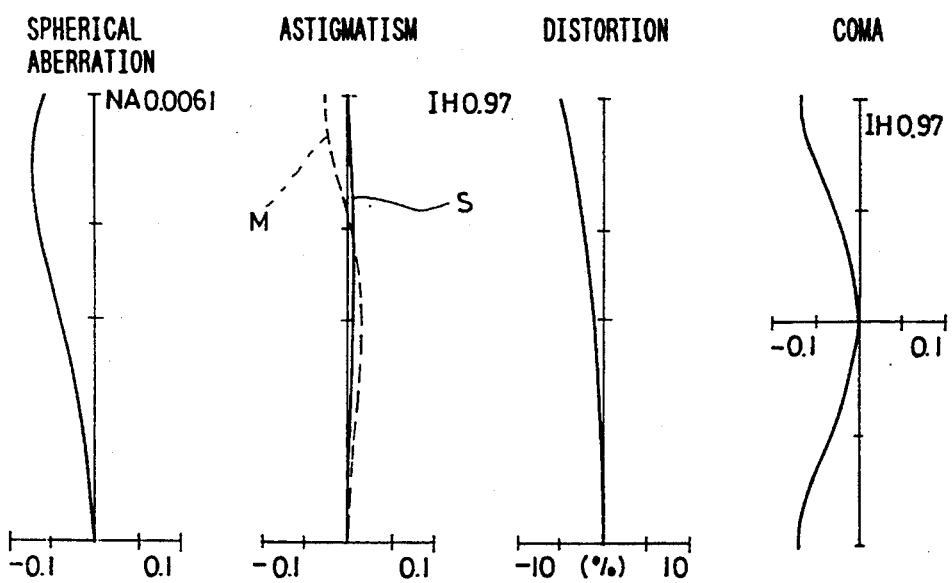

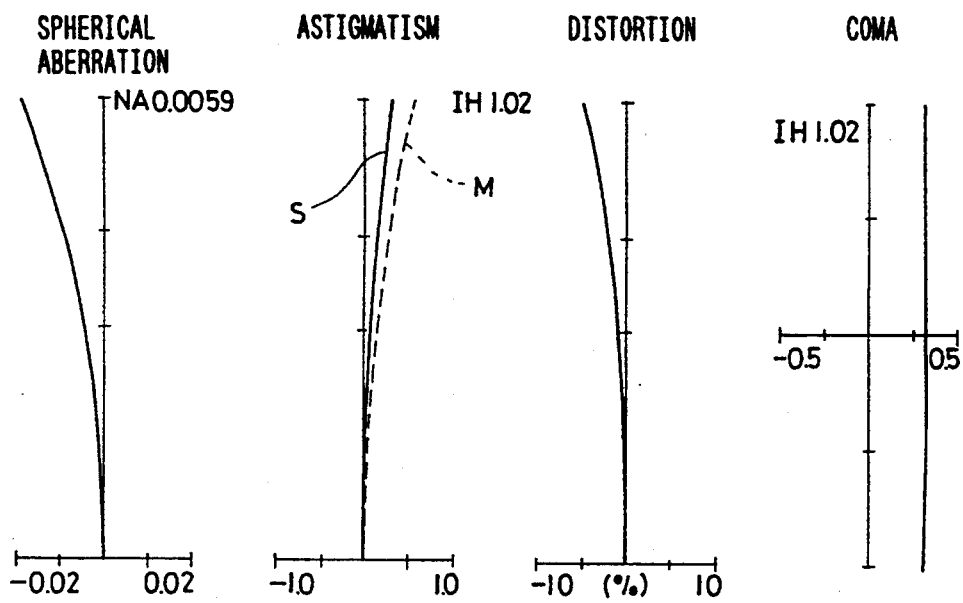
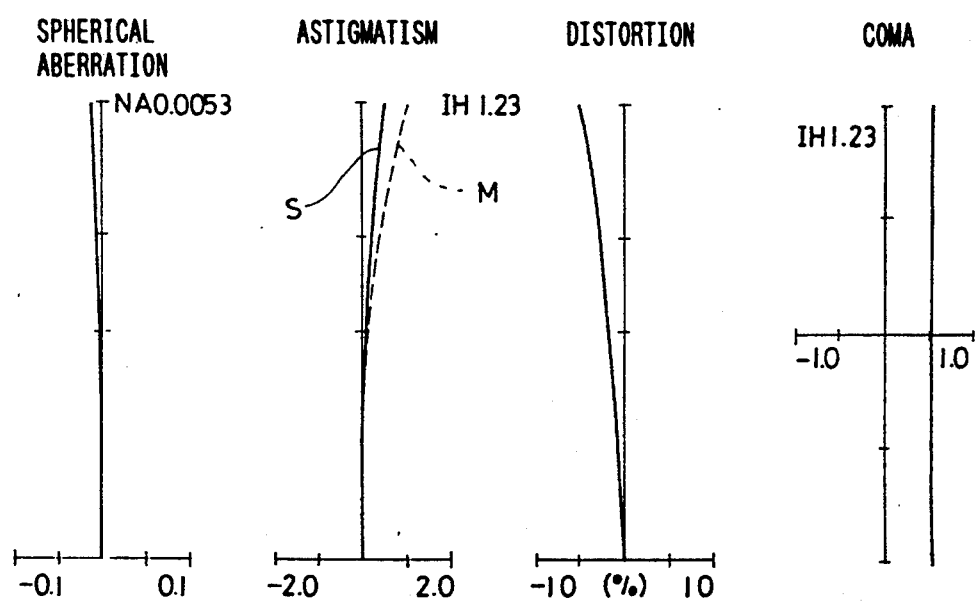

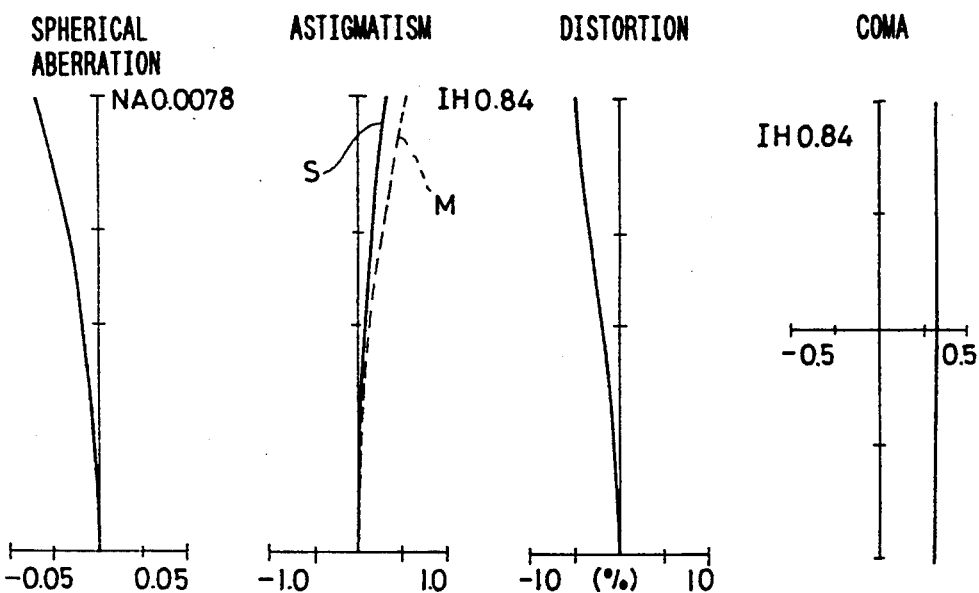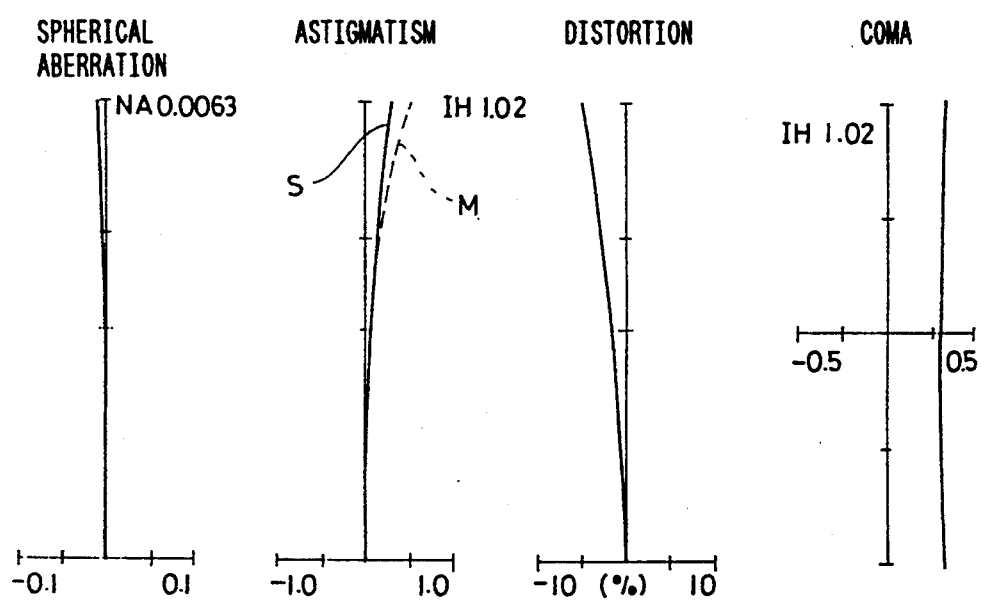

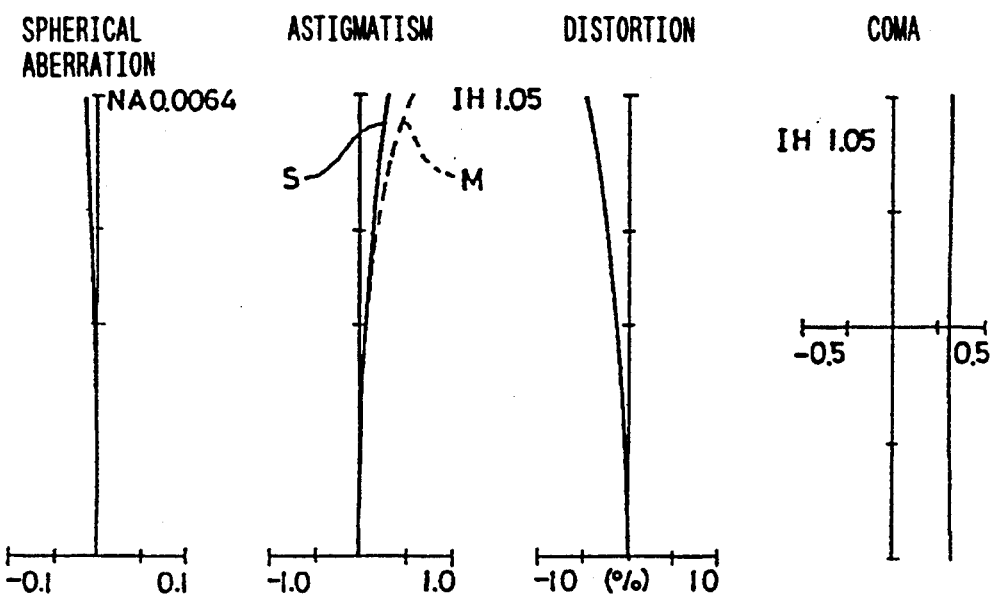
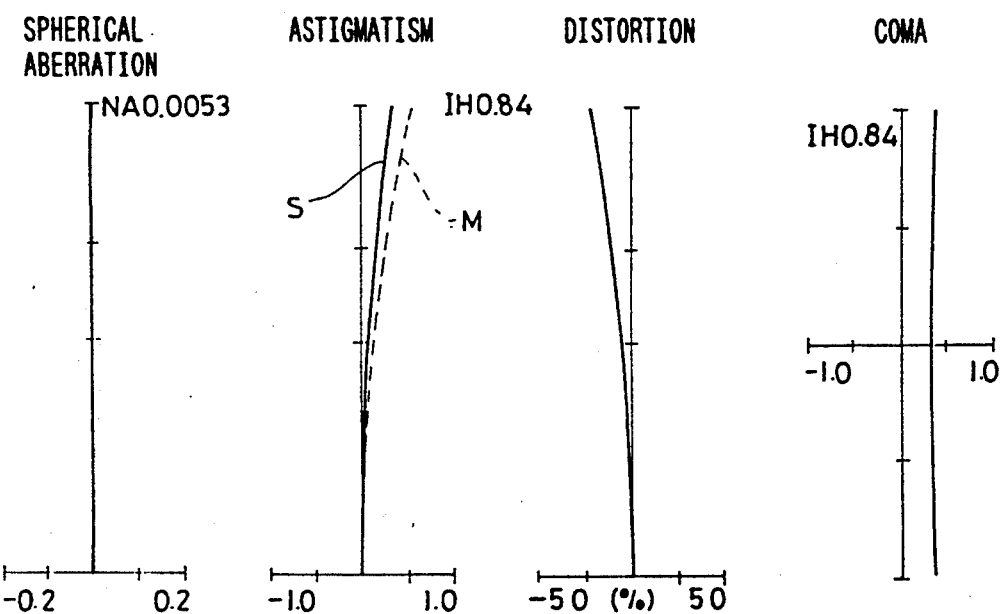

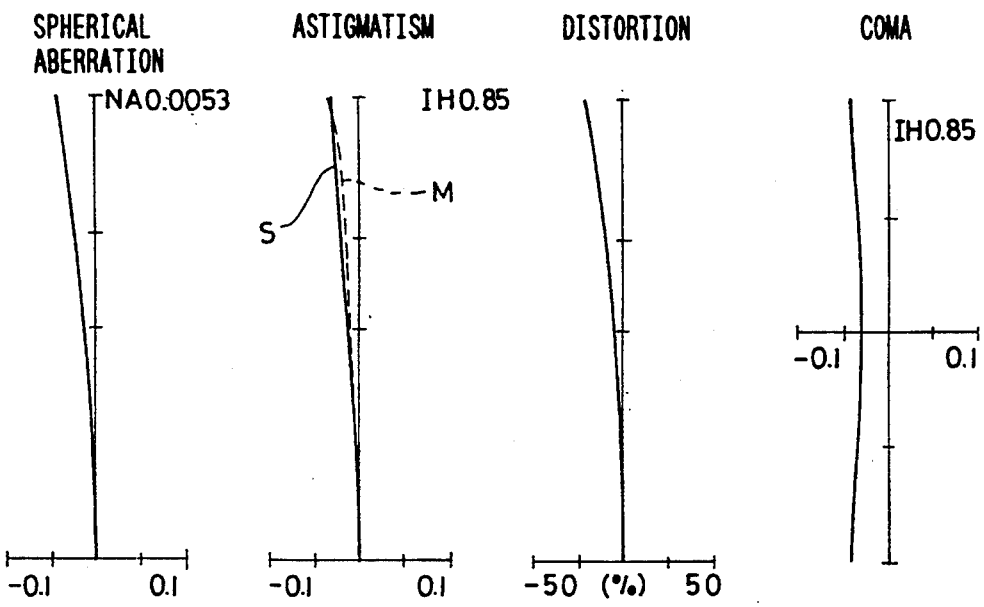
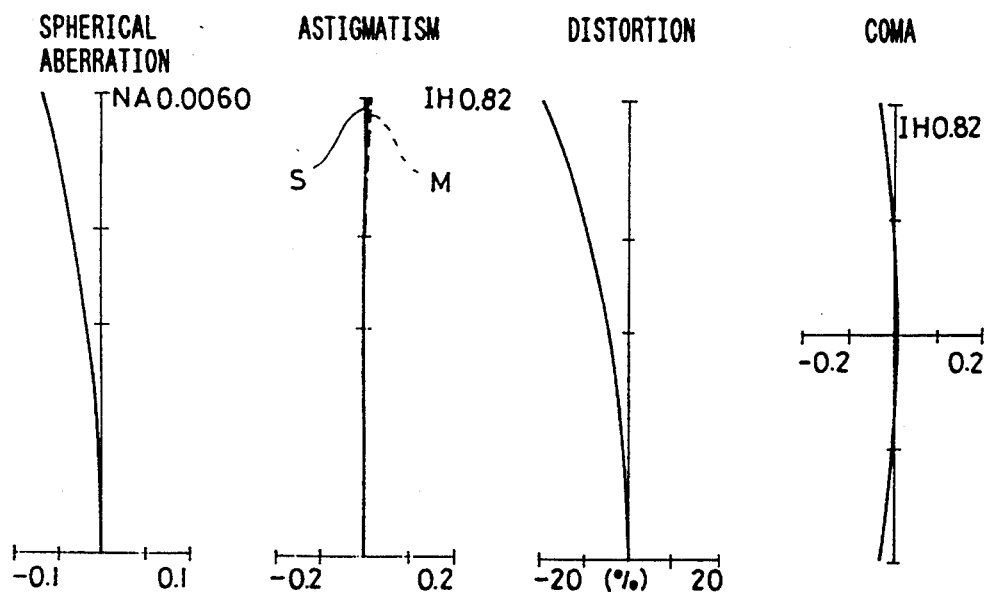

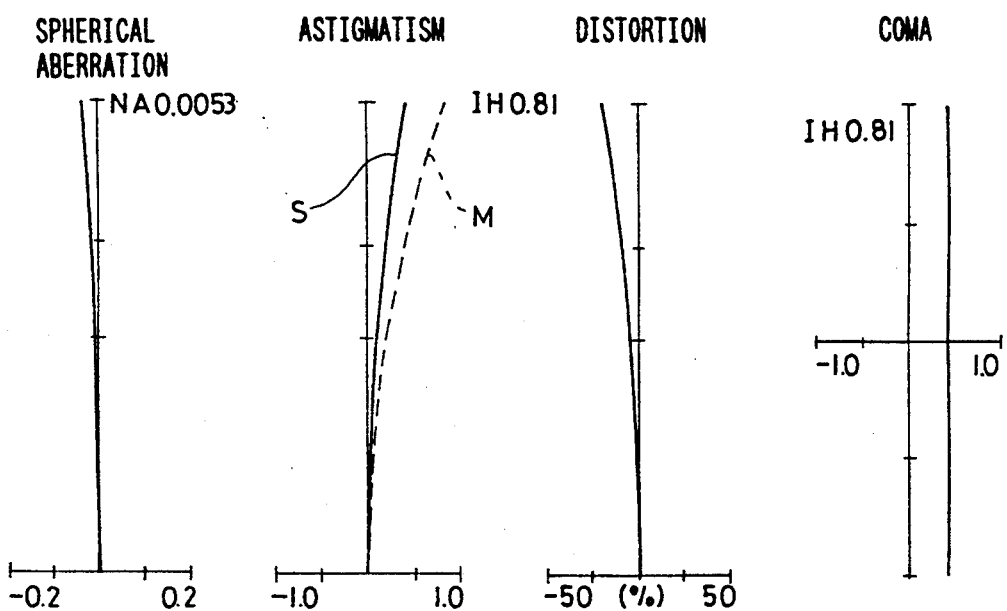
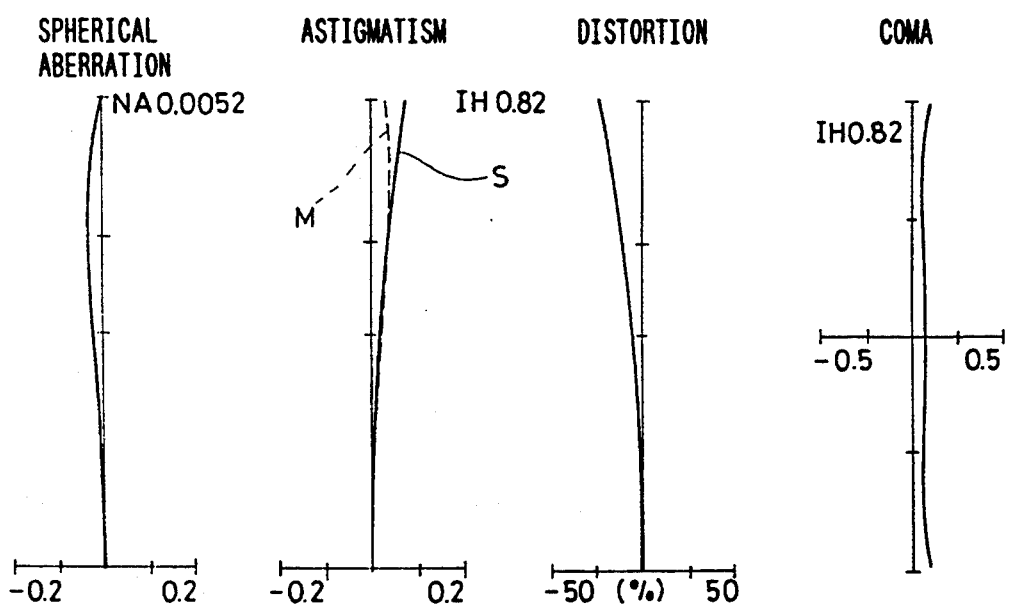

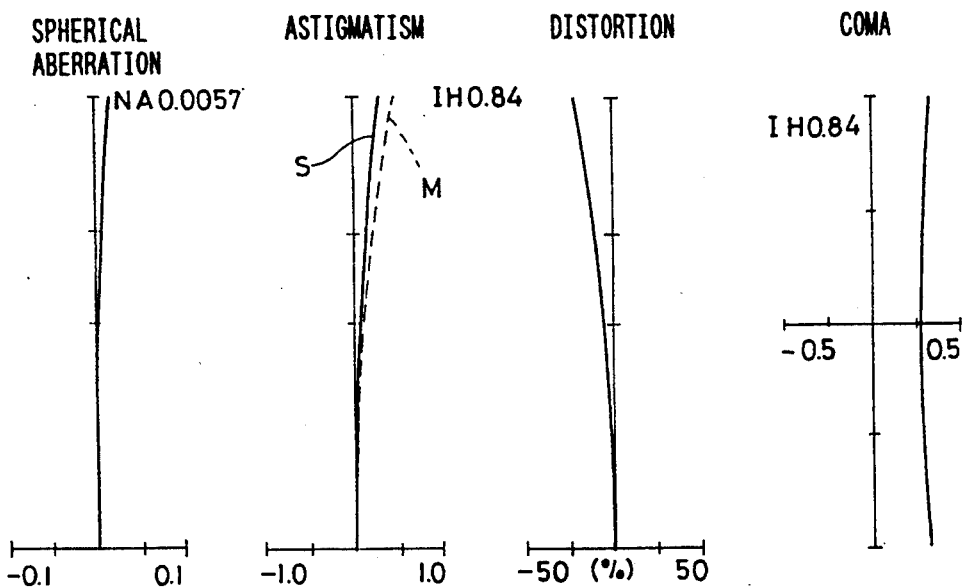
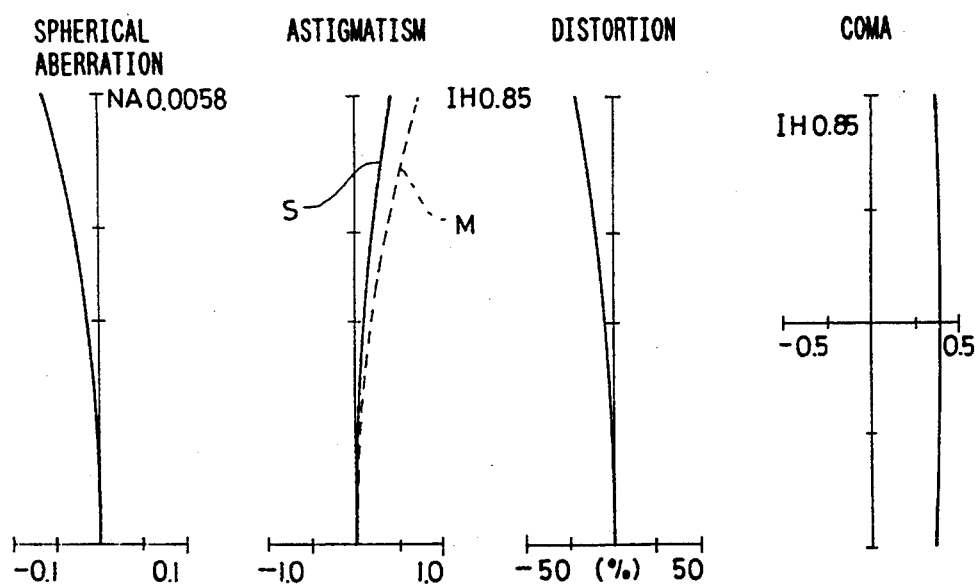

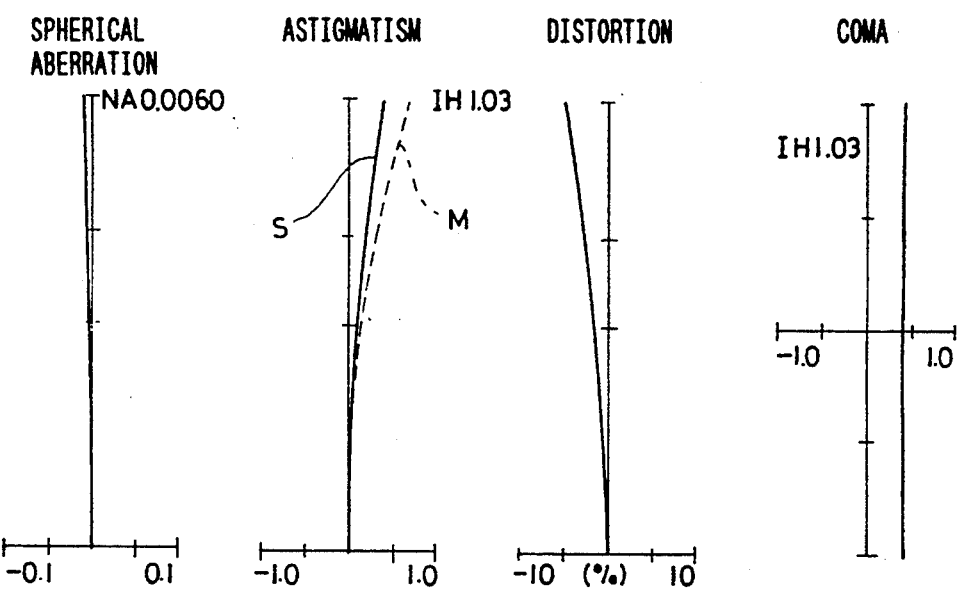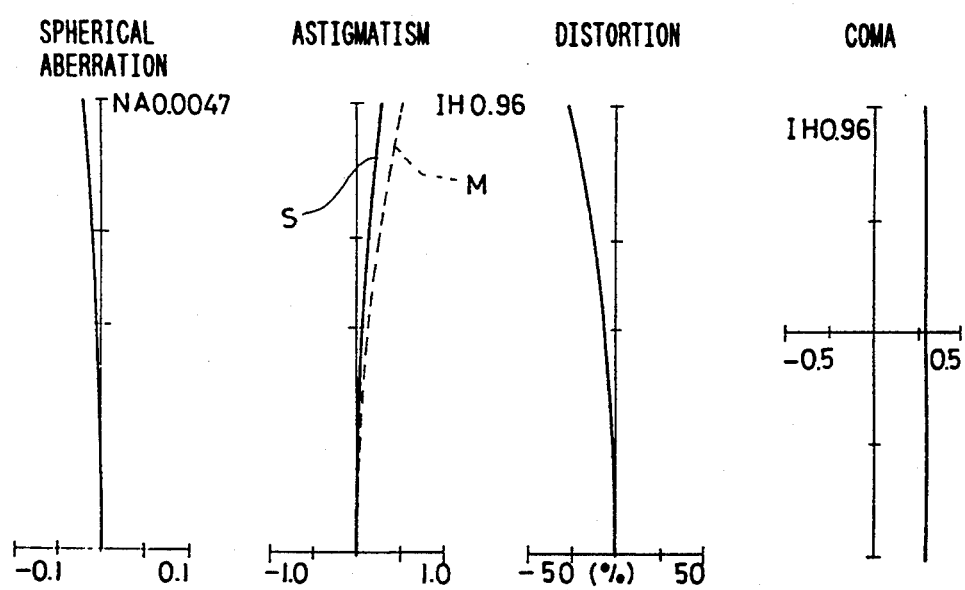

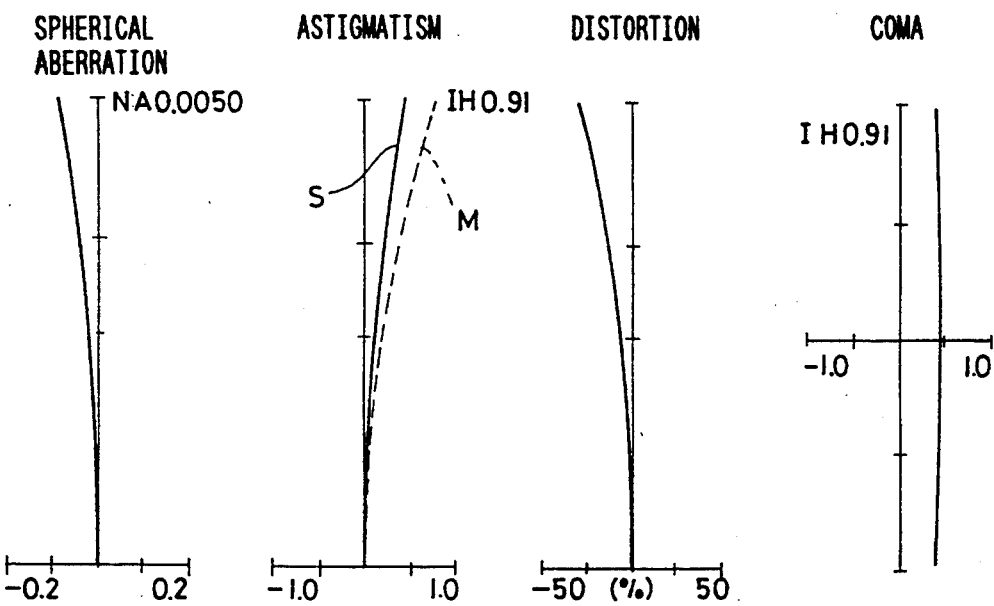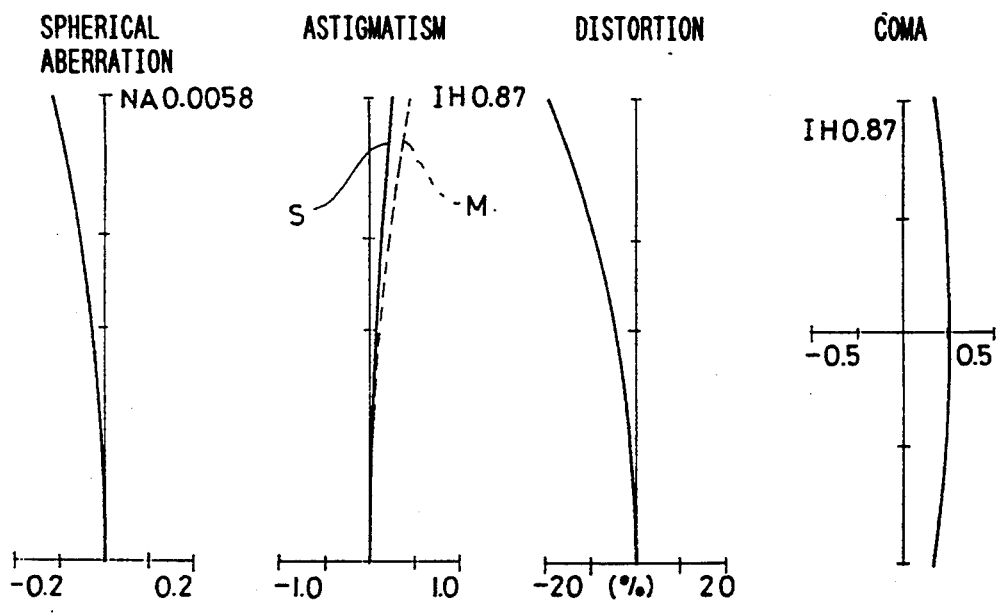

OBSERVATION OPTICAL SYSTEM FOR ENDOSCOPES

BACKGROUND OF THE INVENTION a) Field of the Invention

The present invention relates to an observation optical system for endoscopes which is to be used for observing objects located in liquid environments and has favorably corrected aberrations, especially distortion.

b) Description of the Prior Art

An observation optical system for non-flexible endoscopes, for example, consists of an objective lens system for forming an image of an object, a plurality of relay lenses for consecutively relaying the image and so on.

Known as one of the conventional objective lens systems is the objective lens system disclosed by Japanese Patent Kokai Publication No. Sho 59-226,315. This objective lens system is of the retrofocus type as shown in FIG. 1 in which a lens unit $G_1$ having a negative refractive power is disposed on the object side of a pupil S and a lens unit $G_2$ having a positive refractive power is disposed on the image side of the pupil S.

When this conventional objective lens system is combined with relay lenses $R_1$, $R_2$ and $R_3$ as shown in FIG. 2, an image $I_1$ formed by the objective lens system is relayed as images $I_2$, $I_3$ and $I_4$ by the relay lenses $R_1$, $R_2$ and $R_3$ respectively, and the pupil which determines an aperture of the optical system for endoscopes is relayed simultaneously. An eyepiece lens E is disposed after the image $I_4$ for observing an enlarged image of the image $I_4$. The pupil is located at the position indicated by the reference symbol S in the objective lens system, and at the positions indicated by the reference symbols $S_1$, $S_2$ and $S_3$ in the relay lenses. The pupils $S_1$, $S_2$ and $S_3$ generally have a diameter which is equal to an outside diameter of the relay lenses. Accordingly, the optical system for endoscopes has an aperture which is determined almost by the outside diameter of the relay lenses and it is unnecessary to dispose an aperture stop having a light shielding effect at the location of the pupil S.

Further, it is conventionally demanded to configure objective lens systems for endoscopes as the telecentric type which has an exit pupil located at nearly infinite distance. The telecentric type is required for preventing a transmission efficiencies of offaxial light bundles from being lowered in image guides and relay lenses in cases of fiber scopes and non-flexible endoscopes or avoiding problems of color shading, etc. in cases of video scopes using solid-state image pickup devices which are capable of picking up colored images.

The telecentric objective lens system for endoscopes are lens systems which satisfy relationship of $f = \sin \theta$ and produce remarkable negative distortion as the objective lens systems have larger field angles.

Distortion is dependent on an angle of incidence $\theta_p$ of the principal ray on an entrance pupil and an image height is a function of the angle of incidence $\theta_p$. When distortion is represented by $D(\theta_p)$ and image height is designated by $I(\theta_p)$, distortion $D(\theta_p)$ is defined by the following formula (i):

$$D(\theta_p) = 100\{I(\theta_p)/f \cdot \tan \theta_p - 1\}(\%) \quad \text{(i)}$$

wherein the reference symbol f represents a focal length of the objective optical system.

$I(\theta_p)$ can ordinarily be expressed in the following form, when $A(\theta_p)$ is a function of $\theta_p$.

$$I(\theta_p) = f \, A(\theta_p)$$

Hence, the above-mentioned formula (i) is transformed into the following formula (ii):

$$D(\theta_p) = 100\{A(\theta_p)/\tan \theta_p - 1\}(\%) \quad \text{(ii)}$$

As is understood from the foregoing description, the relationship between distortion and the angle of incidence of the principal ray is determined solely by the function $A(\theta_p)$ which determines the relationship between the image height and the angle of incidence of the principal ray, and this function represents distortion characteristics of the optical systems.

The above-mentioned function $A(\theta_p)$ is dependent only on imaging relation of a pupil. When the pupil is free from aberrations, i.e., when an objective lens system is assumed to satisfy the sine condition of pupil at all image heights and produces no spherical aberration at an entrance pupil or an exit pupil thereof, $A(\theta_p)$ is determined uniquely by using only a paraxial pupil magnification of the objective optical system as a whole as a parameter and is given by the following formula (iii):

$$A(\theta_p) = \sin \theta_p \{1 - (\sin^2 \theta_p)/\beta_p\}^{-\frac{1}{2}} \quad \text{(iii)}$$

wherein the reference symbol $\beta_p$ represents the paraxial pupil magnification.

In order to maintain the telecentric characteristic, an objective lens system for endoscopes must have a sufficiently high paraxial pupil magnification in absolute. When the objective lens system for endoscopes has a sufficiently high paraxial pupil magnification in absolute, the above-mentioned formula (iii) is approximated by the following formula (iv):

$$A(\theta_p) \approx \sin \theta_p \quad \text{(iv)}$$

Hence, distortion $D(\theta_p)$ is expressed by the following formula (v):

$$D(\theta_p) \approx 100 (\cos \theta_p - 1) \quad \text{(v)}$$

As is clear from the formula (v), negative distortion is aggravated as $\theta_p$ is enlarged.

A variety of inventions have hitherto been made to correct the negative distortion in the telecentric objective lens systems for endoscopes. For example, Japanese Patent Kokai Publication No. Hei 2-277,015, No. Hei 3-39,915 and No. Hei 3-200,911 disclosed objective lens systems for endoscopes having corrected negative distortion. Each of these objective lens systems is of the retrofocus type and corrects distortion by using an aspherical lens element in a front lens unit or a rear lens unit thereof.

Furthermore, a lens system for silver salt cameras which has a composition like that shown in FIG. 3 generally satisfies the relationship expressed by the following formula (vi):

$$A(\theta_p) \approx \tan \theta_p \quad \text{(vi)}$$

When the formula (vi) is used in the formula (ii), distortion $D(\theta_p)$ becomes zero and it will be understood that a lens system which satisfies the above-mentioned formula (vi) does not produce distortion.

Moreover, known as a lens system used in laser beam printers is an f·θ lens system which has a composition shown in FIG. 4 and satisfies relationship of h=f·θ. In case of this lens system, the function $A(\theta_p)$ can be expressed by the following formula (vii):

$$A(\theta_p) = \theta_p \qquad (vii)$$

A scanning optical system for laser beam printers ordinarily uses a polygon mirror rotating at a constant angular velocity and an f·θ lens which consists of an aperture stop disposed on a polygon mirror. The f·θ lens for laser beam printers generally has a large F number and requires nearly no consideration for correction of spherical aberration or coma. In addition, the f·θ lens requires no consideration for correction of chromatic aberration since it is used in combination with a light source emitting a monochromatic light bundle. For this reason, optical performance required for the f·θ lens can mostly be obtained by selecting a relatively simple composition consisting of a single concave lens element and a single convex lens element as shown in FIG. 4.

In case of a lens system which is to be used for cameras and satisfies the formula (vi), an amount of light to form an image is reduced as $\theta_p$ has a larger value. This relationship is generally referred to as the cosine law. Consequently, the lens system satisfying the formula (vi) is improper for use as an optical system for endoscopes. Also for another reason that the lens component disposed on the object side has an outside diameter larger than those of the other lens components, this lens system is improper for use as a lens system for endoscopes having an outside diameter on which strict restriction is imposed.

In case of the conventional optical system which satisfies $A(\theta_p) = \sin \theta_p$, in contrast, the optical system produces remarkable negative distortion cancelling the above-mentioned cosine law and forms an image which is uniformly bright over the entire range from the central portion to the marginal portion thereof even when $\theta_p$ has a large value.

Accordingly, most of the optical systems for endoscopes which satisfy the sine condition has an excellent characteristic that image brightness is uniform over the entire range from the central portion to the marginal portion. However, such optical systems for endoscopes produce remarkable distortion, form images having marginal portions contracted as compared with central portions, and do not permit accurate measurements or analyses of shapes when used for inspections or observations of objects in the industrial field or constitute causes of erroneous diagnoses in the medical field.

All of the conventional optical systems are designed on a premise that the optical systems are to be used in air or in combination with an object side medium having a refractive index of $N_o = 1$. The above-mentioned objective lens system for endoscopes, cameras and laser beam printers are also supposed for use in air.

However, medical non-flexible endoscopes, especially cystoscopes and throscopes adopted in the field of urinary organs, arthroscopes adopted in the field of orthopedics and specula adopted in the field of examination of parturient women are generally used in practice for observation while flushing water (physiological sodium chloride solution or nonelectrolytic aqueous solution, etc.) to locations to be observed. That is to say, the optical systems of these non-flexible medical endoscopes are used in combination with an object side medium having a refractive index of $N_o' \approx 1.333$.

In the field of orthopedics, in particular, endoscopes, especially arthroscopes, are widely used for minimally invasive surgery of the articulation of knees and distortion remaining in optical systems of the endoscopes used in water apparently deforms shapes of meniscus and travelling conditions of lattice-like blood vessel systems. An optical system for endoscopes which has corrected distortion permits easily observing that an edge of a knife to be used for the surgical operation is directed upward as shown in FIG. 5A. When the edge of the knife is observed through an optical system for endoscopes in which negative distortion remains, however, it is difficult to judge a direction of the edge of the knife as seen from FIG. 5B, thereby constituting a hindrance to the surgical operation.

A lens system which has a nearly planar surface on the object side, like the objective lens system for endoscopes, produces distortion which is largely different between a case where the lens system is used in air for observation and another case where the lens system is used in water for observation. In a case of an objective lens system which has a planar surface on the object side, for example, a ray is refracted by an object side surface $r_1$ as shown in FIG. 6A when the objective lens system is used in air ($N_o = 1$), whereas the ray is refracted by the object side surface as shown in FIG. 6C when the objective lens system is used in water ($N_o = 1.333$).

In case of an objective lens system which has distortion completely corrected when used in air, the lattice-like object is observed as illustrated in FIG. 6B. $A(\theta_p)$ of this objective lens system is given by the formula (vi). When an angle of incidence of an optional ray on the first surface $r_1$ is represented by $\theta_o$, an angle of emergence on the first surface $r_1$ is designated by $\theta_1$ and a refractive index on the side of emergence of the first surface $r_1$ is denoted by $N_1$ in FIG. 6A, Snell's law gives the following formula (viii):

$$\sin \theta_o = N_1 \sin \theta_1 \qquad (viii)$$

When the objective lens system which refracts the ray in water as shown in FIG. 6C is used, we obtain the following formula (ix):

$$1.333 \sin \theta_o' = N_1 \sin \theta_1 \qquad (ix)$$

wherein the reference symbol $\theta_o'$ represents an angle of incidence on the first surface $r_1$ of the objective lens system when water is an object side medium and the numeral 1.33 indicates the refractive index of water.

From the formula (viii) and the formula (ix) which are mentioned above, $\theta_o$ is expressed by the following formula (x):

$$\theta_o = \sin^{-1}(1.333 \sin \theta_o') \qquad (x)$$

Further, since a focal length of the objective lens system used in water can be expressed as 1.333 f, the formula (i) is transformed as follows:

$$D(\theta_o') = 100\{I(\eta_o')/(1.333 f \tan \theta_o') - 1\}(\%)$$

Hence, distortion to be produced by the objective lens system is expressed by the following formula (xi):

$$D(\theta_o) = 100 [\tan \{\sin^{-1}(1.333 \sin \theta_o')/1.333 \tan \theta_o\} - 1] \quad \text{(xi)}$$

FIG. 7 shows a graph illustrating distortion which is produced in a condition of $0° \leq \theta_o \leq 70°$, i.e., when the objective lens system is used in water in a condition of $0° \leq \theta_o' 23\ 44.8°$, FIG. 8A shows a view illustrating an appearance of an image of a lattice-like object in a condition of $0° \leq \theta_o \leq 60°$ i.e., $0° \leq \theta_o' \leq 40.5°$, and FIG. 8B shows a diagram illustrating an appearance of the lattice-like object in a condition of $0° \leq \theta_o \leq 70°$, i.e., in a condition of $0° \leq \theta_o' \leq 44.8°$. As is seen from these drawings, positive distortion is produced in a larger amount as the objective lens system has a larger field angle. Since the objective lens system which produces distortion as described above forces observers to observe deformed appearances of images, the objective lens system gives very strange impression to the observers who are accustomed to observation through the conventional endoscopes producing the negative distortion.

In the objective lens system for non-flexible endoscopes disclosed by above-mentioned Japanese Patent Kokai Publication No. She 59-226,315, curvature of field is corrected by largely refracting rays with an image side lens component which is used for composing a rear converging lens unit, whereby eccentricity or inclination of the lens component relative to an optical axis produces remarkable variations of aberrations or remarkable adverse influences on images.

In the recent days where endoscopes are used for surgical operations and inserted directly into human bodies in some cases, it is necessary to sterilize the endoscopes sufficiently. As a typical sterilizing method for appliances for surgical operations, it is known to keep the appliances in steam at a high temperature and at a high pressure. If portions of these appliances which are to be brought into direct contact with steam during the sterilization are made of the ordinary optical glass materials, the optical glass materials will be corrected by the steam, thereby rapidly making the appliances unusable. It is known to use, for the portions which are to be brought into direct contact with the steam, cover glass plates made of an optical material free from such corrosion, concretely an artificial sapphire (crystal of $Al_2O_3$). When an objective lens system which uses such a cover glass plate has an enlarged field angle, rays will be eclipsed by the cover glass plate which is made of the sapphire.

In addition, there is conventionally known an optical system for non-flexible endoscopes having a composition as illustrated in FIG. 9. This optical system for non-flexible endoscopes is composed of an objective lens system O, and relay lenses $R_1$, $R_2$ and $R_3$, configured so as to form an image of an object within a field lens F by the objective lens system O, and has favorably corrected aberrations. The optical system for non-flexible endoscopes of this type is characterized in that an exit pupil of the objective lens system O is relayed by the field lens F to the relay lenses $R_1$, $R_2$ and $R_3$, and positive curvature of field produced by the relay lenses is cancelled with negative curvature of field produced by the retrofocus type objective lens system O so that curvature of field is corrected within the optical system for non-flexible endoscopes as a whole, and that coma is corrected by disposing a cemented lens component having a cemented surface R which has a concave function in a positive lens unit arranged in the retrofocus type objective lens system O.

The optical system for non-flexible endoscopes illustrated in FIG. 9 has defects that the optical system has a field angle which is variable due to a problem inherent in manufacturing processes and that curvature of field is undercorrected due to an increased number of relaying operations. Speaking concretely, the optical system configured so as to relay a pupil of the objective lens system O by the field lens F has a field angle which is variable due to variations in a spacing between the objective lens system O and the field lens F serving for relaying the pupil, variations in a spacing between the field lens F and the relay lens $R_1$, variations in thickness of the field lens F and other causes.

Further, the undercorrection of curvature of field in the optical system is caused since positive curvature of field in the relay lens system is proportional to a number of relaying operations. For this reason, curvature of field which is favorably cancelled with negative distortion produced by the objective lens system O when the relaying operations are repeated three times will be undercorrected when the relaying operations are repeated five times.

In the objective lens system shown in FIG. 1 disclosed by the above-mentioned Japanese Patent Kokai Publication No. Sho 59-226,315, the exit pupil of the objective lens system O is located at infinite distance and pupils of the relay lenses are transmitted by disposing a meniscus lens component $L_1$ having a concave surface on the image side so that the principal ray converged or diverged before the meniscus lens component $L_1$ is made nearly paralle. The so-called telecentric optical system which is configured so as to relay a pupil to infinite distance by the objective lens system o and the relay lenses $R_1$, . . . makes it possible to obtain an optical system for non-flexible endoscopes having a field angle which is not varied regardless of the variations in the spacing between the objective lens system O and the relay lens $R_1$, or almost free from variations. Furthermore, when the objective lens system comprises a meniscus lens component which makes a Petzval's sum negative, the objective lens system has a Petzval's sum which has a negative value larger than that of the optical system shown in FIG. 9, whereby the objective lens system produces curvature of field having a large negative value. In this case, curvature of field can be corrected favorably in the optical system for non-flexible endoscopes as a whole.

In an attempt to obtain a lens system which has a wide field angle, for example, of 120° or larger, the conventional objective lens system for non-flexible endoscopes comprises, at the object side location, a negative lens component which has an image side surface having a too short radius of curvature and can hardly be manufactured in practice. Moreover, it can be conceived to configure an objective lens system which comprises an additional negative lens component as shown in FIG. 10 or is composed of two negative lens components $L_1$ and $L_2$. In this case, however, heights of rays become higher on the object side surface of a cover glass plate C as the objective lens system has a wider field angle, whereby the ray indicated by the dashed line in FIG. 10 is eclipsed by the cover glass plate C and a visual field for observation is undesirably eclipsed. When the steam-proof cover glass plate C is omitted for preventing the eclipse of the ray, the lens system will undesirably be corroded during sterilization.

SUMMARY OF THE INVENTION

A primary object of the present invention is to provide an observation optical system for endoscopes which can provide images having favorably corrected distortion when used in water for observation.

Another object of the present invention is to provide an objective lens system for non-flexible endoscopes which has a wide field angle, and is resistant to steam at a high temperature and at a high pressure.

The observation optical system for endoscopes according to the present invention comprises an objective lens system for forming an image of an object and relay lenses for relaying this image, and is configured so as to satisfy the conditions (1) and (2) mentioned below so that images having favorably corrected distortion can be obtained for observing objects located in an optional liquid through the objective lens system:

$$0.82 \leq N_w \cdot f \cdot \tan[\sin^{-1}\{(1/N_w) \sin \theta_{A1}\}]/I_1 \leq 1.18 \quad (1)$$

$$0.9 \leq N_w \cdot f \cdot \tan[\sin^{-1}\{(1/N_w) \sin \theta_{A0.5}\}]/I_{0.5} \leq 1.1 \quad (2)$$

wherein the reference symbol $N_w$ represents a refractive index of the liquid, the reference symbol f designates a focal length of the objective lens system, the reference symbol $\theta_{A1}$ denotes a field angle in air at a maximum image height, i.e., an angle of incidence, on the objective lens system, of a ray which is to attain to the maximum image height (an angle formed between an optical axis and the ray), the reference symbol $\theta_{A0.5}$ represents a field angle in air at a half of the maximum image height, i.e., an angle of incidence, on the objective lens system, of a ray which is to attain to the half of the maximum image height, the reference symbol $I_1$ designates the maximum image height and the reference symbol $I_{0.5}$ denotes the half of the maximum image height.

FIG. 11A shows a sectional diagram illustrating how an offaxial principal ray is refracted by the objective lens system for endoscopes in water, whereas FIG. 11B shows a sectional view illustrating how the offaxial principal ray is refracted by the objective lens system in air. As is seen from these drawings, an objective lens system which does not produce distortion during observation in water satisfies the following formulae (xii) and (xiii):

$$N_w \sin \theta_w = N_1 \sin \theta_w' \quad (xii)$$

$$I(\theta_w) = N_w \cdot f \cdot \tan \theta_w \quad (xiii)$$

wherein the reference symbol $\theta_w$ represents an angle which is formed between an optional offaxial principal ray incident in water onto the objective lens system and the optical axis, the reference symbol $\theta_w'$ designates an angle formed between the offaxial principal ray immediately after being refracted by a first surface of the objective lens system and the optical axis, and the reference symbol $N_1$ denotes a refractive index of the lens element.

The formula (xii) expresses Snell's law related to the offaxial principal ray, whereas the formula (xiii) is a formula expressing relationship between an angle of the offaxial principal ray in water (field angle) and image height on the objective lens system.

When the objective lens system is used for observation in air, the lens system satisfies, in place of the above-mentioned formulae (xii) and (xiii), the following formulae (xiv) and (xv):

$$N_A \sin \theta_A = N_1 \sin \theta_A' \quad (xiv)$$

$$I(\theta_A) = f \cdot A(\theta_A) \quad (xv)$$

wherein the reference symbol $\theta_A$ represents an angle formed between an optional offaxial principal ray incident on the objective lens system and the optical axis, and the reference symbol $\theta_A'$ designates an angle formed between the offaxial principal ray immediately after being refracted by the first surface of the objective lens system and the optical axis, and the reference symbol $N_A$ denotes a refractive index of air (hereinafter taken as $N_A = 1$).

Since a difference between the formula (xiv) and the formula (xv) is a difference in a medium located on the object side of the objective lens system, and $\theta_w'$ is equal to $\theta_A'$, we can obtain the formula (xvi) mentioned below from the formulae (xii) and (xiii):

$$\theta_w = \sin^{-1}\{(1/N_w) \sin \theta_A\} \quad (xvi)$$

Further, we obtain the following formula (xvii) by using the formula (xvi) in the formula (xiii):

$$I(\theta_A) = N_w \cdot f \cdot \tan[\sin^{-1}\{(1/N_w) \sin \theta_A\}] \quad (xvii)$$

That is to say, $A(\theta_A)$ used in the formula (xv) is expressed by the following formula (xviii):

$$A(\theta_A) = N_w \tan[\sin^{-1}\{(1/N_w) \sin \theta_A\}] \quad (xviii)$$

The formula (xvii) represents relationship between a field angle and image height in air in a case where a distortion-free image of an object in water is formed by an objective lens system which has a first nearly planar surface.

FIG. 12A illustrates distortion, as expressed by the formula (xvii), on an image which is produced by the objective lens system when it is kept in air, whereas FIG. 12B shows distortion on an image which is produced by the objective lens system when it is kept in water. In FIG. 13, the curves d, f, g and q visualize relationship in air between field angles and image heights. In the drawing, the curve d represents the relationship in case of the f·sin $\theta$ type lens system, the curve f visualizes the relationship in case of the f·tan $\theta$ type lens system, and the curve q is a graph representing the relationship in case of the f·$\theta$ type lens system. The relationship in case of the lens system which satisfies the relationship expressed by the formula (xvii) is represented by the curve q. The lens system of this type is characterized in that the optical system exhibits a characteristic similar to that of the f·$\theta$ lens within a region where the field angle $\theta_A$ is relatively an inclination angle is enlarged when the field angle $\theta_A$ exceeds 30° and reduced when the field angle $\theta_A$ exceeds 60°.

As is understood from FIG. 13 and the foregoing description of the conventional example, remarkable positive distortion will undesirably be produced on an image in observation of an object located in water if the curve representing the relationship between a field angle and image height deviates upward from the curve q shown in FIG. 13, i.e., if the upper limit of the condition (1) or (2) is exceeded. If the curve representing the relationship between a field angle and image height deviates downward from the curve q, in contrast, i.e., if the lower limit of the condition (1) or (2) is exceeded, the positive distortion will undesirably by undercorrected in observation of an object located in water.

Further, in order to observe an image affected by distortion of an object located in water with no strange impression, it is desirable to satisfy the following conditions (1') and (2'):

$$0.9 \leq N_w f \tan[\sin^{-1}\{(1/N_w) \sin \theta_{A1}\}]/I_1 \leq 1.1 \quad (1')$$

$$0.95 \leq N_w f \tan[\sin^{-1}\{(1/N_w) \sin \theta_{A0.5}\}]/I_{0.5} \leq 1.0 \quad (2')$$

In order to satisfy the above-mentioned conditions (1') and (2'), it is desirable to compose an objective lens system for non-flexible endoscopes as described below:

In an observation optical system for endoscopes which comprises an objective lens system O for forming an image of an object and relay lens systems $R_1$, $R_2$, ... as illustrated in FIG. 14, the objective lens system O is a retrofocus type telecentric lens system composed, in order from the object side, of a front diverging lens unit $G_1$ consisting of a single concave meniscus lens component $L_1$ having an object side aspherical surface $ASP_1$ which strengthens positive refractive power toward a marginal portion thereof, and a rear converging lens unit $G_2$ which comprises a cemented lens component and consists of at least two lens components having positive refractive powers. Further, this objective lens system has an entrance pupil located therein, and satisfies the following conditions (3) and (4):

$$1 \leq f_2/f \leq 10 \quad (3)$$

$$-4 \leq f_1/f \leq -0.1 \quad (4)$$

wherein the reference symbol $f_1$ represents a focal length of the front diverging lens unit $G_1$ and the reference symbol $f_2$ designates a focal length of the rear converging lens unit $G_2$.

The condition (3) defines a positive refractive power of the rear converging lens unit $G_2$. If the focal length $f_2$ is short enough to exceed the lower limit of the condition (3), the offaxial principal ray will have a large angle of incidence on the rear converging lens unit $G_2$ so far as image height is kept constant.

When a prism P for changing a direction toward a visual field is disposed in an airspace reserved between the front lens unit and the rear lens unit as illustrated in FIG. 15A, FIG. 15B or FIG. 15C, the offaxial principal ray has a large angle relative to the optical axis within this airspace, whereby rays are high on the front lens unit and the meniscus lens component $L_1$ undesirably has a prolonged outside diameter. If the focal length $f_2$ is long enough to exceed the upper limit of the condition (3), rays will be incident on the rear lens unit at small angles so far as image height is constant. If an attempt is made to enlarge the field angle of the objective lens system as a whole in this case, it is obliged to shorten the focal length of the front diverging lens unit, thereby making it difficult to perform correction of aberrations and eccentricity adjustment at the assembling stage.

If the focal length $f_1$ of the front diverging lens unit is short enough to exceed the upper limit of the condition (4), it will undesirably be to perform correction of aberrations and adjustment of eccentricity. If the focal length of the front diverging lens unit is long enough to exceed the upper limit of the condition (4), the focal length of the rear converging lens unit must be shortened to obtain a large field angle of the objective lens system, whereby the offaxial principal ray will have a large angle of incidence on the rear converging lens unit so far as image height is constant. When the prism for changing the direction toward the visual field is disposed in the airspace reserved between the front lens unit and the rear lens unit as illustrated in FIG. 15A, FIG. 15B or FIG. 15C, the offaxial principal ray will have a large angle relative to the optical axis within this airspace, whereby rays will be high on the front lens unit and the meniscus lens component will undesirably have a large outside diameter.

Further, the observation optical system for endoscopes comprises an objective lens system O and relay lenses $R_1$, $R_2$, ... for relaying an image formed by the objective lens system O a plurality of times; the objective lens system O being a retrofocus type telecentric lens system comprising, in order from the object side, a front diverging lens unit $G_1$ which consists of a negative lens element $L_1$ and a negative lens element $L_2$ having an aspherical surface $ASP_1$ strengthening a positive refractive power toward a marginal portion thereof, and a rear converging lens unit $G_2$ which consists of at least two lens elements and has an image side convex surface designed as an aspherical surface $ASP_2$ weakening a positive refractive power toward a marginal portion thereof. This objective lens system O has an entrance pupil located therein, and satisfies the following conditions (3) through (6):

$$1 \leq f_2/f \leq 10 \quad (3)$$

$$-4 \leq f_1/f \leq -0.1 \quad (4)$$

$$0.2 \leq f_{12}/f_{11} \leq 1.2 \quad (5)$$

$$-0.5 \leq r_2/r_1 \leq 0.5 \quad (6)$$

wherein the reference symbol $f_{11}$ represents a focal length of a negative lens component $L_1$ disposed on the object side in the front diverging lens unit, the reference symbol $f_{12}$ designates a focal length of a negative lens component $L_2$ which is disposed in the front diverging lens unit and has an aspherical surface, and the reference symbols $r_1$ and $r_2$ denote radii of curvature on an object side surface and an image side surface respectively of the negative lens component disposed in the front diverging lens unit.

Out of the conditions (3) through (6) mentioned above, the conditions (3) and (4) are the same as the conditions (3) and (4) respectively which are to be satisfied by the objective lens system having the composition shown in FIG. 14, and should desirably be satisfied also by the objective lens system having the composition illustrated in FIG. 16.

The plane parallel plate disposed on the object side in the objective lens system illustrated in FIG. 14 is a cover glass plate. Further, in the objective lens systems illustrated in FIG. 10, FIG. 11A and FIG. 11B, the concave lens element $L_1$ serves also as a cover glass plate.

In the next place, the condition (5) defines a ratio between focal lengths of the two concave lens elements $L_1$ and $L_2$ which are used for composing the front diverging lens unit $G_1$. If the lower limit of the condition (5) is exceeded, a function to widen a visual field will be imparted mostly to the lens element $L_1$, whereby rays will be high on the concave lens element $L_1$ disposed on the object side and the lens element $L_1$ must have an enlarged diameter. If the lower limit of the condition (5) is exceeded, in contrast, principal rays which are to attain to different image heights will be close to one another on the aspherical surface of the concave lens element $L_2$, thereby making it impossible to correct distortion.

The condition (6) defines a ratio between radii of curvature on both the surfaces of the concave lens element $L_1$ disposed on the object side. The condition which has been described above as a requite for making an image formed by the objective lens system in water free from distortion is defined on an assumption that the object side surface of the object lens system is planar. However, this object side surface is actually a spherical surface having a relatively large radius of curvature, in most cases, for correcting the other aberrations such as astigmatism, but the conditions (1) and (2) are not influenced so remarkably in such cases.

If the upper limit of the condition (6) is exceeded, the object side refracting surface of the objective lens system will have curvature which is nearly equal to that of the image side refracting surface thereof, thereby making it rather difficult to perform centering and other operations. If both the upper limit or the lower limit is exceeded, the surface will have a small radius of curvature, thereby undesirably requiring a high cost for polishing. Further, if the surface $r_1$ is concave, a concavity will be formed along the concave surface and air bubbles will adhere to a central portion or a marginal portion of the lens elements when the objective lens system is used in water for observation, thereby eclipsing a visual field and constituting a hindrance to observation.

When the concave lens element which is disposed on the object side in the objective lens system according to the present invention is made of sapphire, the objective lens system has enhanced resistance to a high temperature and a high pressure during sterilization and it is unnecessary to dispose a cover glass plate in the optical path between the objective lens system and an object to be observed. Omission of the cover glass plate is desirable for lowering rays on the object side refracting surface of the objective lens system and reducing an outside diameter of the objective lens system or making the objective lens system compacter. Further, sapphire has hardness higher than that of the ordinary optical glass materials and can be polished relatively hardly. This fact makes it more important to satisfy the condition (6).

The aspherical surface which is to be used in the observation optical system for endoscopes according to the present invention is approximated by the following formula (7):

$$x = \frac{y^2/r}{1 + \sqrt{1 - p(y/r)^2}} + Ey^4 + Fy^6 + Gy^8 \tag{7}$$

wherein the reference symbols x and y represent coordinates values on a coordinate system on which the optical axis is taken as the x axis regarding the direction toward an image as positive, the direction perpendicular to the optical axis is taken as the y axis, and an intersection between the aspherical surface and the optical axis is taken as an origin. Further, the reference symbol r represents a radius of curvature at a vertex of a quadratially curved surface, the reference symbol p designates a conical constant, and the reference symbols E, F and G denote aspherical surface coefficients of the fourth, sixth and eighth orders respectively.

In the case of the aspherical surface which strengthens the positive refractive power toward the marginal portion thereof and is used as the object side surface of the front diverging lens unit disposed in the objective lens system illustrated in FIG. 14, FIG. 15A, FIG. 15B or FIG. 15C, the aspherical surface has a shape which satisfies the following conditions (8), (9) and (10) within a range allowing passage of an effective light bundle therethrough:

$$P_f = 1 \tag{8}$$

$$E_f f^3 > 0 \tag{9}$$

$$|E_f f^3| > |F_f f^5| \tag{10}$$

wherein the reference symbols $P_f$, $E_f$ and $F_f$ represent a conical constant, an aspherical surface coefficient of the fourth order and an aspherical surface coefficient of the sixth order respectively of the aspherical surface to be used in the front diverging lens unit.

The condition (8) means that the shape of the aspherical surface is approximated by the above-mentioned formula of aspherical surface with the conical constant kept fixed at 1. Further, the conditions (9) and (10) mean that the aspherical surface has a positive refractive power which is strengthened toward the marginal portion.

If the condition (9) is not satisfied, if $E_f$ and $F_f$ have the same sign in the condition (10), and if $E_f$ and $F_f$ do not satisfy the condition (10), the marginal portion of the aspherical surface will have too strong a refractive power, thereby undesirably overcorrecting distortion in water. Further, if the condition (9) is not satisfied, if $E_f$ and $F_f$ have signs different from each other in the condition (10), and if $E_f$ and $F_f$ do not satisfy the condition (10), in contrast, the aspherical surface will have a shape in which the marginal portion has an inflection surface and can hardly be formed in practice.

It is desirable that the above-mentioned aspherical surface satisfies the conditions (8) through (10) or the following condition (11):

$$0.005 \leq |\Delta_f/f| \leq 0.03 \tag{11}$$

wherein the reference symbol $\Delta_f$ represents a departure from a reference sphere at a point at which an offaxial principal ray having the maximum image height intersects with the aspherical surface of the front lens unit. The departure from the reference sphere is a difference between a value of abscissa determined by the formula (7) of aspherical surface and a value of abscissa on a spherical lens element having a radius of curvature r.

If the upper limit of the condition (11) is exceeded, distortion will be overcorrected. If the lower limit of the condition (11) is exceeded, in contrast, distortion will be undercorrected.

When the aspherical surface which is to be used as the image side concave surface of the rear converging lens unit of the objective lens system illustrated in FIG. 16 has a positive refractive power weakened toward the marginal portion thereof, it is desirable that this aspherical surface has a shape satisfying the following condition (12) within a range which allows transmission of an effective light bundle:

$$-2 \leq p_r \leq 0.1 \tag{12}$$

wherein the reference symbol $p_r$ represents a conical constant of the aspherical surface which is to be used in the rear converging lens unit.

The condition (12) means that the aspherical surface to be used in the rear converging lens unit can be approximated to a hyperbolic surface, a parabolic surface or an elliptic shape similar to a hyperbolic surface. An aspherical surface which satisfies the condition (12) has a shape progressively weakening a refractive power toward the marginal portion thereof. If the lower limit of the condition (12) is exceeded, distortion in water will undesirably be overcorrected. If the upper limit of the condition (12) is exceeded, distortion will undesirably be undercorrected.

Further, it is desirable that the above-mentioned aspherical surface satisfies the following condition (13):

$$0.003 \leq |\Delta_r/f| \leq 0.03 \tag{13}$$

wherein the reference symbol $\Delta_r$ represents a departure from the reference sphere of the aspherical surface at a point at which the offaxial principal ray having the maximum image height intersects with the aspherical surface used in the rear converging lens unit.

If the condition (13) is not satisfied, distortion will undesirably be overcorrected or undercorrected.

Furthermore, it is desirable that the abovementioned aspherical surface satisfies the following condition (14):

$$|E_r F^3| \leq 0.1, \; |F_r f^5| \leq 0.1 \tag{14}$$

wherein the reference symbols $E_r$ and $F_r$ represent coefficients of the fourth order and the sixth order respectively of the aspherical surface used in the rear converging lens unit.

If the condition (14) is not satisfied, the aspherical surface will have a shape which has an inflection point and is undesirable from a viewpoint of manufacturing.

Moreover, the objective lens system illustrated in FIG. 16 should desirably satisfy the following condition (15):

$$0.5 \leq \Delta_r/\Delta_f \leq 2 \tag{15}$$

The condition (15) defines a ratio between a departure $\Delta_f$ from a reference sphere of the aspherical surface to be used in the front lens unit and a departure $\Delta_r$ from a reference sphere of the aspherical surface to be used in the rear converging lens unit, thereby defining a ratio between correction of distortion by the aspherical surface to be used in the front lens unit and correction of distortion by the aspherical surface to be used in the rear lens unit. If the upper limit of the condition (15) is exceeded, the aspherical surface to be used in the rear lens unit will have an enhanced function for correcting distortion, and this aspherical surface will have a large departure from the reference sphere thereof, whereby the aspherical surface will have a shape including an inflection point and can hardly be manufactured in practice. If the lower limit of the condition (15) is exceeded, in contrast, the aspherical surface to be used in the front lens unit will undesirably have an enhanced function for correcting distortion and a large departure from the reference sphere thereof. Further, if the upper limit or the lower limit of the condition (15) is exceeded, an undesirable influence will be produced on the other aberrations, especially astigmatism, since astigmatism to be produced by the aspherical surface to be used in the front lens unit and astigmatism to be produced by the aspherical surface to be used in the rear lens unit will have the same sign, and be produced in amounts having absolute values which are nearly equal to each other. Accordingly, remarkable astigmatism is produced when either of the aspherical surfaces has too large a departure from the reference sphere thereof, thereby making it difficult to correct distortion while balancing the distortion produced by the former aspherical surface with that produced by the latter aspherical surface.

In case of an objective lens system which is to be used in the observation optical system for endoscopes illustrated in FIG. 16, it is desirable to select a composition as shown in FIG. 17 for the rear converging lens unit. Speaking concretely, it is necessary to compose the rear converging lens unit, in order from the object side, of a positive lens element $L_3$, and a cemented lens component which consists of a positive lens element $L_4$, a negative lens element $L_5$ and a positive lens element $L_6$ having an aspherical surface on the image side as shown in FIG. 17. In case of a non-flexible endoscope comprising relay lens systems, it is necessary to correct remarkable negative curvature of field produced by the relay lens systems with an objective lens system. In the objective lens system illustrated in FIG. 17, two negative lens elements disposed in the front diverging lens unit are adopted for correcting the above-mentioned negative curvature of field and Petzval's sum is corrected with the two negative lens elements. For this reason, this objective lens system does not require, unlike the conventional objective lens system for endoscopes, using a strongly concave surface in the rear converging lens unit. When a strongly concave surface is not disposed in the rear converging lens unit as in the case of the objective lens system illustrated in FIG. 17, images are influenced little due to eccentricity or inclination made at assembling stages. Further, the cemented lens component consisting of the three lens elements has large thickness and serves for preventing inclination from being made.

FIG. 18 illustrates another objective lens system which is to be used in the observation optical system for endoscopes according to the present invention. The observation optical system shown in FIG. 18 is also to be used for non-flexible endoscopes and comprises relay lenses for relaying an image formed by objective lens systems. In the objective lens system which is to be used in this observation optical system for endoscopes, the front diverging lens unit comprises at least a negative lens element $L_1$ and another negative lens element $L_2$ each of which has a concave surface on the image side, and the rear converging lens unit is composed of at least two positive lens components.

This objective lens system according to the present invention is also configured so as to obtain a visual field having a wide field angle by adding the negative lens element $L_1$ on the object side of the second negative lens element $L_2$ in the front diverging lens unit. Further, the lens element $L_1$ is made of a material which is capable of resisting to sterilizing steam at a high temperature and at a high pressure, for example, $Al_2O$ (artificial sapphire).

Furthermore, this objective lens system is characterized in that it satisfies the following condition (16):

$$-0.5 \leq r_2/r_1 \leq 0.5 \tag{16}$$

wherein the reference symbols $r_1$ and $r_2$ represent radii of curvature on an object side surface and an image side surface respectively of the lens element $L_1$.

The condition (16) defines a ratio between radii of curvature on both the surfaces of the negative lens element $L_1$ which is disposed on the object side. If the condition (16) is not satisfied, the second surface $r_2$ must have a small radius of curvature for imparting the negative refractive power required for widening a field angle to the negative lens element, thereby making this negative lens element hardly manufacturable in practice. The object side surface $r_1$ of this negative lens element should desirably be planar or nearly planar. When the negative lens element $L_1$ disposed on the object side is made of artificial sapphire or the similar material, the artificial sapphire has high hardness and requires a special procedure for polishing. Therefore, a high cost is required for polishing both the surfaces of the negative lens element $L_1$. If the first surface $r_1$ is concave, a concavity will be formed along the concave surface and air bubbles will adhere to a central portion or a marginal portion of the surface, thereby producing flare or eclipsing the visual field for observation. For this reason, the surface $r_1$ should desirably be planar or nearly planar.

Moreover, it is desirable that the objective lens system according to the present invention satisfies the following condition (17):

$$1 \leq f_{11}/f_{12} \leq 25 \tag{17}$$

wherein the reference symbols $f_{11}$ and $f_{12}$ represent focal lengths of the negative lens element $L_1$ and the negative lens element $L_2$ respectively which are disposed on the object side.

The condition (17) defines a ratio between focal lengths of the negative lens element $L_1$ and the negative lens element $L_2$ which are disposed in the front diverging lens unit. If the upper limit of the condition (17) is exceeded, the focal length $f_1$ will be too long or the focal length $f_2$ will be too short, whereby the negative lens element $L_2$ must bear too heavy a burden of negative refractive power for configuring the objective lens system so as to provide a wide visual field, but rays will be eclipsed by the first surface $r_1$ of the negative lens element $L_1$ and the visual field will be narrowed. In order to prevent the rays from being eclipsed, the negative lens element $L_1$ must have a large diameter undesirable for the objective lens system for endoscopes which is to be compact. If the lower limit of the condition (17) is exceeded, the focal length $f_1$ will be too short or the focal length $f_2$ will be too long, thereby making it difficult to configure the objective lens system so as to provide a wide visual field. That is to say, the image side concave surface of the negative lens element $L_2$ will have low curvature or be nearly planar, like that of the negative lens element used in the conventional objective lens system for endoscopes, and the negative lens element $L_1$ must have a strongly negative refractive power for configuring the objective lens system so as to provide a wide visual field and can hardly be manufactured in practice. In a particular case where the negative lens element $L_1$ is made of artificial sapphire, manufacturing of the negative lens element $L_1$ will be more difficult.

For the objective lens system for endoscopes according to the present invention, it is more desirable to satisfy the following conditions (18) and (19):

$$0.5 \leq |f_1/f| \leq 0.8 \tag{18}$$

$$2 \leq f_2/f \leq 4.5 \tag{19}$$

wherein the reference symbol $f$ represents a focal length of the objective lens system, and the reference symbols $f_1$ and $f_2$ designate focal lengths of the front diverging lens unit and the rear converging lens unit respectively.

The condition (18) defines a ratio between a focal length of the front diverging lens unit and a focal length of the objective lens system as a whole, or a negative refractive power of the front diverging lens unit. If the upper limit of the condition (18) is exceeded, the focal length $f_1$ of the front diverging lens unit will be too long and the focal length $f_2$ of the rear converging lens unit must be shortened, thereby making it difficult to correct aberrations and eccentricities made at an assembling stage. If the lower limit of the condition (18) is exceeded, in contrast, the focal length $f_1$ of the front diverging lens unit will be too short, thereby making it difficult to correct aberrations and eccentricites made at the assembling stage.

The condition (19) defines a focal length of the rear converging lens unit and a focal length of the objective lens system as a whole, or a positive refractive power of the rear converging lens unit. If the upper limit of the condition (19) is exceeded, the focal length of the rear converging lens unit will be too long and rays will be incident on the rear converging lens unit at smaller angles. Accordingly, the focal length $f_1$ of the front diverging lens unit must be shortened for configuring the objective lens system so as to have a wide field angle, thereby making it difficult to correct aberrations and eccentricity of the front diverging lens unit made at an assembling stage. If the lower limit of the condition (19) is exceeded, the focal length $f_2$ of the rear converging lens unit will be too short and the offaxial principal ray will be incident on the rear converging lens unit at a larger angle. Accordingly, the offaxial principal ray will have a large angle relative to the optical axis in an airspace reserved for disposing a visual field changing prism between the front diverging lens unit and the rear converging lens unit, as in the case of a first embodiment of the present invention which will be described later with reference to FIG. 77, and rays will be high on the rear converging lens unit. Consequently, the rear converging lens unit will undesirably have an enlarged diameter. In addition, the description of the conditions (18) and (19) has been made above on an assumption of a constant image height.

It is still desirable that the objective lens system according to the present invention satisfies the following condition (20):

$$h_1/I_{max} \leq 1.2 \tag{20}$$

wherein the reference symbol $h_1$ represents a maximum image height on the negative lens element $L_1$ which is disposed on the object side in the front diverging lens unit and the reference symbol $I_{max}$ designates a maximum image height on the objective lens system for non-flexible endoscopes.

The condition (20) defines a height of ray on the first surface of the negative lens element $L_1$ which is disposed on the object side when the objective lens system for non-flexible endoscopes is configured so as to have a wide field angle. If the condition (20) is not satisfied, the height of ray $h_1$ will be too large and an observation visual field may be eclipsed by the negative lens element $L_1$. In order to prevent the visual field from being eclipsed, the negative lens element $L_1$ must have a large outside diameter, thereby undesirably thickening distal ends of non-flexible endoscopes. If $I_{max}$ is lowered, the objective lens system will form small images, thereby making it difficult to observe bright or favorable images.

BRIEF DESCRIPTION OF THE DRAWINGS

FIG. 14 shows a sectional view illustrating a composition of the observation optical system for endoscopes which comprises relay lenses;

FIG. 16 shows a sectional view illustrating an observation optical system which uses a different type of objective lens system;

FIG. 40A through 41D show curves illustrating aberration characteristics in air and in water respectively of the first embodiment of the present invention;

FIG. 42A through FIG. 62D show curves illustrating aberration characteristics in water of the second through twenty-second embodiments respectively of the present invention;

FIG. 63A through FIG. 74D show curves illustrating aberration characteristics in air of the twenty-third through thirty-fourth embodiments respectively of the present invention;

DETAILED DESCRIPTION OF THE PREFERRED EMBODIMENTS

Figure 1:
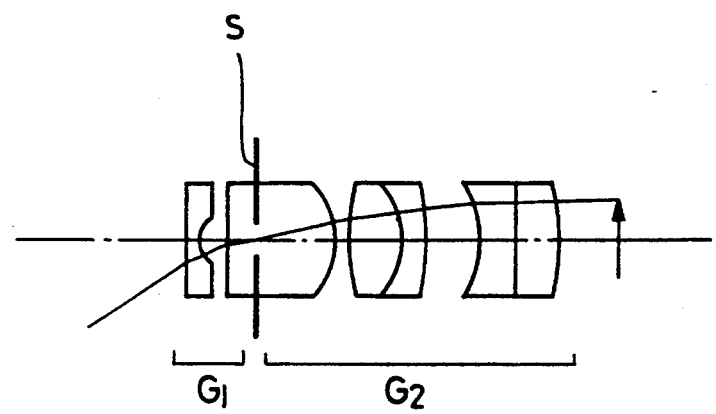
FIG. 1 shows a sectional view illustrating a composition of the conventional objective lens system for endoscopes.
Figure 2:
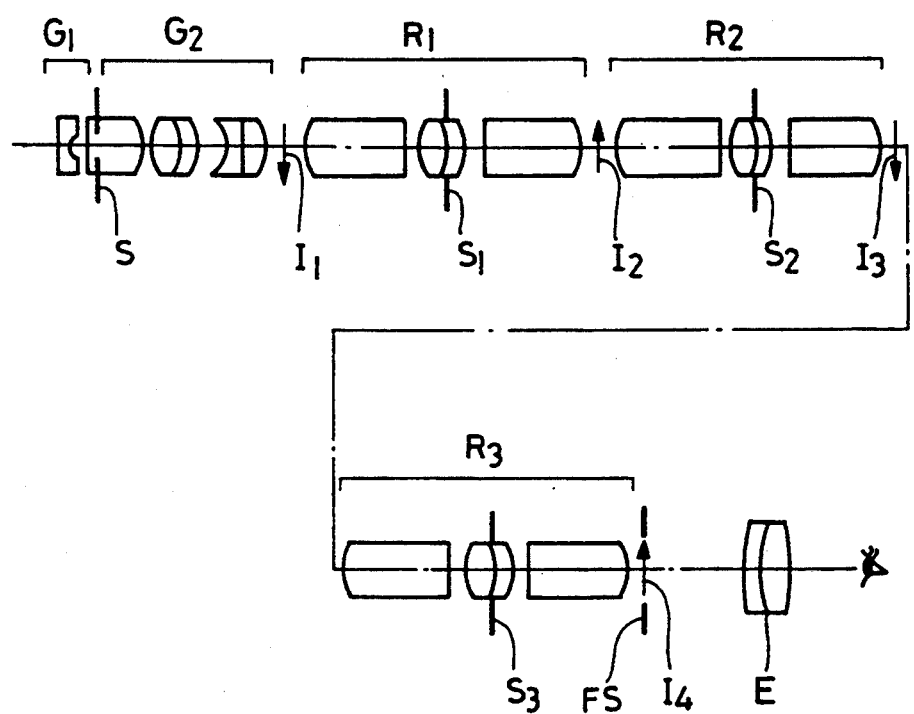
FIG. 2 shows a sectional view illustrating a composition of an optical system for endoscopes in which the objective lens system shown in FIG. 1 is combined with relay lenses.
Figure 3:
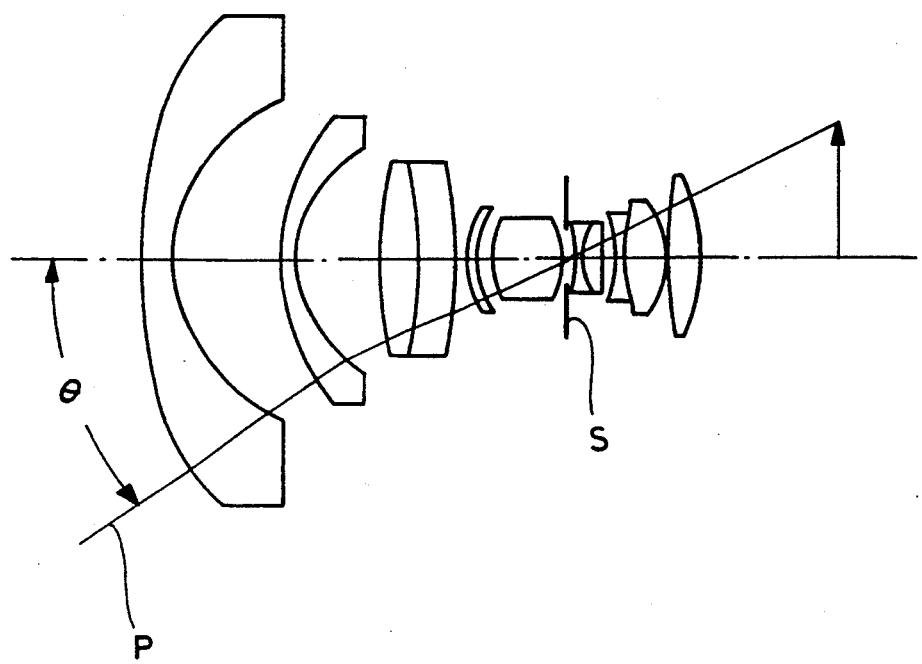
FIG. 3 shows a sectional view illustrating a lens system for cameras.
Figure 4:
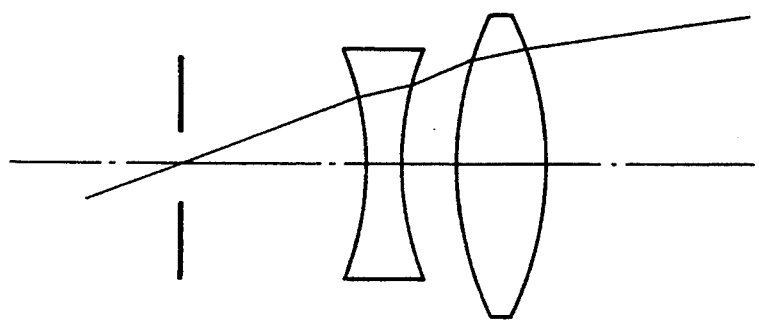
FIG. 4 shows a sectional view illustrating an f-θ lens.
Figure 5A:
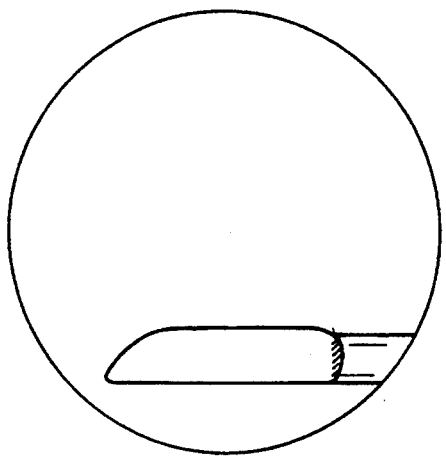
FIG. 5A and FIG. 5B show diagrams illustrating appearances of images of objects formed by optical systems having distortion.
Figure 5B:
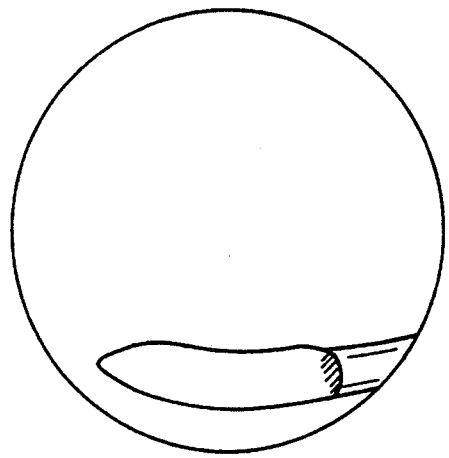
Figure 6A:
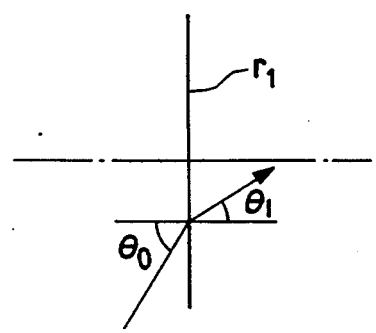
FIG. 6A, FIG. 6B and FIG. 6C show diagram illustrating a condition of a ray refracted in air by a first surface of a lens system having a planar surface on the object side, an image of a lattice-like object and a condition of a ray refracted in water by the first surface respectively.
Figure 6B:
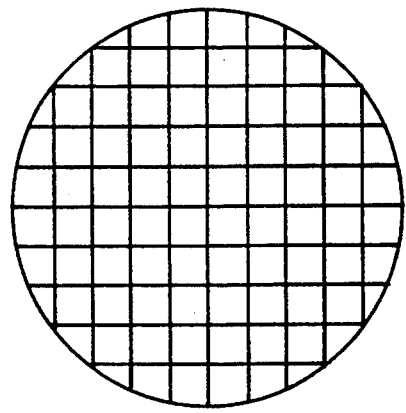
Figure 6C:
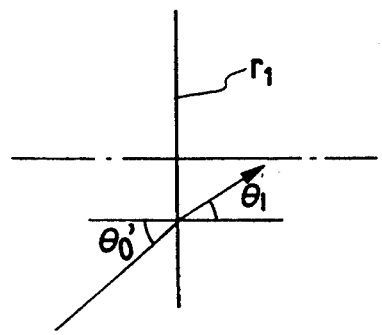
Figure 7:
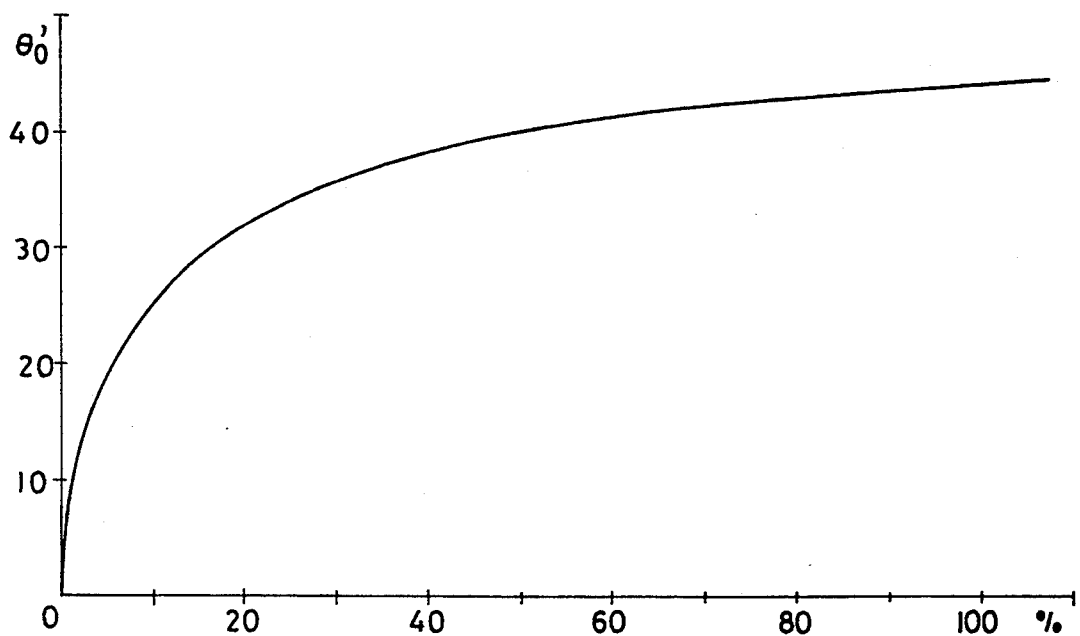
FIG. 7 shows a graph illustrating distortion produced by the conventional objective lens system for endoscopes.
Figure 8A:
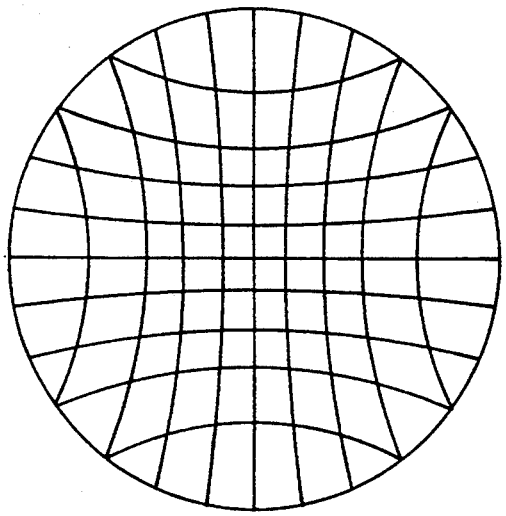
FIG. 8A and FIG. 8B shows diagrams illustrating appearances of images of the lattice-like object formed by the conventional objective lens system.
Figure 8B:
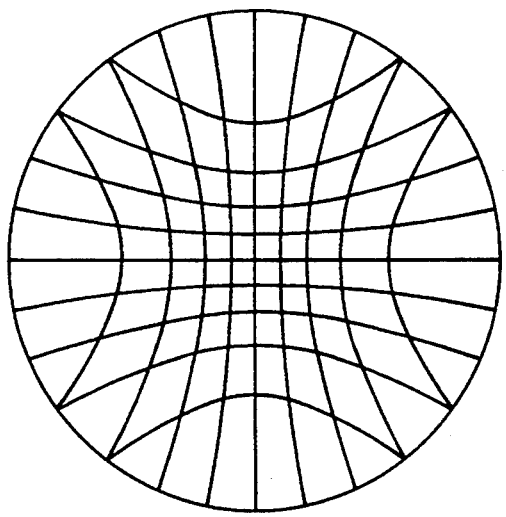
Figure 9:
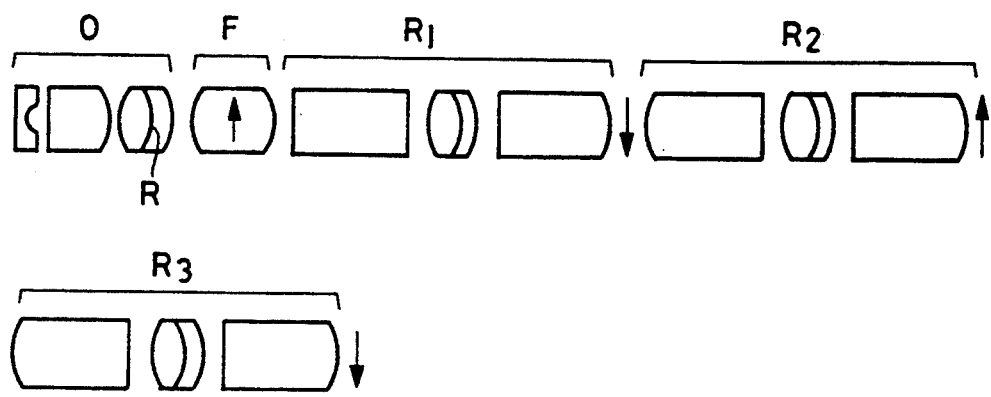
FIG. 9 shows a sectional view illustrating a composition of the conventional optical system for non-flexible endoscopes.
Figure 10:
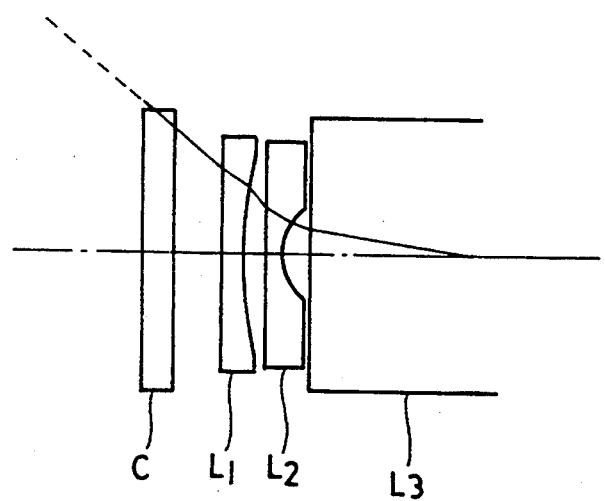
FIG. 10 shows a sectional view illustrating a condition of a ray refracted by an objective lens system comprising two negative lens elements on the object side.
Figure 11A:
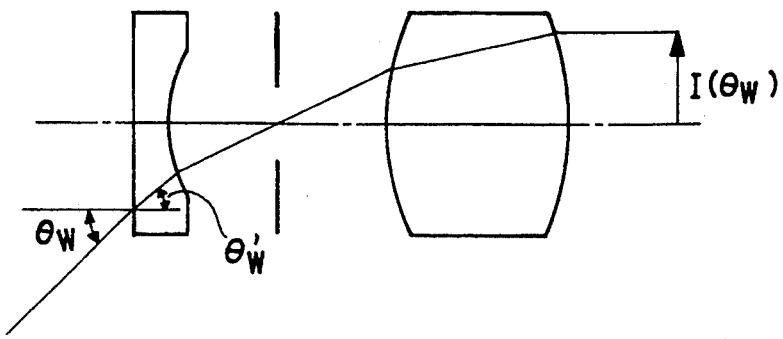
FIG. 11A and FIG. 11B show sectional views illustrating conditions of the offaxial principal ray refracted by the objective lens system for endoscopes.
Figure 11B:
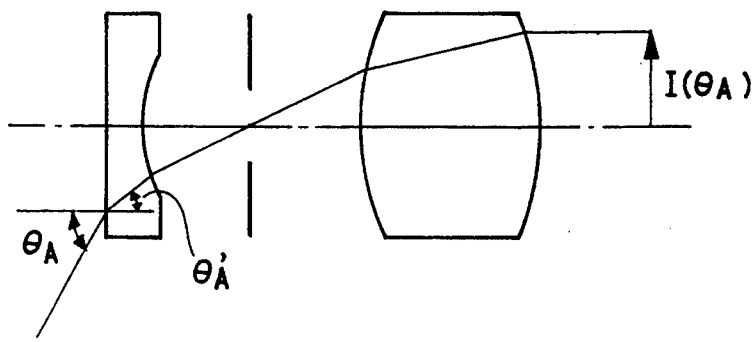
Figure 12A:
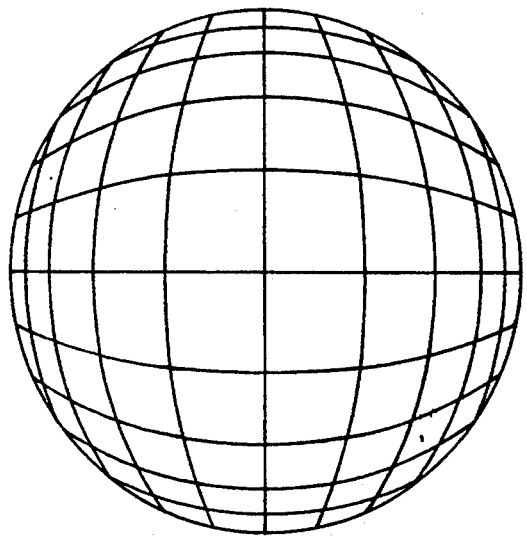
FIG. 12A and FIG. 12B show diagrams illustrating images of a lattice-like object which are formed in air and in water respectively by an objective lens system having distortion corrected in water.
Figure 12B:
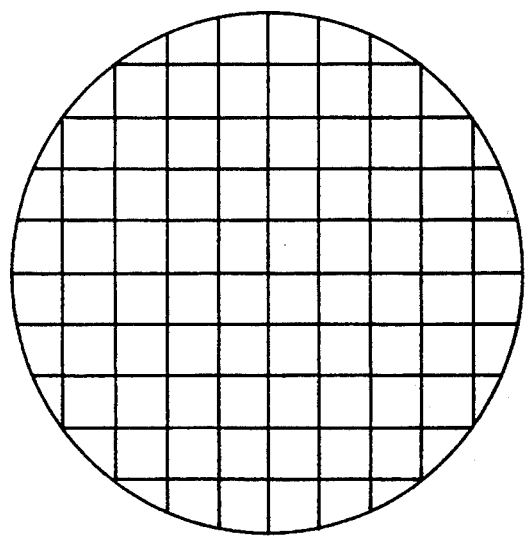
Figure 13:
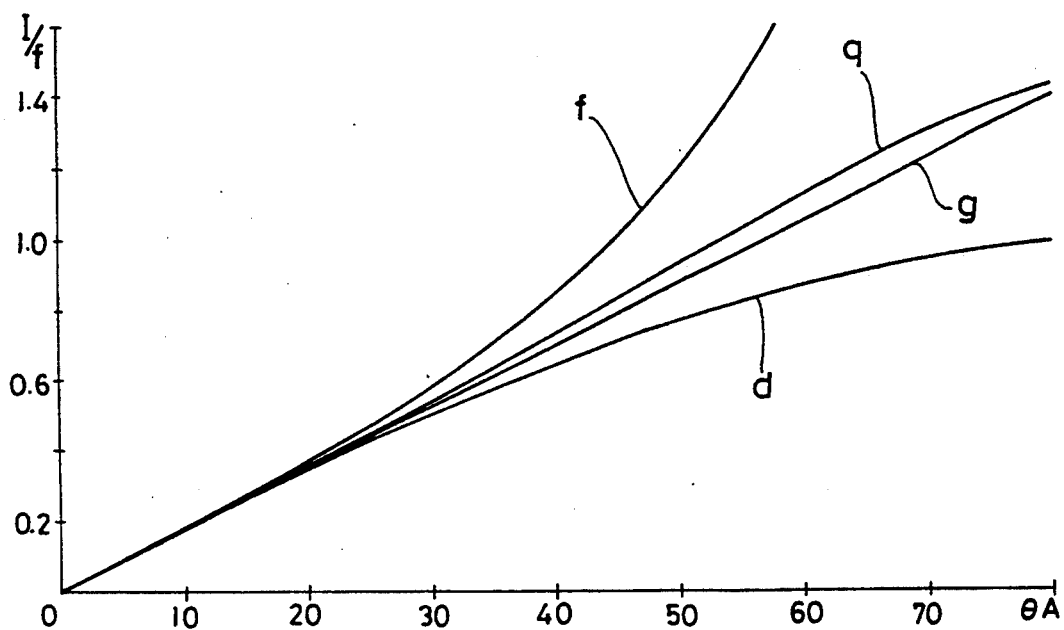
FIG. 13 shows graphs illustrating relationship between field angles of the conventional objective lens systems and image heights.
Figure 15A:
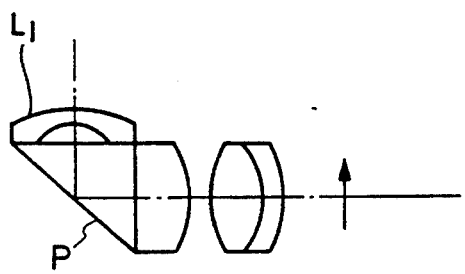
FIG. 15A, FIG. 15B and FIG. 15C show sectional views illustrating compositions of objective lens systems each of which comprises a prism disposed between a front diverging lens unit and a rear converging lens unit.
Figure 15B:
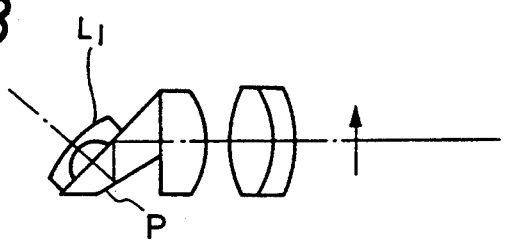
Figure 15C:
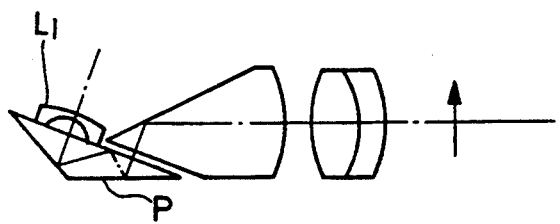
Figure 17:
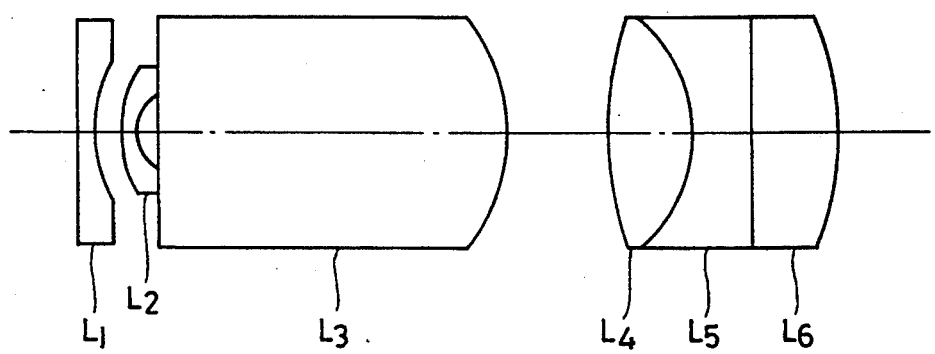
FIG. 17 shows a sectional view illustrating a composition of the objective lens system according to the present invention which adopts a rear converging lens unit comprising a cemented lens component consisting of three lens elements.

Now, the objective lens system for endoscopes according to the present invention will be described more detailedly below with reference to the preferred embodiments illustrated in the accompanying drawings and given in the form of the numerical data listed below:

Embodiment 1
f = 1.000, F number = 6.961
image height = 1.0823, object distance = −10.8225

$r_1 = \infty$
$d_1 = 0.2706$     $n_1 = 1.76820$  $\nu_1 = 71.79$
$r_2 = 1.8433$
$d_2 = 0.4221$
$r_3 = 3.2577$ (aspherical surface)
$d_3 = 0.2165$     $n_2 = 1.78472$  $\nu_2 = 25.71$
$r_4 = 0.7333$
$d_4 = 0.3383$
$r_5 = \infty$
$d_5 = 1.6380$     $n_3 = 1.77250$  $\nu_3 = 49.66$
$r_6 = \infty$ (position of aperture stop)
$d_6 = 3.6615$     $n_4 = 1.77250$  $\nu_4 = 49.66$
$r_7 = -2.6906$
$d_7 = 1.4223$
$r_8 = 4.5493$
$d_8 = 1.4801$     $n_5 = 1.51633$  $\nu_5 = 64.15$
$r_9 = -2.9294$
$d_9 = 0.9629$     $n_6 = 1.80518$  $\nu_6 = 25.43$
$r_{10} = \infty$
$d_{10} = 1.3293$  $n_7 = 1.56384$  $\nu_7 = 60.69$
$r_{11} = -4.0675$ (aspherical surface)
$d_{11} = 9.3723$
$r_{12} = 11.4502$
$d_{12} = 14.5455$ $n_8 = 1.63980$  $\nu_8 = 34.48$
$r_{13} = 4.6764$
$d_{13} = 14.4589$ $n_9 = 1.56883$  $\nu_9 = 56.34$
$r_{14} = -12.7132$
$d_{14} = 2.2727$
$r_{15} = 12.7132$
$d_{15} = 14.4589$ $n_{10} = 1.56883$ $\nu_{10} = 56.34$
$r_{16} = -4.6764$
$d_{16} = 14.5455$ $n_{11} = 1.63980$ $\nu_{11} = 34.48$
$r_{17} = -11.4502$
$d_{17} = 10.5952$
$r_{18} = 11.4502$
$d_{18} = 14.5455$ $n_{12} = 1.63980$ $\nu_{12} = 34.48$
$r_{19} = 4.6764$
$d_{19} = 14.4589$ $n_{13} = 1.56883$ $\nu_{13} = 56.34$
$r_{20} = -12.7132$
$d_{20} = 2.2727$
$r_{21} = 12.7132$
$d_{21} = 14.4589$ $n_{14} = 1.56883$ $\nu_{14} = 56.34$
$r_{22} = -4.6764$
$d_{22} = 14.5455$ $n_{15} = 1.63980$ $\nu_{15} = 34.48$
$r_{23} = -11.4502$
$d_{23} = 10.5952$
$r_{24} = 11.4502$
$d_{24} = 14.5455$ $n_{16} = 1.63980$ $\nu_{16} = 34.48$
$r_{25} = 4.6764$
$d_{25} = 14.4589$ $n_{17} = 1.56883$ $\nu_{17} = 56.34$
$r_{26} = -12.7132$
$d_{26} = 2.2727$
$r_{27} = 12.7132$
$d_{27} = 14.4589$ $n_{18} = 1.56883$ $\nu_{18} = 56.34$
$r_{28} = -4.6764$ $d_{28} = 14.5455$ $n_{19} = 1.63980$ $\nu_{19} = 34.48$
$r_{29} = -11.4502$
aspherical surface coefficients
(3rd surface) P = 1.0000, E = 0.23382
F = $-0.91809 \times 10^{-1}$, G = 0
(11th surface) P = $-0.5152$, E = $0.67273 \times 10^{-2}$
F = $0.13870 \times 10^{-2}$, G = $-0.35319 \times 10^{-3}$
$N_w \cdot f \cdot \tan[\sin^{-1}\{(J/N_1)\sin\theta_{A1}\}]/I_1 = 1.010$
$N_w \cdot f \cdot \tan[\sin^{-1}\{(1/N_1)\sin\theta_{A0.5}\}]/I_{0.5} = 1.009$
$f_2/f = 3.324$, $f_1/f = -0.710$, $f_{12}/f_{11} = 0.522$
$P_r = -0.51520$, $E_r f^3 = 0.00673$, $F_r f^5 = 0.00139$
$P_f = 1.00000$, $E_f f^3 = 0.23382$, $F_f f^5 = -0.09181$
$\Delta_r/f = 0.01477$, $\Delta_f/f = 0.01452$, $\Delta_r/\Delta_f = 1.01698$
$RH_1/I_1 = 0.881$ Embodiment 2
f = 1.000, F number = 7.032
image height = 1.0571, object distance = −10.5708

$r_1 = \infty$
$d_1 = 0.2643$     $n_1 = 1.76820$  $\nu_1 = 71.79$
$r_2 = 2.1832$
$d_2 = 0.4123$
$r_3 = 3.0632$ (aspherical surface)
$d_3 = 0.2114$     $n_2 = 1.78472$  $\nu_2 = 25.71$
$r_4 = 0.6417$
$d_4 = 0.3301$
$r_5 = \infty$
$d_5 = 1.5997$     $n_3 = 1.77250$  $\nu_3 = 49.66$
$r_6 = \infty$ (position of aperture stop)
$d_6 = 3.5764$     $n_4 = 1.77250$  $\nu_4 = 49.66$
$r_7 = -2.6424$
$d_7 = 1.3868$
$r_8 = 4.0577$
$d_8 = 1.4449$     $n_5 = 1.51633$  $\nu_5 = 64.15$
$r_9 = -2.8105$
$d_9 = 0.9521$     $n_6 = 1.80518$  $\nu_6 = 25.43$
$r_{10} = 11.3280$
$d_{10} = 1.3124$  $n_7 = 1.56384$  $\nu_7 = 60.69$
$r_{11} = -3.8026$ (aspherical surface)
aspherical surface coefficients
(3rd surface) P = 1.0000, E = 0.24601, F = $-0.10328$
G = 0
(11th surface) P = $-0.4753$, E = $0.63765 \times 10^{-2}$
F = $-0.28208 \times 10^{-3}$, G = $0.23367 \times 10^{-3}$
$N_w \cdot f \cdot \tan[\sin^{-1}\{(1/N_1)\sin\theta_{A1}\}]/I_1 = 1.040$
$N_w \cdot f \cdot \tan[\sin^{-1}\{(1/N_1)\sin\theta_{A0.5}\}]/I_{0.5} = 1.010$
$f_2/f = 3.324$, $f_1/f = -0.682$, $f_{12}/f_{11} = 0.379$
$P_r = -0.47530$, $E_r f^3 = 0.00638$, $F_r f^5 = -0.00028$
$P_f = 1.00000$, $E_f f^3 = 0.24601$, $F_f f^5 = -0.10328$
$\Delta_r/f = 0.01225$, $\Delta_f/f = 0.01494$, $\Delta_r/\Delta_f = 1.82053$
$RH_1/I_1 = 0.915$ Embodiment 3
f = 1.000, F number = 6.982
image height = 1.0341, object distance = −10.3413

$r_1 = \infty$
$d_1 = 0.2585$     $n_1 = 1.76820$  $\nu_1 = 71.79$
$r_2 = 1.8791$
$d_2 = 0.4033$
$r_3 = 3.1610$ (aspherical surface)
$d_3 = 0.2068$     $n_2 = 1.78472$  $\nu_2 = 25.71$
$r_4 = 0.6553$
$d_4 = 0.3213$
$r_5 = \infty$
$d_5 = 1.5612$     $n_3 = 1.77250$  $\nu_3 = 49.66$
$r_6 = \infty$ (position of aperture stop)
$d_6 = 3.5025$     $n_4 = 1.77250$  $\nu_4 = 49.66$
$r_7 = -2.5809$
$d_7 = 1.4198$
$r_8 = 4.5117$
$d_8 = 1.3243$     $n_5 = 1.51633$  $\nu_5 = 64.15$
$r_9 = -2.3261$
$d_9 = 0.8355$     $n_6 = 1.80518$  $\nu_6 = 25.43$
$r_{10} = \infty$
$d_{10} = 1.2068$  $n_7 = 1.56384$  $\nu_7 = 60.69$
$r_{11} = -3.7005$ (aspherical surface)
aspherical surface coefficients
(3rd surface) P = 1.0000, E = 0.24403, F = $-0.10295$
G = 0
(11th surface) P = $-0.1977$, E = $0.25649 \times 10^{-2}$
F = $-0.18360 \times 10^{-2}$, G = $-0.58170 \times 10^{-3}$
$N_w \cdot f \cdot \tan[\sin^{-1}\{(1/N_1)\sin\theta_{A1}\}]/I_1 = 1.063$
$N_w \cdot f \cdot \tan[\sin^{-1}\{(1/N_1)\sin\theta_{A0.5}\}]/I_{0.5} = 1.020$ -continued $f_2/f = 3.229$, $f_1/f = -0.653$, $f_{12}/f_{11} = 0.447$
$P_r = -0.19770$, $E_r f^3 = 0.00256$, $F_r f^5 = -0.00184$
$P_f = 1.00000$, $E_f f^3 = 0.24403$, $F_f f^5 = -0.10295$
$\Delta_r/f = 0.00794$, $\Delta_f/f = 0.01179$, $\Delta_r/\Delta_f = 0.67331$
$RH_1/I_1 = 0.880$ Embodiment 4
$f = 1.000$, F number = 7.191
image height = 1.0194, object distance = −10.1937

| | | |
|---|---|---|
| $r_1 = \infty$ | | |
| $d_1 = 0.2548$ | $n_1 = 1.76820$ | $\nu_1 = 71.79$ |
| $r_2 = 1.8887$ | | |
| $d_2 = 0.3975$ | | |
| $r_3 = 3.1113$ (aspherical surface) | | |
| $d_3 = 0.2039$ | $n_2 = 1.78472$ | $\nu_2 = 25.71$ |
| $r_4 = 0.6227$ | | |
| $d_4 = 0.3162$ | | |
| $r_5 = \infty$ | | |
| $d_5 = 1.5387$ | $n_3 = 1.77250$ | $\nu_3 = 49.66$ |
| $r_6 = \infty$ (position of aperture stop) | | |
| $d_6 = 3.4527$ | $n_4 = 1.77250$ | $\nu_4 = 49.66$ |
| $r_7 = -2.5603$ | | |
| $d_7 = 1.4003$ | | |
| $r_8 = 4.4048$ | | |
| $d_8 = 1.3049$ | $n_5 = 1.51633$ | $\nu_5 = 64.15$ |
| $r_9 = -2.2783$ | | |
| $d_9 = 0.9161$ | $n_6 = 1.80518$ | $\nu_6 = 25.43$ |
| $r_{10} = \infty$ | | |
| $d_{10} = 1.2700$ | $n_7 = 1.56384$ | $\nu_7 = 60.69$ |
| $r_{11} = -3.7531$ (aspherical surface) | | | aspherical surface coefficients
(3rd surface) $P = 1.0000$, $E = 0.25069$, $F = -0.12191$
$G = 0$
(11th surface) $P = -0.1864$, $E = 0.21158 \times 10^{-2}$
$F = -0.12969 \times 10^{-2}$, $G = -0.40633 \times 10^{-3}$
$N_w \cdot f \cdot \tan[\sin^{-1}\{(1/N_1)\sin\theta_{A1}\}]/I_1 = 1.086$
$N_w \cdot f \cdot \tan[\sin^{-1}\{(1/N_1)\sin\theta_{A0.5}\}]/I_{0.5} = 1.023$
$f_2/f = 3.325$, $f_1/f = -0.626$, $f_{12}/f_{11} = 0.418$
$P_r = -0.18640$, $E_r f^3 = 0.00212$, $F_r f^5 = -0.00130$
$P_f = 1.00000$, $E_f f^3 = 0.25069$, $F_f f^5 = -0.12191$
$\Delta_r/f = 0.00641$, $\Delta_f/f = 0.01083$, $\Delta_r/\Delta_f = 0.59151$
$RH_1/I_1 = 0.880$ Embodiment 5
$f = 1.000$, F number = 6.972
image height = 0.9940, object distance = −9.9403

| | | |
|---|---|---|
| $r_1 = \infty$ | | |
| $d_1 = 0.2485$ | $n_1 = 1.76820$ | $\nu_1 = 71.79$ |
| $r_2 = 1.9132$ | | |
| $d_2 = 0.3877$ | | |
| $r_3 = 3.0543$ (aspherical surface) | | |
| $d_3 = 0.1988$ | $n_2 = 1.78472$ | $\nu_2 = 25.71$ |
| $r_4 = 0.5842$ | | |
| $d_4 = 0.3061$ | | |
| $r_5 = \infty$ | | |
| $d_5 = 1.4979$ | $n_3 = 1.77250$ | $\nu_3 = 49.66$ |
| $r_6 = \infty$ (position of aperture stop) | | |
| $d_6 = 3.3695$ | $n_4 = 1.77250$ | $\nu_4 = 49.66$ |
| $r_7 = -2.4352$ | | |
| $d_7 = 1.4418$ | | |
| $r_8 = 4.0715$ | | |
| $d_8 = 1.3342$ | $n_5 = 1.51633$ | $\nu_5 = 64.15$ |
| $r_9 = -2.0505$ | | |
| $d_9 = 1.0438$ | $n_6 = 1.80518$ | $\nu_6 = 25.43$ |
| $r_{10} = \infty$ | | |
| $d_{10} = 1.3683$ | $n_7 = 1.56384$ | $\nu_7 = 60.69$ |
| $r_{11} = -3.8761$ (aspherical surface) | | | aspherical surface coefficients
(3rd surface) $P = 1.0000$, $E = 0.24395$, $F = -0.13368$
$G = 0$
(11th surface) $P = -0.0109$, $E = 0.89242 \times 10^{-3}$
$F = -0.10708 \times 10^{-2}$, $G = -0.35392 \times 10^{-3}$
$N_w \cdot f \cdot \tan[\sin^{-1}\{(1/N_1)\sin\theta_{A1}\}]/I_1 = 1.122$
$N_w \cdot f \cdot \tan[\sin^{-1}\{(1/N_1)\sin\theta_{A0.5}\}]/I_{0.5} = 1.030$
$f_2/f = 3.211$, $f_1/f = -0.598$, $f_{12}/f_{11} = 0.383$
$P_r = 0.01090$, $E_r f^3 = 0.00089$, $F_r f^5 = 0.00107$
$P_f = 1.00000$, $E_f f^3 = 0.24395$, $F_f f^5 = -0.13368$
$\Delta_r/f = 0.00371$, $\Delta_f/f = 0.00897$, $\Delta_r/\Delta_f = 0.41384$
$RH_1/I_1 = 0.880$ Embodiment 6
$f = 1.000$, F number = 7.046
image height = 1.2837, object distance = −12.8370

-continued

| | | |
|---|---|---|
| $r_1 = \infty$ | | |
| $d_1 = 0.3209$ | $n_1 = 1.76820$ | $\nu_1 = 71.79$ |
| $r_2 = 1.3846$ | | |
| $d_2 = 0.5006$ | | |
| $r_3 = 2.3736$ (aspherical surface) | | |
| $d_3 = 0.2567$ | $n_2 = 1.78472$ | $\nu_2 = 25.71$ |
| $r_4 = 0.8650$ | | |
| $d_4 = 0.3969$ | | |
| $r_5 = \infty$ | | |
| $d_5 = 1.9447$ | $n_3 = 1.77250$ | $\nu_3 = 49.66$ |
| $r_6 = \infty$ (position of aperture stop) | | |
| $d_6 = 4.3411$ | $n_4 = 1.77250$ | $\nu_4 = 49.66$ |
| $r_7 = -3.4553$ | | |
| $d_7 = 0.9922$ | | |
| $r_8 = 5.0053$ | | |
| $d_8 = 2.0117$ | $n_5 = 1.51633$ | $\nu_5 = 64.15$ |
| $r_9 = -4.7892$ | | |
| $d_9 = 1.1192$ | $n_6 = 1.80518$ | $\nu_6 = 25.43$ |
| $r_{10} = \infty$ | | |
| $d_{10} = 1.5694$ | $n_7 = 1.56384$ | $\nu_7 = 60.69$ |
| $r_{11} = -4.7932$ (aspherical surface) | | | aspherical surface coefficients
(3rd surface) $P = 1.0000$, $E = 0.16721$,
$F = -0.11591$, $G = 0$
(11th surface) $P = -0.3708$, $E = 0.47311 \times 10^{-2}$
$F = -0.16145 \times 10^{-2}$, $G = -0.27338 \times 10^{-3}$
$N_w \cdot f \cdot \tan[\sin^{-1}\{(1/N_1)\sin\theta_{A1}\}]/I_1 = 1.021$
$N_w \cdot f \cdot \tan[\sin^{-1}\{(1/N_1)\sin\theta_{A0.5}\}]/I_{0.5} = 1.011$
$f_2/f = 3.681$, $f_1/f = -0.764$, $f_{12}/f_{11} = 1.041$
$P_r = -0.37080$, $E_r f^3 = 0.00473$, $F_r f^5 = 0.00161$
$P_f = 1.00000$, $E_f f^3 = 0.16721$, $F_f f^5 = 0.00116$
$\Delta_r/f = 0.02248$, $\Delta_f/f = 0.02675$, $\Delta_r/\Delta_f = 0.84035$
$RH_1/I_1 = 0.924$ Embodiment 7
$f = 1.000$, F number = 6.882
image height = 1.2579, object distance = −12.5788

| | | |
|---|---|---|
| $r_1 = \infty$ | | |
| $d_1 = 0.3145$ | $n_1 = 1.76820$ | $\nu_1 = 71.79$ |
| $r_2 = 1.3292$ | | |
| $d_2 = 0.4906$ | | |
| $r_3 = 2.4656$ (aspherical surface) | | |
| $d_3 = 0.2516$ | $n_2 = 1.78472$ | $\nu_2 = 25.71$ |
| $r_4 = 0.8623$ | | |
| $d_4 = 0.3883$ | | |
| $r_5 = \infty$ | | |
| $d_5 = 1.9049$ | $n_3 = 1.77250$ | $\nu_3 = 49.66$ |
| $r_6 = \infty$ (position of aperture stop) | | |
| $d_6 = 4.2544$ | $n_4 = 1.77250$ | $\nu_4 = 49.66$ |
| $r_7 = -3.3930$ | | |
| $d_7 = 1.1394$ | | |
| $r_8 = 4.9754$ | | |
| $d_8 = 1.9720$ | $n_5 = 1.51633$ | $\nu_5 = 64.15$ |
| $r_9 = -4.6296$ | | |
| $d_9 = 1.1140$ | $n_6 = 1.80518$ | $\nu_6 = 25.43$ |
| $r_{10} = \infty$ | | |
| $d_{10} = 1.5528$ | $n_7 = 1.56384$ | $\nu_7 = 60..69$ |
| $r_{11} = -4.8590$ (aspherical surface) | | | aspherical surface coefficients
(3rd surface) $P = 1.0000$, $E = 0.17434$
$F = -0.11384 \times 10^{-1}$, $G = 0$
(11th surface) $P = -0.3517$, $E = 0.45110 \times 10^{-2}$
$F = -0.15651 \times 10^{-2}$, $G = -0.27550 \times 10^{-3}$
$N_w \cdot f \cdot \tan[\sin^{-1}\{(1/N_1)\sin\theta_{A1}\}]/I_1 = 1.042$
$N_w \cdot f \cdot \tan[\sin^{-1}\{(1/N_1)\sin\theta_{A0.5}\}]/I_{0.5} = 1.015$
$f_2/f = 3.702$, $f_1/f = -0.736$, $f_{12}/f_{11} = 1.049$
$P_r = -0.35170$, $E_r f^3 = 0.00451$, $F_r f^5 = 0.00157$
$P_f = 1.00000$, $E_f f^3 = 0.17434$, $F_f f^5 = -0.01138$
$\Delta_r/f = 0.01961$, $\Delta_f/f = 0.02280$, $\Delta_r/\Delta_f = 0.86026$
$RH_1/I_1 = 0.908$ Embodiment 8
$f = 1.000$, F number = 6.419
image height = 1.2315, object distance = −12.3153

| | | |
|---|---|---|
| $r_1 = \infty$ | | |
| $d_1 = 0.3079$ | $n_1 = 1.76820$ | $\nu_1 = 71.79$ |
| $r_2 = 1.2767$ | | |
| $d_2 = 0.4803$ | | |
| $r_3 = 2.5821$ (aspherical surface) | | |
| $d_3 = 0.2463$ | $n_2 = 1.78472$ | $\nu_2 = 25.71$ |
| $r_4 = 0.8572$ | | |
| $d_4 = 0.3796$ | | |
| $r_5 = \infty$ | | |

-continued

| | | |
|---|---|---|
| $d_5 = 1.8645$ | $n_3 = 1.77250$ | $\nu_3 = 49.66$ |
| $r_6 = \infty$ (position of aperture stop) | | |
| $d_6 = 4.1658$ | $n_4 = 1.77250$ | $\nu_4 = 49.66$ |
| $r_7 = -3.3283$ | | |
| $d_7 = 1.3009$ | | |
| $r_8 = 4.9327$ | | |
| $d_8 = 1.9317$ | $n_5 = 1.51633$ | $\nu_5 = 64.15$ |
| $r_9 = -4.4815$ | | |
| $d_9 = 1.1140$ | $n_6 = 1.80518$ | $\nu_6 = 25.43$ |
| $r_{10} = \infty$ | | |
| $d_{10} = 1.5405$ | $n_7 = 1.56384$ | $\nu_7 = 60.69$ |
| $r_{11} = -4.9443$ (aspherical surface) | | | aspherical surface coefficients
(3rd surface) $P = 1.0000$, $E = 0.18150$
$F = -0.26834 \times 10^{-1}$, $G = 0$
(11th surface) $P = -0.3237$, $E = 0.43451 \times 10^{-2}$
$F = -0.14583 \times 10^{-2}$, $G = -0.26273 \times 10^{-3}$
$N_w \cdot f \cdot \tan[\sin^{-1}\{(1/N_1)\sin\theta_{A1}\}]/I_1 = 1.064$
$N_w \cdot f \cdot \tan[\sin^{-1}\{(1/N_1)\sin\theta_{A0.5}\}]/I_{0.5} = 1.019$
$f_2/f = 3.726$, $f_1/f = -0.706$, $f_{12}/f_{11} = 1.050$
$P_r = -0.32370$, $E_r f^3 = 0.00435$, $F_r f^5 = 0.00146$
$P_f = 1.00000$, $E_f f^3 = 0.18150$, $F_f f^5 = -0.02683$
$\Delta_r/f = 0.01694$, $\Delta_f/f = 0.01939$, $\Delta_r/\Delta_f = 0.87368$
$RH_1/I_1 = 0.891$ Embodiment 9
$f = 1.000$, F number $= 6.892$
image height $= 1.2048$, object distance $= -12.0482$

| | | |
|---|---|---|
| $r_1 = \infty$ | | |
| $d_1 = 0.3012$ | $n_1 = 1.76820$ | $\nu_1 = 71.79$ |
| $r_2 = 1.2610$ | | |
| $d_2 = 0.4699$ | | |
| $r_3 = 2.9569$ (aspherical surface) | | |
| $d_3 = 0.2410$ | $n_2 = 1.78472$ | $\nu_2 = 25.71$ |
| $r_4 = 0.8227$ | | |
| $d_4 = 0.3765$ | | |
| $r_5 = \infty$ | | |
| $d_5 = 1.8272$ | $n_3 = 1.77250$ | $\nu_3 = 49.66$ |
| $r_6 = \infty$ (position of aperture stop) | | |
| $d_6 = 4.0723$ | $n_4 = 1.77250$ | $\nu_4 = 49.66$ |
| $r_7 = -3.1683$ | | |
| $d_7 = 1.5747$ | | |
| $r_8 = 4.8056$ | | |
| $d_8 = 1.7863$ | $n_5 = 1.51633$ | $\nu_5 = 64.15$ |
| $r_9 = -3.8637$ | | |
| $d_9 = 1.1775$ | $n_6 = 1.84666$ | $\nu_6 = 23.78$ |
| $r_{10} = 26.5208$ | | |
| $d_{10} = 1.5625$ | $n_7 = 1.56384$ | $\nu_7 = 60.69$ |
| $r_{11} = -4.4008$ (aspherical surface) | | | aspherical surface coefficients
(3rd surface) $P = 1.0000$, $E = 0.18429$
$F = -0.35216 \times 10^{-1}$, $G = 0$
(11th surface) $P = -0.2740$, $E = 0.37727 \times 10^{-2}$
$F = -0.11271 \times 10^{-2}$, $G = -0.22503 \times 10^{-3}$
$N_w \cdot f \cdot \tan[\sin^{-1}\{(1/N_1)\sin\theta_{A1}\}]/I_1 = 1.088$
$N_w \cdot f \cdot \tan[\sin^{-1}\{(1/N_1)\sin\theta_{A0.5}\}]/I_{0.5} = 1.026$
$f_2/f = 3.853$, $f_1/f = -0.654$, $f_{12}/f_{11} = 0.931$
$P_r = -0.27400$, $E_r f^3 = 0.00377$, $F_r f^5 = 0.00113$
$P_f = 1.00000$, $E_f f^3 = 0.18429$, $F_f f^5 = -0.03522$
$\Delta_r/f = 0.01446$, $\Delta_f/f = 0.01556$, $\Delta_r/\Delta_f = 0.92938$
$RH_1/I_1 = 0.872$ Embodiment 10
$f = 1.000$, F number $= 6.957$
image height $= 1.1655$, object distance $= -11.6550$

| | | |
|---|---|---|
| $r_1 = \infty$ | | |
| $d_1 = 0.2914$ | $n_1 = 1.76820$ | $\nu_1 = 71.79$ |
| $r_2 = 1.2952$ | | |
| $d_2 = 0.4546$ | | |
| $r_3 = 3.0903$ (aspherical surface) | | |
| $d_3 = 0.2331$ | $n_2 = 1.78472$ | $\nu_2 = 25.71$ |
| $r_4 = 0.8108$ | | |
| $d_4 = 0.3639$ | | |
| $r_5 = \infty$ | | |
| $d_5 = 1.7675$ | $n_3 = 1.77250$ | $\nu_3 = 49.66$ |
| $r_6 = \infty$ (position of aperture stop) | | |
| $d_6 = 3.9395$ | $n_4 = 1.77250$ | $\nu_4 = 49.66$ |
| $r_7 = -3.0726$ | | |
| $d_7 = 1.4999$ | | |
| $r_8 = 4.5400$ | | |
| $d_8 = 1.7282$ | $n_5 = 1.51633$ | $\nu_5 = 64.15$ |
| $r_9 = -3.7309$ | | |
| $d_9 = 1.1408$ | $n_6 = 1.84666$ | $\nu_6 = 23.78$ |
| $r_{10} = 30.8611$ | | |
| $d_{10} = 1.5032$ | $n_7 = 1.56384$ | $\nu_7 = 60.69$ |
| $r_{11} = -4.4508$ (aspherical surface) | | | aspherical surface coefficients
(3rd surface) $P = 1.0000$, $E = 0.19965$
$F = -0.10989$, $G = 0$
(11th surface) $P = -0.2539$, $E = 0.40453 \times 10^{-2}$
$F = -0.57476 \times 10^{-3}$, $G = -0.63055 \times 10^{-4}$
$N_w \cdot f \cdot \tan[\sin^{-1}\{(1/N_1)\sin\theta_{A1}\}]/I_1 = 1.124$
$N_w \cdot f \cdot \tan[\sin^{-1}\{(1/N_1)\sin\theta_{A0.5}\}]/I_{0.5} = 1.027$
$f_2/f = 3.683$, $f_1/f = -0.652$, $f_{12}/f_{11} = 0.870$
$P_r = -0.25390$, $E_r f^3 = 0.00405$, $F_r f^5 = 0.00057$
$P_f = 1.00000$, $E_f f^3 = 0.19965$, $F_f f^5 = -0.10989$
$\Delta_r/f = 0.01208$, $\Delta_f/f = 0.01369$, $\Delta_r/\Delta_f = 0.88266$
$RH_1/I_1 = 0.881$ Embodiment 11
$f = 1.000$, F number $= 6.839$
image height $= 1.0173$, object distance $= -10.1726$

| | | |
|---|---|---|
| $r_1 = \infty$ | | |
| $d_1 = 0.2543$ | $n_1 = 1.76820$ | $\nu_1 = 71.79$ |
| $r_2 = 1.9678$ | | |
| $d_2 = 0.3967$ | | |
| $r_3 = 3.1031$ (aspherical surface) | | |
| $d_3 = 0.2035$ | $n_2 = 1.78472$ | $\nu_2 = 25.71$ |
| $r_4 = 0.6328$ | | |
| $d_4 = 0.3161$ | | |
| $r_5 = \infty$ | | |
| $d_5 = 1.5361$ | $n_3 = 1.77250$ | $\nu_3 = 49.66$ |
| $r_6 = \infty$ (position of aperture stop) | | |
| $d_6 = 3.4451$ | $n_4 = 1.77250$ | $\nu_4$ 49.66 |
| $r_7 = -2.5356$ | | |
| $d_7 = 1.3888$ | | |
| $r_8 = 4.3532$ | | |
| $d_8 = 1.3020$ | $n_5 = 1.51633$ | $\nu_5 = 64.15$ |
| $r_9 = -2.3000$ | | |
| $d_9 = 0.8992$ | $n_6 = 1.80518$ | $\nu_6 = 25.43$ |
| $r_{10} = \infty$ | | |
| $d_{10} = 1.2544$ | $n_7 = 1.56384$ | $\nu_7 = 60.69$ |
| $r_{11} = -3.7375$ (aspherical surface) | | | aspherical surface coefficients
(3rd surface) $P = 1.0000$, $E = 0.25518$
$F = -0.11884$, $G = 0$
(11th surface) $P = -0.2343$, $E = 0.32156 \times 10^{-2}$
$F = -0.12975 \times 10^{-2}$, $G = -0.43564 \times 10^{-3}$
$N_w \cdot f \cdot \tan[\sin^{-1}\{(1/N_1)\sin\theta_{A1}\}]/I_1 = 1.062$
$N_w \cdot f \cdot \tan[\sin^{-1}\{(1/N_1)\sin\theta_{A0.5}\}]/I_{0.5} = 1.018$
$f_2/f = 3.198$, $f_1/f = -0.648$, $f_{12}/f_{11} = 0.396$
$P_r = -0.23430$, $E_r f^3 = 0.00322$, $F_r f^5 = 0.00130$
$P_f = 1.00000$, $E_f f^3 = 0.25518$, $F_f f^5 = -0.11884$
$\Delta_r/f = 0.00766$, $\Delta_f/f = 0.01135$, $\Delta_r/\Delta_f = 0.67515$
$RH_1/I_1 = 0.880$ Embodiment 12
$f = 1.000$, F number $= 6.966$
image height $= 1.0352$, object distance $= -10.3520$

| | | |
|---|---|---|
| $r_1 = \infty$ | | |
| $d_1 = 0.2588$ | $n_1 = 1.76820$ | $\nu_1 = 71.79$ |
| $r_2 = 2.1401$ | | |
| $d_2 = 0.4037$ | | |
| $r_3 = 2.5543$ (aspherical surface) | | |
| $d_3 = 0.2070$ | $n_2 = 1.78472$ | $\nu_2 = 25.71$ |
| $r_4 = 0.5708$ | | |
| $d_4 = 0.3106$ | | |
| $r_5 = \infty$ | | |
| $d_5 = 1.3763$ | $n_3 = 1.77250$ | $\nu_3 = 49.66$ |
| $r_6 = \infty$ (position of aperture stop) | | |
| $d_6 = 3.6971$ | $n_4 = 1.77250$ | $\nu_4 = 49.66$ |
| $r_7 = -2.5717$ | | |
| $d_7 = 2.0270$ | | |
| $r_8 = 4.0195$ | | |
| $d_8 = 1.4966$ | $n_5 = 1.56873$ | $\nu_5 = 63.16$ |
| $r_9 = -2.7906$ | | |
| $d_9 = 1.1387$ | $n_6 = 1.84666$ | $\nu_6 = 23.78$ |
| $r_{10} = \infty$ | | |
| $d_{10} = 0.7593$ | $n_7 = 1.5638A$ | $\nu_7 = 60.69$ |
| $r_{11} = -5.6376$ (aspherical surface) | | | aspherical surface coefficients
(3rd surface) $P = 1.0000$, $E = 0.19607$
$F = -0.12207 \times 10^{-1}$, $G = 0$
(11th surface) $P = -0.8118$, $E = 0.85868 \times 10^{-2}$
$F = -0.28924 \times 10^{-3}$, $G = -0.62463 \times 10^{-4}$
$N_w \cdot f \cdot \tan[\sin^{-1}\{(1/N_1)\sin\theta_{A1}\}]/I_1 = 1.064$ -continued $N_w \cdot f \cdot \tan[\sin^{-1}\{(1/N_1)\sin\theta_{A0.5}\}]/I_{0.5} = 1.018$
$f_2/f = 3.154, f_1/f = -0.632, f_{12}/f_{11} = 0.352$
$P_r = -0.81180, E_r f^3 = 0.00859, F_r f^5 = 0.00029$
$P_f = 1.00000, E_f f^3 = 0.19607, F_f f^5 = -0.01221$
$\Delta_r/f = 0.01108, \Delta_f/f = 0.0874, \Delta_r/\Delta_f = 1.26775$
$RH_1/I_1 = 0.882$ Embodiment 13
f = 1.000, F number = 6.123
image height = 1.0707, object distance = −10.7064

$r_1 = \infty$
$d_1 = 0.2677$        $n_1 = 1.76820$  $\nu_1 = 71.79$
$r_2 = 2.1738$
$d_2 = 0.4176$
$r_3 = 3.2983$ (aspherical surface)
$d_3 = 0.2141$        $n_2 = 1.78472$  $\nu_2 = 25.71$
$r_4 = 0.6084$
$d_4 = 0.3284$
$r_5 = \infty$
$d_5 = 1.6123$        $n_3 = 1.77250$  $\nu_3 = 49.66$
$r_6 = \infty$ (position of aperture stop)
$d_6 = 3.6304$        $n_4 = 1.77250$  $\nu_4 = 49.66$
$r_7 = -2.5021$
$d_7 = 1.4846$
$r_8 = 4.3220$
$d_8 = 1.4947$        $n_5 = 1.51633$  $\nu_5 = 64.15$
$r_9 = -2.3605$
$d_9 = 1.2848$        $n_6 = 1.84666$  $\nu_6 = 23.78$
$r_{10} = \infty$
$d_{10} = 1.3457$     $n_7 = 1.56384$  $\nu_7 = 60.69$
$r_{11} = -3.8908$ (aspherical surface)
aspherical surface coefficients
(3rd surface) P = 1.0000, E = 0.20224
$F = -0.12648 \times 10^{-1}, G = 0$
(11th surface) $P = -0.9672, E = 0.30557 \times 10^{-2}$
$F = -0.46831 \times 10^{-3}, G = -0.70924 \times 10^{-4}$
$N_w \cdot f \cdot \tan[\sin^{-1}\{(1/N_1)\sin\theta_{A1}\}]/I_1 = 1.066$
$N_w \cdot f \cdot \tan[\sin^{-1}\{(1/N_1)\sin\theta_{A0.5}\}]/I_{0.5} = 1.023$
$f_2/f = 3.383, f_1/f = -0.636, f_{12}/f_{11} = 0.348$
$P_r = -0.96720, E_r f^3 = 0.00306, F_r f^5 = 0.00047$
$P_f = 1.00000, E_f f^3 = 0.20224, F_f f^5 = -0.01265$
$\Delta_r/f = 0.00992, \Delta_f/f = 0.01284, \Delta_r/\Delta_f = 0.77259$
$RH_1/I_1 = 0.913$ Embodiment 14
f = 1.000, F number = 6.117
image height = 1.0515, object distance = −10.5152

$r_1 = \infty$
$d_1 = 0.2629$        $n_1 = 1.76820$  $\nu_1 = 71.79$
$r_2 = 2.1051$
$d_2 = 0.4101$
$r_3 = 2.6052$ (aspherical surface)
$d_3 = 0.2103$        $n_2 = 1.78472$  $\nu_2 = 25.71$
$r_4 = 0.5636$
$d_4 = 0.3155$
$r_5 = \infty$
$d_5 = 1.3957$        $n_3 = 1.77250$  $\nu_3 = 49.66$
$r_6 = \infty$ (position of aperture stop)
$d_6 = 3.7532$        $n_4 = 1.77250$  $\nu_4 = 49.66$
$r_7 = -2.7032$
$d_7 = 2.0574$
$r_8 = 3.9320$
$d_8 = 1.5110$        $n_5 = 1.56873$  $\nu_5 = 63.16$
$r_9 = -2.9100$
$d_9 = 1.1567$        $n_6 = 1.84666$  $\nu_6 = 23.78$
$r_{10} = 31.5457$
$d_{10} = 0.7755$     $n_7 = 1.56384$  $\nu_7 = 60.69$
$r_{11} = -5.3754$ (aspherical surface)
$d_{11} = 8.8328$
$r_{12} = 10.1630$
$d_{12} = 24.5426$    $n_8 = 1.58913$  $\nu_8 = 61.18$
$r_{13} = -5.4322$
$d_{13} = 1.2198$     $n_9 = 1.72342$  $\nu_9 = 37.95$
$r_{14} = -10.8107$
$d_{14} = 2.1030$
$r_{15} = 10.8107$
$d_{15} = 1.2198$     $n_{10} = 1.72342$  $\nu_{10} = 37.95$
$r_{16} = 5.4322$
$d_{16} = 24.5426$    $n_{11} = 1.58913$  $\nu_{11} = 61.18$
$r_{17} = -10.1630$
$d_{17} = 9.4637$
$r_{18} = 10.1630$
$d_{18} = 24.5426$    $n_{12} = 1.58913$  $\nu_{12} = 61.18$
$r_{19} = -5.4322$
$d_{19} = 1.2198$     $n_{13} = 1.72342$  $\nu_{13} = 37.95$
$r_{20} = -10.8107$
$d_{20} = 2.1030$
$r_{21} = 10.8107$
$d_{21} = 1.2198$     $n_{14} = 1.72342$  $\nu_{14} = 37.95$
$r_{22} = 5.4322$
$d_{22} = 24.5426$    $n_{15} = 1.58913$  $\nu_{15} = 61.18$
$r_{23} = -10.1630$
$d_{23} = 9.4637$
$r_{24} = 10.1630$
$d_{24} = 24.5426$    $n_{16} = 1.58913$  $\nu_{16} = 61.18$
$r_{25} = -5.4322$
$d_{25} = 1.2198$     $n_{17} = 1.72342$  $\nu_{17} = 37.95$
$r_{26} = -10.8107$
$d_{26} = 2.1030$
$r_{27} = 10.8107$
$d_{27} = 1.2198$     $n_{18} = 1.72342$  $\nu_{18} = 37.95$
$r_{28} = 5.4322$
$d_{28} = 24.5426$    $n_{19} = 1.58913$  $\nu_{19} = 61.18$
$r_{29} = -10.1630$
$d_{29} = 9.4637$
$r_{30} = 10.1630$
$d_{30} = 24.5426$    $n_{20} = 1.58913$  $\nu_{20} = 61.18$
$r_{31} = -5.4322$
$d_{31} = 1.2198$     $n_{21} = 1.72342$  $\nu_{21} = 37.95$
$r_{32} = -10.8107$
$d_{32} = 2.1030$
$r_{33} = 10.8107$
$d_{33} = 1.2198$     $n_{22} = 1.72342$  $\nu_{22} = 37.95$
$r_{34} = 5.4322$
$d_{34} = 24.5426$    $n_{23} = 1.58913$  $\nu_{23} = 61.18$
$r_{35} = -10.1630$
$d_{35} = 9.4637$
$r_{36} = 10.1630$
$d_{36} = 24.5426$    $n_{24} = 1.58913$  $\nu_{24} = 61.18$
$r_{37} = 5.4322$
$d_{37} = 1.2198$     $n_{25} = 1.72342$  $\nu_{25} = 37.95$
$r_{38} = -10.8107$
$d_{38} = 2.1030$
$r_{39} = 10.8107$
$d_{39} = 1.2198$     $n_{26} = 1.72342$  $\nu_{26} = 37.95$
$r_{40} = 5.4322$
$d_{40} = 24.5426$    $n_{27} = 1.58913$  $\nu_{27} = 61.18$
$r_{41} = -10.1630$
aspherical surface coefficients
(3rd surface) P = 1.0000, E = 0.19711
$F = -0.21332 \times 10^{-2}, G = 0$
(11th surface) $P = -1.6493, E = 0.80385 \times 10^{-2}$
$F = -0.43085 \times 10^{-3}, G = -0.75286 \times 10^{-4}$
$N_w \cdot f \cdot \tan[\sin^{-1}\{(1/N_1)\sin\theta_{A1}\}]/I_1 = 1.063$
$N_w \cdot f \cdot \tan[\sin^{-1}\{(1/N_1)\sin\theta_{A0.5}\}]/I_{0.5} = 1.022$
$f_2/f = 3.252, f_1/f = -0.616, f_{12}/f_{11} = 0.350$
$P_r = -1.64930, E_r f^3 = 0.00804, F_r f^5 = 0.00043$
$P_f = 1.00000, E_f f^3 = 0.19711, F_f f^5 = -0.00213$
$\Delta_r/f = 0.01205, \Delta_f/f = 0.00916, \Delta_r/\Delta_f = 1.31532$
$RH_1/I_1 = 0.880$ Embodiment 15
f = 1.000, F number = 6.969
image height = 0.9712, object distance = −10.6724

$r_1 = \infty$
$d_1 = 0.2668$        $n_1 = 1.76820$  $\nu_1 = 71.79$
$r_2 = 2.0538$
$d_2 = 0.4162$
$r_3 = 3.2136$ (aspherical surface)
$d_3 = 0.2135$        $n_2 = 1.78472$  $\nu_2 = 25.71$
$r_4 = 0.7646$
$d_4 = 0.3349$
$r_5 = \infty$
$d_5 = 1.6200$        $n_3 = 1.77250$  $\nu_3 = 49.66$
$r_6 = \infty$ (position of aperture stop)
$d_6 = 3.6059$        $n_4 = 1.77250$  $\nu_4 = 49.66$
$r_7 = -2.5270$
$d_7 = 1.3099$
$r_8 = 3.6394$
$d_8 = 1.4301$        $n_5 = 1.51633$  $\nu_5 = 64.15$
$r_9 = -2.6704$
$d_9 = 0.8834$        $n_6 = 1.84666$  $\nu_6 = 23.78$
$r_{10} = \infty$
$d_{10} = 1.2378$     $n_7 = 1.56384$  $\nu_7 = 60.69$ $r_{11} = -4.2449$ (aspherical surface)
$d_{11} = 5.4749$
$r_{12} = 12.1398$
$d_{12} = 25.6137$         $n_8 = 1.62004$  $\nu_8 = 36.25$
$r_{13} = \infty$
$d_{13} = 1.8036$
$r_{14} = 16.4952$
$d_{14} = 2.8282$          $n_9 = 1.65160$  $\nu_9 = 58.67$
$r_{15} = -3.7268$
$d_{15} = 1.4408$          $n_{10} = 1.80610$  $\nu_{10} = 40.95$
$r_{16} = -8.3244$
$d_{16} = 2.9989$
$r_{17} = \infty$
$d_{17} = 25.6137$         $n_{11} = 1.62004$  $\nu_{11} = 36.25$
$r_{18} = -12.1398$
$d_{18} = 4.2689$
$r_{19} = 12.1398$
$d_{19} = 25.6137$         $n_{12} = 1.62004$  $\nu_{12} = 36.25$
$r_{20} = \infty$
$d_{20} = 1.8036$
$r_{21} = 16.4952$
$d_{21} = 2.8282$          $n_{13} = 1.65160$  $\nu_{13} = 58.67$
$r_{22} = -3.7268$
$d_{22} = 1.4408$          $n_{14} = 1.80610$  $\nu_{14} = 40.95$
$r_{23} = -8.3244$
$d_{23} = 2.9989$
$r_{24} = \infty$
$d_{24} = 25.6137$         $n_{15} = 1.62004$  $\nu_{15} = 36.25$
$r_{25} = -12.1398$
$d_{25} = 4.2689$
$r_{26} = 12.1398$
$d_{26} = 25.6137$         $n_{16} = 1.62004$  $\nu_{16} = 36.25$
$r_{27} = \infty$
$d_{27} = 1.8036$
$r_{28} = 16.4952$
$d_{28} = 2.8282$          $n_{17} = 1.65160$  $\nu_{17} = 58.67$
$r_{29} = -3.7268$
$d_{29} = 1.4408$          $n_{18} = 1.80610$  $\nu_{18} = 40.95$
$r_{30} = -8.3244$
$d_{30} = 2.9989$
$r_{31} = \infty$
$d_{31} = 25.6137$         $n_{19} = 1.62004$  $\nu_{19} = 36.25$
$r_{32} = -12.1398$
aspherical surface coefficients
(3rd surface) $P = 1.0000$, $E = 0.13167$
$F = -0.32093 \times 10^{-1}$, $G = 0$
(11th surface) $P = -1.0302$, $E = 0.11359 \times 10^{-1}$
$F = -0.24794 \times 10^{-2}$, $G = -0.56402 \times 10^{-3}$
$N_w \cdot f \cdot \tan[\sin^{-1}\{(1/N_1)\sin\theta_{A1}\}]/I_1 = 1.064$
$N_w \cdot f \cdot \tan[\sin^{-1}\{(1/N_1)\sin\theta_{A0.5}\}]/I_{0.5} = 1.014$
$f_2/f = 3.014$, $f_1/f = -0.776$, $f_{12}/f_{11} = 0.497$
$P_r = -1.03020$, $E_r f^3 = 0.01136$, $F_r f^5 = 0.00248$
$P_f = 1.00000$, $E_f f^3 = 0.13167$, $F_f f^5 = -0.03209$
$\Delta_r/f = 0.01146$, $\Delta_f/f = 0.00761$, $\Delta_r/\Delta_f = 1.50605$
$RH_1/I_1 = 0.949$ Embodiment 16
$f = 1.000$, F number $= -6.957$
image height $= 1.0202$, object distance $= -11.2107$ $r_1 = \infty$
$d_1 = 0.2803$             $n_1 = 1.76820$  $\nu_1 = 71.79$
$r_2 = 2.0816$
$d_2 = 0.4373$
$r_3 = 3.3761$ (aspherical surface)
$d_3 = 0.2242$             $n_2 = 1.78472$  $\nu_2 = 25.71$
$r_4 = 0.7676$
$d_4 = 0.3525$
$r_5 = \infty$
$d_5 = 1.7018$             $n_3 = 1.77250$  $\nu_3 = 49.66$
$r_6 = \infty$ (position of aperture stop)
$d_6 = 3.7877$             $n_4 = 1.77250$  $\nu_4 = 49.66$
$r_7 = -2.6453$
$d_7 = 1.3850$
$r_8 = 3.9137$
$d_8 = 1.5248$             $n_5 = 1.51633$  $\nu_5 = 64.15$
$r_9 = -2.9057$
$d_9 = 0.9492$             $n_6 = 1.84666$  $\nu_6 = 23.78$
$r_{10} = \infty$
$d_{10} = 1.3161$          $n_7 = 1.56384$  $\nu_7 = 60.69$
$r_{11} = -4.3545$ (aspherical surface)
aspherical surface coefficients
(3rd surface) $P = 1.0000$, $E = 0.11562$
$F = -0.22734 \times 10^{-1}$, $G = 0$
(11th surface) $P = -1.1846$, $E = 0.11470 \times 10^{-1}$
$F = -0.19759 \times 10^{-2}$, $G = -0.43484 \times 10^{-3}$
$N_w \cdot f \cdot \tan[\sin^{-1}\{(1/N_1)\sin\theta_{A1}\}]/I_1 = 1.065$
$N_w \cdot f \cdot \tan[\sin^{-1}\{(1/N_1)\sin\theta_{A0.5}\}]/I_{0.5} = 1.014$
$f_2/f = 3.190$, $f_1/f = -0.770$, $f_{12}/f_{11} = 0.486$
$P_r = -1.18460$, $E_r f^3 = 0.01147$, $F_r f^5 = 0.00198$
$P_f = 1.00000$, $E_f f^3 = 0.11562$, $F_f f^5 = -0.02273$
$\Delta_r/f = 0.01432$, $\Delta_f/f = 0.00837$, $\Delta_r/\Delta_f = 1.71095$
$RH_1/I_1 = 0.968$ Embodiment 17
$f = 1.000$, F number $= 7.121$
image height $= 1.2315$, object distance $= -12.3153$ $r_1 = \infty$
$d_1 = 0.3079$             $n_1 = 1.76820$  $\nu_1 = 71.79$
$r_2 = 1.2890$
$d_2 = 0.4803$
$r_3 = 2.8820$ (aspherical surface)
$d_3 = 0.2463$             $n_2 = 1.78472$  $\nu_2 = 25.71$
$r_4 = 0.8189$
$d_4 = 0.3853$
$r_5 = \infty$
$d_5 = 1.8680$             $n_3 = 1.77250$  $\nu_3 = 49.66$
$r_6 = \infty$ (position of aperture stop)
$d_6 = 4.1624$             $n_4 = 1.77250$  $\nu_4 = 49.66$
$r_7 = -3.2267$
$d_7 = 1.6246$
$r_8 = 4.9893$
$d_8 = 1.8261$             $n_5 = 1.51633$  $\nu_5 = 64.15$
$r_9 = -3.9785$
$d_9 = 1.1977$             $n_6 = 1.84666$  $\nu_6 = 23.78$
$r_{10} = 22.2049$
$d_{10} = 1.5955$          $n_7 = 1.56384$  $\nu_7 = 60.69$
$r_{11} = -4.3091$ (aspherical surface)
aspherical surface coefficients
(3rd surface) $P = 1.0000$, $E = 0.17648$
$F = -0.26174 \times 10^{-1}$, $G = 0$
(11th surface) $P = -1.2863$, $E = 0.37904 \times 10^{-2}$
$F = -0.15203 \times 10^{-2}$, $G = -0.31287 \times 10^{-3}$
$N_w \cdot f \cdot \tan[\sin^{-1}\{(1/N_1)\sin\theta_{A1}\}]/I_1 = 1.064$
$N_w \cdot f \cdot \tan[\sin^{-1}\{(1/N_1)\sin\theta_{A0.5}\}]/I_{0.5} = 1.020$
$f_2/f = 3.966$, $f_1/f = -0.662$, $f_{12}/f_{11} = 0.917$
$P_r = -1.28630$, $E_r f^3 = 0.00379$, $F_r f^5 = 0.00152$
$P_f = 1.00000$, $E_f f^3 = 0.17648$, $F_f f^5 = -0.02617$
$\Delta_r/f = 0.01716$, $\Delta_f/f = 0.01632$, $\Delta_r/\Delta_f = 1.05156$
$RH_1/I_1 = 0.873$ Embodiment 18
$f = 1.000$, F number $= 6.978$
image height $= 1.2315$, object distance $= -12.3153$ $r_1 = \infty$
$d_1 = 0.3079$             $n_1 = 1.76820$  $\nu_1 = 71.79$
$r_2 = 1.2652$
$d_2 = 0.4803$
$r_3 = 2.9281$ (aspherical surface)
$d_3 = 0.2463$             $n_2 = 1.78472$  $\nu_2 = 25.71$
$r_4 = 0.8223$
$d_4 = 0.3850$
$r_5 = \infty$
$d_5 = 1.8679$             $n_3 = 1.77250$  $\nu_3 = 49.66$
$r_6 = \infty$ (position of aperture stop)
$d_6 = 4.1626$             $n_4 = 1.77250$  $\nu_4 = 49.66$
$r_7 = -3.2354$
$d_7 = 1.6265$
$r_8 = 4.9708$
$d_8 = 1.8256$             $n_5 = 1.51633$  $\nu_5 = 64.15$
$r_9 = -3.9488$
$d_9 = 1.2017$             $n_6 = 1.84666$  $\nu_6 = 23.78$
$r_{10} = 23.4199$
$d_{10} = 1.6019$          $n_7 = 1.56384$  $\nu_7 = 60.69$
$r_{11} = -4.3643$ (aspherical surface)
aspherical surface coefficients
(3rd surface) $P = 1.0000$, $E = 0.17506$
$F = -0.27795 \times 10^{-2}$, $G = 0$
(11th surface) $P = -1.2850$, $E = 0.37047 \times 10^{-2}$
$F = -0.13122 \times 10^{-2}$, $G = -0.27698 \times 10^{-3}$
$N_w \cdot f \cdot \tan[\sin^{-1}\{(1/N_1)\sin\theta_{A1}\}]/I_1 = 1.064$
$N_w \cdot f \cdot \tan[\sin^{-1}\{(1/N_1)\sin\theta_{A0.5}\}]/I_{0.5} = 1.022$
$f_2/f = 3.969$, $f_1/f = -0.654$, $f_{12}/f_{11} = 0.933$
$P_r = -0.28500$, $E_r f^3 = 0.00370$, $F_r f^5 = 0.00131$
$P_f = 1.00000$, $E_f f^3 = 0.17506$, $F_f f^5 = -0.00278$
$\Delta_r/f = 0.01624$, $\Delta_f/f = 0.01693$, $\Delta_r/\Delta_f = 0.95900$ -continued

RH$_1$/I$_1$ = 0.869

Embodiment 19
f = 1.000, F number = 7.000
image height = 0.8543, object distance = −8.9928 r$_1$ = ∞
d$_1$ = 0.2698        n$_1$ = 1.76820   ν$_1$ = 71.79
r$_2$ = ∞
d$_2$ = 0.0899
r$_3$ = 4.9254 (aspherical surface)
d$_3$ = 0.1799        n$_2$ = 1.78472   ν$_2$ = 25.71
r$_4$ = 0.5414
d$_4$ = 0.2698
r$_5$ = ∞
d$_5$ = 1.3427        n$_3$ = 1.78800   ν$_3$ = 47.38
r$_6$ = ∞ (position of aperture stop)
d$_6$ = 3.1177        n$_4$ = 1.78800   ν$_4$ = 47.38
r$_7$ = −1.9838
d$_7$ = 0.0899
r$_8$ = 28.5890
d$_8$ = 1.2680        n$_5$ = 1.51633   ν$_5$ = 64.15
r$_9$ = −1.4460
d$_9$ = 0.9263        n$_6$ = 1.84666   ν$_6$ = 23.78
r$_{10}$ = −3.6133
d$_{10}$ = 0.1799
r$_{11}$ = 7.2932
d$_{11}$ = 0.6115     n$_7$ = 1.78472   ν$_7$ = 25.68
r$_{12}$ = 1.5126
d$_{12}$ = 1.1511     n$_8$ = 1.85026   ν$_8$ = 32.28
r$_{13}$ = 10.1250
aspherical surface coefficients
(3rd surface) P = 1.0000, E = 0.92890 × 10$^{-1}$
F = −0.13021 × 10$^{-2}$, G = 0.97914 × 10$^{-8}$
N$_w$ · f · tan [sin$^{-1}${(1/N$_1$)sinθ$_{A1}$}]/I$_1$ = 1.044
N$_w$ · f · tan [sin$^{-1}${(1/N$_1$)sinθ$_{A0.5}$}]/I$_{0.5}$ = 1.017
f$_2$/f = 2.257, f$_1$/f = −0.788, P$_f$ = 1.00000
E$_f$f$^3$ = 0.09289, F$_f$f$^5$ = −0.00130, Δ$_f$/f = 0.0059
RH$_1$/I$_1$ = 0.872

Embodiment 20
f = 1.000, F number = 7.007
image height = 0.8418, object distance = −8.4173 r$_1$ = ∞
d$_1$ = 0.2525        n$_1$ = 1.76820   ν$_1$ = 71.79
r$_2$ = ∞
d$_2$ = 0.0842
r$_3$ = 4.6103 (aspherical surface)
d$_3$ = 0.1684        n$_2$ = 1.78472   ν$_2$ = 25.71
r$_4$ = 0.5067
d$_4$ = 0.2525
r$_5$ = ∞
d$_5$ = 1.5859        n$_3$ = 1.78800   ν$_3$ = 47.38
r$_6$ = ∞ (position of aperture stop)
d$_6$ = 3.2374        n$_4$ = 1.78800   ν$_4$ = 47.38
r$_7$ = −1.9672
d$_7$ = 0.1684
r$_8$ = 2.4747
d$_8$ = 1.2290        n$_5$ = 1.58913   ν$_5$ = 61.18
r$_9$ = −1.9327
d$_9$ = 0.4209        n$_6$ = 1.78472   ν$_6$ = 25.71
r$_{10}$ = −27.2576
d$_{10}$ = 0.8502
r$_{11}$ = −1.1978
d$_{11}$ = 0.6734     n$_7$ = 1.78472   ν$_7$ = 25.71
r$_{12}$ = ∞
d$_{12}$ = 0.6734     n$_8$ = 1.77250   ν$_8$ = 49.66
r$_{13}$ = 1.8375
aspherical surface coefficients
(3rd surface) P = 1.0000, E = 0.11327
F = −0.18122 × 10$^{-2}$, G = 0.15554 × 10$^{-7}$
N$_w$ · f · tan [sin$^{-1}${(1/N$_1$)sinθ$_{A1}$}]/I$_1$ = 1.047
N$_w$ · f · tan [sin$^{-1}${(1/N$_1$)sinθ$_{A0.5}$}]/I$_{0.5}$ = 1.019
f$_2$/f = 2.474, f$_1$/f = −0.739, P$_f$ = 1.00000
E$_f$f$^3$ = 0.11327, F$_f$f$^5$ = −0.00181, Δ$_f$/f = 0.00640
RH$_1$/I$_1$ = 0.866

Embodiment 21
f = 1.000, F number = −7.044
image height = 1.0163, object distance = −10.1626 r$_1$ = 20.3252
d$_1$ = 0.2541        n$_1$ = 1.76820   ν$_1$ = 71.79
r$_2$ = 1.8042
d$_2$ = 0.3964 r$_3$ = 3.1037 (aspherical surface)
d$_3$ = 0.2033        n$_2$ = 1.78472   ν$_2$ = 25.71
r$_4$ = 0.6243
d$_4$ = 0.3156
r$_5$ = ∞
d$_5$ = 1.5345        n$_3$ = 1.77250   ν$_3$ = 49.66
r$_6$ = ∞ (position of aperture stop)
d$_6$ = 3.4418        n$_4$ = 1.77250   ν$_4$ = 49.66
r$_7$ = −2.5249
d$_7$ = 1.3854
r$_8$ = 4.3431
d$_8$ = 1.3013        n$_5$ = 1.51633   ν$_5$ = 64.15
r$_9$ = −2.2946
d$_9$ = 0.8931        n$_6$ = 1.80518   ν$_6$ = 25.43
r$_{10}$ = ∞
d$_{10}$ = 1.2486     n$_7$ = 1.56384   ν$_7$ = 60.69
r$_{11}$ = −3.7583 (aspherical surface)
aspherical surface coefficients
(3rd surface) P = 1.0000, E = 0.25516
F = −0.12031, G = 0
(11th surface) P = −0.2112, E = 0.28328 × 10$^{-2}$
F = −0.13314 × 10$^{-2}$, G = −0.40308 × 10$^{-3}$
N$_w$ · f · tan [sin$^{-1}${(1/N$_1$)sinθ$_{A1}$}]/I$_1$ = 1.035
N$_w$ · f · tan [sin$^{-1}${(1/N$_1$)sinθ$_{A0.5}$}]/I$_{0.5}$ = 1.015
f$_2$/f = 3.183, f$_1$/f = −0.645, f$_{12}$/f$_{11}$ = 0.398
r$_2$r$_1$ = 0.089, P$_r$ = −0.21120, E$_r$f$^3$ = 0.00283
F$_r$f$^5$ = 0.00133, P$_f$ = 1.00000, E$_f$f$^3$ = 0.25516
F$_f$f$^5$ = −0.12031, Δ$_r$/f = 0.00719, Δ$_f$/f = 0.01152
Δ$_r$/Δ$_f$ = 0.62399, RH$_1$/I$_1$ = 0.884

Embodiment 22
f = 1.000, F number = 6.904
image height = 1.0466, object distance = −10.4660 r$_1$ = −20.9325
d$_1$ = 0.2617        n$_1$ = 1.76820   ν$_1$ = 71.79
r$_2$ = 2.0703
d$_2$ = 0.4082
r$_3$ = 3.1899 (aspherical surface)
d$_3$ = 0.2093        n$_2$ = 1.78472   ν$_2$ = 25.71
r$_4$ = 0.6724
d$_4$ = 0.3253
r$_5$ = ∞
d$_5$ = 1.5805        n$_3$ = 1.77250   ν$_3$ = 49.66
r$_6$ = ∞ (position of aperture stop)
d$_6$ = 3.5444        n$_4$ = 1.77250   ν$_4$ = 49.66
r$_7$ = −2.5782
d$_7$ = 1.4285
r$_8$ = 4.5018
d$_8$ = 1.3464        n$_5$ = 1.51633   ν$_5$ = 64.15
r$_9$ = −2.3994
d$_9$ = 0.9222        n$_6$ = 1.80518   ν$_6$ = 25.43
r$_{10}$ = ∞
d$_{10}$ = 1.2880     n$_7$ = 1.56384   ν$_7$ = 60.69
r$_{11}$ = −3.8254 (aspherical surface)
aspherical surface coefficients
(3rd surface) P = 1.0000, E = 0.23739
F = −0.99493 × 10$^{-1}$, G = 0
(11th surface) P = −0.2823, E = 0.40717 × 10$^{-2}$
F = −0.11266 × 10$^{-2}$, G = −0.37668 × 10$^{-3}$
N$_w$ · f · tan [sin$^{-1}${(1/N$_1$)sinθ$_{A1}$}]/I$_1$ = 1.099
N$_w$ · f · tan [sin$^{-1}${(1/N$_1$)sinθ$_{A0.5}$}]/I$_{0.5}$ = 1.023
f$_2$/f = 3.268, f$_1$/f = −0.664, f$_{12}$/f$_{11}$ = 0.462
r$_2$r$_1$ = 0.099, P$_r$ = −0.28230, E$_r$f$^3$ = 0.00407
F$_r$f$^5$ = 0.00113, P$_f$ = 1.00000, E$_f$f$^3$ = 0.23739
F$_f$f$^5$ = −0.09949, Δ$_r$/f = 0.00937, Δ$_f$/f = 0.01203
Δ$_r$/Δ$_f$ = 0.77927, RH$_1$/I$_1$ = 0.883

Embodiment 23
f = 1.000, F number = 7.029
image height = 0.8375, object distance = −16.7504 r$_1$ = ∞
d$_1$ = 0.2094        n$_1$ = 1.76820   ν$_1$ = 71.79
r$_2$ = 4.3559
d$_2$ = 0.2010
r$_3$ = ∞
d$_3$ = 0.1675        n$_2$ = 1.78800   ν$_2$ = 47.43
r$_4$ = 0.5268
d$_4$ = 0.2513
r$_5$ = ∞
d$_5$ = 1.5662        n$_3$ = 1.78800   ν$_3$ = 47.43
r$_6$ = ∞ (position of aperture stop)
d$_6$ = 2.5159        n$_4$ = 1.78800   ν$_4$ = 47.38
r$_7$ = −1.9079

-continued $d_7 = 0.0838$
$r_8 = 3.4045$
$d_8 = 1.1725$    $n_5 = 1.64000$   $\nu_5 = 60.09$
$r_9 = -1.5067$
$d_9 = 0.4188$    $n_6 = 1.84666$   $\nu_6 = 23.88$
$r_{10} = -6.3149$
$d_{10} = 0.9715$
$r_{11} = -2.1935$
$d_{11} = 1.9598$    $n_7 = 1.72825$   $\nu_7 = 28.46$
$r_{12} = \infty$
$d_{12} = 1.0218$    $n_8 = 1.77250$   $\nu_8 = 49.66$
$r_{13} = -3.2295$
$r_2/r_1 = 0$, $f_{11}/f_{12} = 8.475$, $|f_1/f| = 0.571$
$f_2/f = 2.985$, $h_1I_{max} = 0.929$ Embodiment 24
$f = 1.000$, F number = 6.985
image height = 0.8511, object distance = $-17.0213$ $r_1 = \infty$
$d_1 = 0.2128$    $n_1 = 1.76820$   $\nu_1 = 71.79$
$r_2 = 7.7761$
$d_2 = 0.2043$
$r_3 = \infty$
$d_3 = 0.1702$    $n_2 = 1.80440$   $\nu_2 = 39.58$
$r_4 = 0.5628$
$d_4 = 0.2553$
$r_5 = \infty$
$d_5 = 1.5915$    $n_3 = 1.78800$   $\nu_3 = 47.43$
$r_6 = \infty$ (position of aperture stop)
$d_6 = 2.5561$    $n_4 = 1.78800$   $\nu_4 = 47.38$
$r_7 = -1.9303$
$d_7 = 0.1280$
$r_8 = 3.4711$
$d_8 = 1.1916$    $n_5 = 1.60311$   $\nu_5 = 60.70$
$r_9 = -1.7822$
$d_9 = 0.4257$    $n_6 = 1.84666$   $\nu_6 = 23.78$
$r_{10} = -3.2985$
$d_{10} = 0.9362$
$r_{11} = -1.2017$
$d_{11} = 1.2461$    $n_7 = 1.78472$   $\nu_7 = 25.71$
$r_{12} = \infty$
$d_{12} = 0.7800$    $n_8 = 1.71300$   $\nu_8 = 53.84$
$r_{13} = -2.0041$
$d_{13} = 5.8723$
$r_{14} = 9.0043$
$d_{14} = 11.4383$    $n_9 = 1.63980$   $\nu_9 = 34.48$
$r_{15} = 3.6774$
$d_{15} = 11.3702$    $n_{10} = 1.56883$   $\nu_{10} = 56.34$
$r_{16} = -9.9974$
$d_{16} = 1.7872$
$r_{17} = 9.9974$
$d_{17} = 11.3702$    $n_{11} = 1.56883$   $\nu_{11} = 56.34$
$r_{18} = 3.6774$
$d_{18} = 11.4383$    $n_{12} = 1.63980$   $\nu_{12} = 34.48$
$r_{19} = -9.0043$
$d_{19} = 8.3319$
$r_{20} = 9.0043$
$d_{20} = 11.4383$    $n_{13} = 1.63980$   $\nu_{13} = 34.48$
$r_{21} = 3.6774$
$d_{21} = 11.3702$    $n_{14} = 1.56883$   $\nu_{14} = 56.34$
$r_{22} = -9.9974$
$d_{22} = 1.7872$
$r_{23} = 9.9974$
$d_{23} = 11.3702$    $n_{15} = 1.56883$   $\nu_{15} = 56.34$
$r_{24} = -3.6774$
$d_{24} = 11.4383$    $n_{16} = 1.63980$   $\nu_{16} = 34.48$
$r_{25} = -9.0043$
$d_{25} = 8.3319$
$r_{26} = 9.0043$
$d_{26} = 11.4383$    $n_{17} = 1.63980$   $\nu_{17} = 34.48$
$r_{27} = 3.6774$
$d_{27} = 11.3702$    $n_{11} = 1.56883$   $\nu_{18} = 56.34$
$r_{28} = -9.9974$
$d_{28} = 1.7872$
$r_{29} = 9.9974$
$d_{29} = 11.3702$    $n_{19} = 1.56883$   $\nu_{19} = 56.34$
$r_{30} = -3.6774$
$d_{30} = 11.4383$    $n_{20} = 1.63980$   $\nu_{20} = 34.48$
$r_{31} = -9.0043$
$d_{31} = 8.3404$
$r_{32} = 9.0043$
$d_{32} = 11.4383$    $n_{21} = 1.63980$   $\nu_{21} = 34.48$ -continued $r_{33} = 3.6774$
$d_{33} = 11.3702$    $n_{22} = 1.56883$   $\nu_{22} = 56.34$
$r_{34} = -9.9974$
$d_{34} = 1.7872$
$r_{35} = 9.9974$
$d_{35} = 11.3702$    $n_{23} = 1.56883$   $\nu_{23} = 56.34$
$r_{36} = -3.6774$
$d_{36} = 11.4383$    $n_{24} = 1.63980$   $\nu_{24} = 34.48$
$r_{37} = -9.0043$
$d_{37} = 8.3319$
$r_{38} = 9.0043$
$d_{38} = 11.4383$    $n_{25} = 1.63980$   $\nu_{25} = 34.48$
$r_{39} = 3.6774$
$d_{39} = 11.3702$    $n_{26} = 1.56883$   $\nu_{26} = 56.34$
$r_{40} = -9.9974$
$d_{40} = 1.7872$
$r_{41} = 9.9974$
$d_{41} = 11.3702$    $n_{27} = 1.56883$   $\nu_{27} = 56.34$
$r_{42} = -3.6774$
$d_{42} = 11.4383$    $n_{28} = 1.63980$   $\nu_{28} = 34.48$
$r_{43} = -9.0043$
$r_2/r_1 = 0$, $f_{11}/f_{12} = 14.461$, $|f_1/f| = 0.637$
$f_2/f = 2.763$, $h_1I_{max} = 0.992$ Embodiment 25
$f = 1.000$, F number = 6.122
image height = 0.8212, object distance = $-17.1086$ $r_1 = \infty$
$d_1 = 0.2139$    $n_1 = 1.76820$   $\nu_1 = 71.79$
$r_2 = 6.4588$
$d_2 = 0.2053$
$r_3 = \infty$
$d_3 = 0.1711$    $n_2 = 1.80440$   $\nu_2 = 39.58$
$r_4 = 0.5979$
$d_4 = 0.2566$
$r_5 = \infty$
$d_5 = 1.5997$    $n_3 = 1.78800$   $\nu_3 = 47.43$
$r_6 = \infty$ (position of aperture stop)
$d_6 = 2.5800$    $n_4 = 1.78800$   $\nu_4 = 47.38$
$r_7 = -1.7583$
$d_7 = 0.1524$
$r_8 = 3.9439$
$d_8 = 1.0005$    $n_5 = 1.60311$   $\nu_5 = 60.70$
$r_9 = -1.4572$
$d_9 = 0.4277$    $n_6 = 1.84666$   $\nu_6 = 23.78$
$r_{10} = -4.9438$
$d_{10} = 0.8422$
$r_{11} = -2.0012$
$d_{11} = 1.3735$    $n_7 = 1.64769$   $\nu_7 = 33.80$
$r_{12} = \infty$
$d_{12} = 1.1749$    $n_8 = 1.71300$   $\nu_8 = 53.84$
$r_{13} = -2.9746$
$d_{13} = 5.5603$
$r_{14} = 8.2678$
$d_{14} = 19.9658$    $n_9 = 1.58913$   $\nu_9 = 61.18$
$r_{15} = -4.4192$
$d_{15} = 0.9923$    $n_{10} = 1.72342$   $\nu_{10} = 37.95$
$r_{16} = -8.7947$
$d_{16} = 1.7109$
$r_{17} = 8.7947$
$d_{17} = 0.9923$    $n_{11} = 1.72342$   $\nu_{11} = 37.95$
$r_{18} = 4.4192$
$d_{18} = 19.9658$    $n_{12} = 1.58913$   $\nu_{12} = 61.18$
$r_{19} = -8.2678$
$d_{19} = 7.6989$
$r_{20} = 8.2678$
$d_{20} = 19.9658$    $n_{13} = 1.58913$   $\nu_{13} = 61.18$
$r_{21} = -4.4192$
$d_{21} = 0.9923$    $n_{14} = 1.72342$   $\nu_{14} = 37.95$
$r_{22} = -8.7947$
$d_{22} = 1.7109$
$r_{23} = 8.7947$
$d_{23} = 0.9923$    $n_{15} = 1.72342$   $\nu_{15} = 37.95$
$r_{24} = 4.4192$
$d_{24} = 19.9658$    $n_{16} = 1.58913$   $\nu_{16} = 61.18$
$r_{25} = -8.2678$
$d_{25} = 7.6989$
$r_{26} = 8.2678$
$d_{26} = 19.9658$    $n_{17} = 1.58913$   $\nu_{17} = 61.18$
$r_{27} = -4.4192$
$d_{27} = 0.9923$    $n_{18} = 1.72342$   $\nu_{18} = 37.95$
$r_{28} = -8.7947$ -continued d$_{28}$ = 1.7109
r$_{29}$ = 8.7947
d$_{29}$ = 0.9923         n$_{19}$ = 1.72342  ν$_{19}$ = 37.95
r$_{30}$ = 4.4192
d$_{30}$ = 19.9658        n$_{20}$ = 1.58913  ν$_{20}$ = 61.18
r$_{31}$ = −8.2678
r$_2$/r$_1$ = 0, f$_{11}$/f$_{12}$ = 11.308, |f$_1$/f| = 0.659
f$_2$/f = 2.743, h$_1$I$_{max}$ = 0.957

Embodiment 26
f = 1.000, F number = 6.964
image height = 0.8122, object distance = −16.9205 r$_1$ = ∞
d$_1$ = 0.2115            n$_1$ = 1.76820  ν$_1$ = 71.79
r$_2$ = 10.3168
d$_2$ = 0.2030
r$_3$ = ∞
d$_3$ = 0.1692            n$_2$ = 1.80440  ν$_2$ = 39.58
r$_4$ = 0.5041
d$_4$ = 0.2538
r$_5$ = ∞
d$_5$ = 1.7071            n$_3$ = 1.78800  ν$_3$ = 47.43
r$_6$ = ∞ (position of aperture stop)
d$_6$ = 2.4155            n$_4$ = 1.78800  ν$_4$ = 47.38
r$_7$ = −1.7610
d$_7$ = 0.1816
r$_8$ = 3.7237
d$_8$ = 1.1223            n$_5$ = 1.60311  ν$_5$ = 60.70
r$_9$ = −1.3304
d$_9$ = 0.7614            n$_6$ = 1.84666  ν$_6$ = 23.78
r$_{10}$ = −5.5838
d$_{10}$ = 1.0873
r$_{11}$ = −1.8371
d$_{11}$ = 1.3562         n$_7$ = 1.64769  ν$_7$ = 33.80
r$_{12}$ = ∞
d$_{12}$ = 0.8857         n$_8$ = 1.77250  ν$_8$ = 49.66
r$_{13}$ = −2.7747
r$_2$/r$_1$ = 0, f$_{11}$/f$_{12}$ = 21.419, |f$_1$/f| = 0.586
f$_2$/f = 3.031, h$_1$I$_{max}$ = 0.960

Embodiment 27
f = 1.000, F number = 6.984
image height = 0.8239, object distance = −17.3461 r$_1$ = ∞
d$_1$ = 0.2168            n$_1$ = 1.76820  ν$_1$ = 71.79
r$_2$ = 4.5108
d$_2$ = 0.2082
r$_3$ = ∞
d$_3$ = 0.1735            n$_2$ = 1.78800  ν$_2$ = 47.43
r$_4$ = 0.5455
d$_4$ = 0.2602
r$_5$ = ∞
d$_5$ = 1.6219            n$_3$ = 1.78800  ν$_3$ = 47.43
r$_6$ = ∞ (position of aperture stop)
d$_6$ = 2.6054            n$_4$ = 1.78800  ν$_4$ = 47.38
r$_7$ = −2.1154
d$_7$ = 0.0867
r$_8$ = 3.7389
d$_8$ = 1.2229            n$_5$ = 1.64000  ν$_5$ = 60.09
r$_9$ = −1.5976
d$_9$ = 0.8933            n$_6$ = 1.84666  ν$_6$ = 23.88
r$_{10}$ = −6.1526
d$_{10}$ = 1.5091
r$_{11}$ = −1.6279
d$_{11}$ = 0.5117         n$_7$ = 1.72825  ν$_7$ = 28.46
r$_{12}$ = −6.0043
d$_{12}$ = 0.8933         n$_8$ = 1.77250  ν$_8$ = 49.66
r$_{13}$ = −2.1154
d$_{13}$ = 3.8161
r$_{14}$ = 9.8656
d$_{14}$ = 20.8153        n$_9$ = 1.62004  ν$_9$ = 36.25
r$_{15}$ = ∞
d$_{15}$ = 1.4657
r$_{16}$ = 13.4050
d$_{16}$ = 2.2984         n$_{10}$ = 1.65160  ν$_{10}$ = 58.67
r$_{17}$ = −3.0286
d$_{17}$ = 1.1709         n$_{11}$ = 1.80610  ν$_{11}$ = 40.95
r$_{18}$ = −6.7650
d$_{18}$ = 2.4371
r$_{19}$ = ∞
d$_{19}$ = 20.8153        n$_{12}$ = 1.62004  ν$_{12}$ = 36.25
r$_{20}$ = −9.8656
d$_{20}$ = 3.4692

-continued r$_{21}$ = 9.8656
d$_{21}$ = 20.8153        n$_{13}$ = 1.62004  ν$_{13}$ = 36.25
r$_{22}$ = ∞
d$_{22}$ = 1.4657
r$_{23}$ = 13.4050
d$_{23}$ = 2.2984         n$_{14}$ = 1.65160  ν$_{14}$ = 58.67
r$_{24}$ = −3.0286
d$_{24}$ = 1.1709         n$_{15}$ = 1.80610  ν$_{15}$ = 40.95
r$_{25}$ = −6.7650
d$_{25}$ = 2.4371
r$_{26}$ = ∞
d$_{26}$ = 20.8153        n$_{16}$ = 1.62004  ν$_{16}$ = 36.25
r$_{27}$ = −9.8656
d$_{27}$ = 3.4692
r$_{28}$ = 9.8656
d$_{28}$ = 20.8153        n$_{17}$ = 1.62004  ν$_{17}$ = 36.25
r$_{29}$ = ∞
d$_{29}$ = 1.4657
r$_{30}$ = 13.4050
d$_{30}$ = 2.2984         n$_{18}$ = 1.65160  ν$_{18}$ = 58.67
r$_{31}$ = −3.0286
d$_{31}$ = 1.1709         n$_{19}$ = 1.80610  ν$_{19}$ = 40.95
r$_{32}$ = −6.7650
d$_{32}$ = 2.4371
r$_{33}$ = 20.8153        n$_{20}$ = 1.62004  ν$_{20}$ = 36.25
r$_{34}$ = −9.8656
r$_2$/r$_1$ = 0, f$_{11}$/f$_{12}$ = 8.478, |f$_1$/f| = 0.591
f$_2$/f = 2.894, h$_1$I$_{max}$ = 0.967

Embodiment 28
f = 1.000, F number = 6.248
image height = 0.8429, object distance = −17.7462 r$_1$ = ∞
d$_1$ = 0.2218            n$_1$ = 1.76820  ν$_1$ = 71.79
r$_2$ = 6.3460
d$_2$ = 0.2130
r$_3$ = ∞
d$_3$ = 0.1775            n$_2$ = 1.80440  ν$_2$ = 39.58
r$_4$ = 0.5960
d$_4$ = 0.2662
r$_5$ = ∞
d$_5$ = 1.6546            n$_3$ = 1.78800  ν$_3$ = 47.43
r$_6$ = ∞ (position of aperture stop)
d$_6$ = 2.6693            n$_4$ = 1.78800  ν$_4$ = 47.38
r$_7$ = −2.2567
d$_7$ = 0.0913
r$_8$ = 5.0192
d$_8$ = 1.2513            n$_5$ = 1.65160  ν$_5$ = 58.52
r$_9$ = −1.4776
d$_9$ = 0.9169            n$_6$ = 1.84666  ν$_6$ = 23.78
r$_{10}$ = −3.6779
d$_{10}$ = 1.5384
r$_{11}$ = −1.8376
d$_{11}$ = 0.5202         n$_7$ = 1.78472  ν$_7$ = 25.71
r$_{12}$ = −2.9083
d$_{12}$ = 0.9106         n$_8$ = 1.78590  ν$_8$ = 44.18
r$_{13}$ = −2.4023
r$_2$/r$_1$ = 0, f$_{11}$/f$_{12}$ = 11.148, |f$_1$/f| = 0.657
f$_2$/f = 2.799, h$_1$I$_{max}$ = 1.032

Embodiment 29
f = 1.000, F number = 6.393
image height = 0.8511, object distance = −17.0213 r$_1$ = ∞
d$_1$ = 0.2128            n$_1$ = 1.76820  ν$_1$ = 71.79
r$_2$ = 7.7761
d$_2$ = 0.2043
r$_3$ = ∞
d$_3$ = 0.1702            n$_2$ = 1.80440  ν$_2$ = 39.58
r$_4$ = 0.5628
d$_4$ = 0.2553
r$_5$ = ∞
d$_5$ = 0.4043            n$_3$ = 1.78800  ν$_3$ = 47.43
r$_6$ = ∞
d$_6$ = 0.0477
r$_7$ = ∞
d$_7$ = 1.1018            n$_4$ = 1.78800  ν$_4$ = 47.43
r$_8$ = ∞ (position of aperture stop)
d$_8$ = 2.5561            n$_5$ = 1.78800  ν$_5$ = 47.38
r$_9$ = −1.9303
d$_9$ = 0.1280
r$_{10}$ = 3.4711
d$_{10}$ = 1.1916         n$_6$ = 1.60311  ν$_6$ = 60.70

-continued $r_{11} = -1.7822$
$d_{11} = 0.4257$    $n_7 = 1.84666$   $\nu_7 = 23.78$
$r_{12} = -3.2985$
$d_{12} = 0.9362$
$r_{13} = -1.2017$
$d_{13} = 1.2461$    $n_8 = 1.78472$   $\nu_8 = 25.71$
$r_{14} = \infty$
$d_{14} = 0.7800$    $n_9 = 1.71300$   $\nu_9 = 53.84$
$r_{15} = -2.0041$
$r_2/r_1 = 0$, $f_{11}/f_{12} = 14.461$, $|f_1/f| = 0.637$
$f_2/f = 2.763$, $h_1 I_{max} = 0.992$ Embodiment 30
$f = 1.000$, F number = 7.357
image height = 1.0331, object distance = −13.7707

$r_1 = \infty$
$d_1 = 0.2583$    $n_1 = 1.76820$   $\nu_1 = 71.79$
$r_2 = 2.0000$
$d_2 = 0.4029$
$r_3 = 3.1857$ (aspherical surface)
$d_3 = 0.2066$    $n_2 = 1.78472$   $\nu_2 = 25.71$
$r_4 = 0.6219$
$d_4 = 0.3099$
$r_5 = \infty$
$d_5 = 0.8368$    $n_3 = 1.88300$   $\nu_3 = 40.78$
$r_6 = \infty$
$d_6 = 0.0589$
$r_7 = \infty$
$d_7 = 0.6976$    $n_4 = 1.88300$   $\nu_4 = 40.78$
$r_8 = \infty$ (position of aperture stop)
$d_8 = 1.5886$    $n_5 = 1.88300$   $\nu_5 = 40.78$
$r_9 = \infty$
$d_9 = 2.0145$    $n_6 = 1.78800$   $\nu_6 = 47.38$
$r_{10} = -2.5196$
$d_{10} = 1.4773$
$r_{11} = 4.9566$
$d_{11} = 1.2603$    $n_7 = 1.51633$   $\nu_7 = 64.15$
$r_{12} = -2.1147$
$d_{12} = 0.8884$    $n_8 = 1.78472$   $\nu_8 = 25.71$
$r_{13} = \infty$
$d_{13} = 1.2913$    $n_9 = 1.56384$   $\nu_9 = 60.69$
$r_{14} = -3.6350$ (aspherical surface)
aspherical surface coefficients
(3rd surface) $P = 1.0000$, $E = 0.22202$
$F = -0.55923 \times 10^{-1}$, $G = 0$
(11th surface) $P = -0.5299$, $E = 0.24443 \times 10^{-2}$
$F = -0.10582 \times 10^{-2}$, $G = -0.44653 \times 10^{-3}$
$r_2/r_1 = 0$, $f_{11}/f_{12} = 2.549$, $|f_1/f| = 0.636$
$f_2/f = 3.272$, $h_1 I_{max} = 0.971$ Embodiment 31
$f = 1.000$, F number = 6.982
image height = 0.9551, object distance = −19.1022

$r_1 = \infty$
$d_1 = 0.2388$    $n_1 = 1.76820$   $\nu_1 = 71.79$
$r_2 = 3.9450$
$d_2 = 0.2292$
$r_3 = \infty$
$d_3 = 0.1910$    $n_2 = 1.78800$   $\nu_2 = 47.43$
$r_4 = 0.7274$
$d_4 = 0.2865$
$r_5 = \infty$
$d_5 = 1.7849$    $n_3 = 1.78800$   $\nu_3 = 47.43$
$r_6 = \infty$ (position of aperture stop)
$d_6 = 2.8693$    $n_4 = 1.78800$   $\nu_4 = 47.38$
$r_7 = -2.1274$
$d_7 = 0.0949$
$r_8 = 13.2749$
$d_8 = 1.3362$    $n_5 = 1.62041$   $\nu_5 = 60.27$
$r_9 = -1.6254$
$d_9 = 0.4767$    $n_6 = 1.84666$   $\nu_6 = 23.88$
$r_{10} = -6.6415$
$d_{10} = 1.1060$
$r_{11} = 12.1080$
$d_{11} = 2.2340$    $n_7 = 1.72825$   $\nu_7 = 28.46$
$r_{12} = \infty$
$d_{12} = 1.1643$    $n_8 = 1.77250$   $\nu_8 = 49.66$
$r_{13} = -11.7235$
$r_2/r_1 = 0$, $f_{11}/f_{12} = 5.563$, $|f_1/f| = 0.741$
$f_2/f = 2.794$, $h_1 I_{max} = 1.049$ Embodiment 32
$f = 1.000$, F number = 6.836
image height = 0.9132, object distance = −18.2648

$r_1 = \infty$
$d_1 = 0.2283$    $n_1 = 1.76820$   $\nu_1 = 71.79$
$r_2 = 3.0167$
$d_2 = 0.2192$
$r_3 = \infty$
$d_3 = 0.1826$    $n_2 = 1.78800$   $\nu_2 = 47.43$
$r_4 = 0.6201$
$d_4 = 0.2740$
$r_5 = \infty$
$d_5 = 3.0587$    $n_3 = 1.78800$   $\nu_3 = 47.43$
$r_6 = \infty$ (position of aperture stop)
$d_6 = 1.3915$    $n_4 = 1.78800$   $\nu_4 = 47.38$
$r_7 = -1.8673$
$d_7 = 0.1651$
$r_8 = 2.4066$
$d_8 = 1.3699$    $n_5 = 1.62041$   $\nu_5 = 60.27$
$r_9 = -1.2264$
$d_9 = 0.4566$    $n_6 = 1.78472$   $\nu_6 = 25.71$
$r_{10} = 1.8035$
$d_{10} = 1.0650$
$r_{11} = 4.6779$
$d_{11} = 2.0695$    $n_7 = 1.67270$   $\nu_7 = 32.10$
$r_{12} = \infty$
$d_{12} = 1.0406$    $n_8 = 1.71300$   $\nu_8 = 53.84$
$r_{13} = -3.7547$
$r_2/r_1 = 0$, $f_{11}/f_{12} = 4.990$, $|f_1/f| = 0.614$
$f_2/f = 4.145$, $h_1 I_{max} = 1.038$ Embodiment 33
$f = 1.000$, F number = 6.180
image height = 0.8696, object distance = −17.3913

$r_1 = 8.6957$
$d_1 = 0.2174$    $n_1 = 1.76820$   $\nu_1 = 71.79$
$r_2 = 2.6677$
$d_2 = 0.2087$
$r_3 = \infty$
$d_3 = 0.1739$    $n_2 = 1.78800$   $\nu_2 = 47.43$
$r_4 = 0.6878$
$d_4 = 0.2609$
$r_5 = \infty$
$d_5 = 1.6244$    $n_3 = 1.78800$   $\nu_3 = 47.43$
$r_6 = \infty$ (position of aperture stop)
$d_6 = 2.6131$    $n_4 = 1.78800$   $\nu_4 = 47.38$
$r_7 = -1.7093$
$d_7 = 0.0870$
$r_8 = 6.7364$
$d_8 = 1.2178$    $n_5 = 1.58313$   $\nu_5 = 59.36$
$r_9 = -1.2124$
$d_9 = 0.4344$    $n_6 = 1.76182$   $\nu_6 = 26.55$
$r_{10} = 19.9575$
$d_{10} = 1.0077$
$r_{11} = 6.2429$
$d_{11} = 2.0341$    $n_7 = 1.64769$   $\nu_7 = 33.80$
$r_{12} = \infty$
$d_{12} = 1.0602$    $n_8 = 1.69680$   $\nu_8 = 55.52$
$r_{13} = -7.1882$
$r_2/r_1 = 0$, $f_{11}/f_{12} = 5.829$, $|f_1/f| = -0.715$
$f_2/f = 2.756$, $h_1 I_{max} = 0.848$ Embodiment 34
$f = 1.000$, F number = 6.388
image height = 0.8460, object distance = −16.9205

$r_1 = -10.1523$
$d_1 = 0.2115$    $n_1 = 1.76820$   $\nu_1 = 71.79$
$r_2 = 4.2508$
$d_2 = 0.2030$
$r_3 = \infty$
$d_3 = 0.1692$    $n_2 = 1.78800$   $\nu_2 = 47.43$
$r_4 = 0.6591$
$d_4 = 0.2538$
$r_5 = \infty$
$d_5 = 1.5812$    $n_3 = 1.78800$   $\nu_3 = 47.43$
$r_6 = \infty$ (position of aperture stop)
$d_6 = 2.5416$    $n_4 = 1.78800$   $\nu_4 = 47.38$
$r_7 = -1.7318$
$d_7 = 0.0846$
$r_8 = 5.5281$
$d_8 = 1.1840$    $n_5 = 1.58313$   $\nu_5 = 59.36$
$r_9 = -1.2936$
$d_9 = 0.4225$    $n_6 = 1.80518$   $\nu_6 = 25.43$
$r_{10} = -9.0447$ -continued

```
d₁₀ = 0.9804
r₁₁ = −12.5340
d₁₁ = 1.9792            n₇ = 1.72825  ν₇ = 28.46
r₁₂ = ∞
d₁₂ = 1.0316            n₈ = 1.77250  ν₈ = 49.66
r₁₃ = −4.8734
r₂/r₁ = 0, f₁₁/f₁₂ = −4.636, |f₁/f| = −0.643
f₂/f = 2.793, h₁I_max = 0.944
``` wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_l, \nu_2, \ldots$ represent Abbe's numbers of the respective lens elements.

Figure 19:
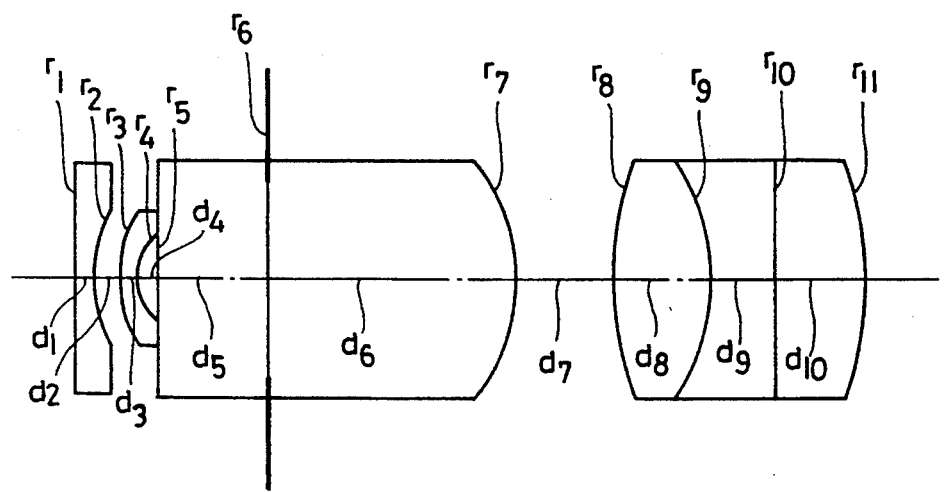
FIG. 19 shows a sectional view illustrating a composition of an objective lens system for endoscopes which is to be used in the first through fifth embodiments, eleventh through thirteenth embodiments and a sixteenth embodiment of the present invention.

Out of the embodiments of the present invention described above, the first embodiment comprises relay lenses for relaying an image three times and an objective lens system having the composition illustrated in FIG. 19.

In each of the second through fourth embodiments, fifth embodiment, eleventh through thirteenth embodiments and sixteenth embodiment, the objective lens system has the composition illustrated in FIG. 19. Further, the objective lens system selected for each of the sixth through tenth embodiments has the composition illustrated in FIG. 20.

Figure 20:
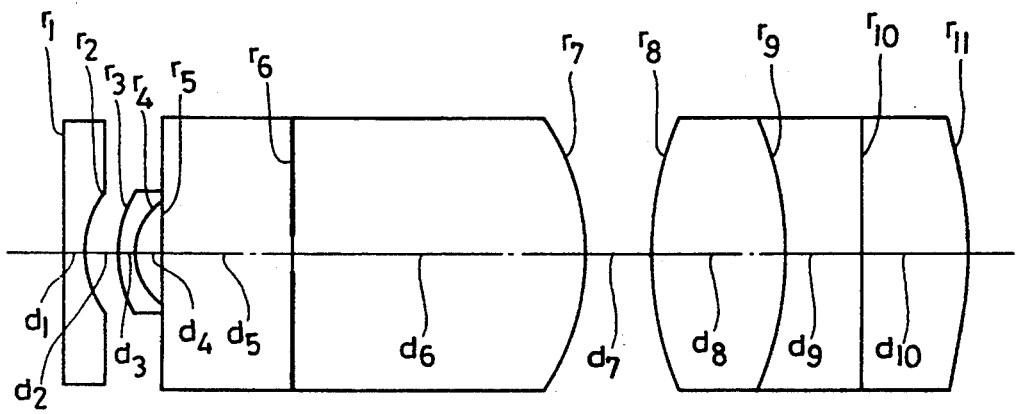
FIG. 20 shows a sectional view illustrating a composition of an objective lens system for endoscopes which is to be used in sixth through tenth embodiments of the present invention.
Figure 21:
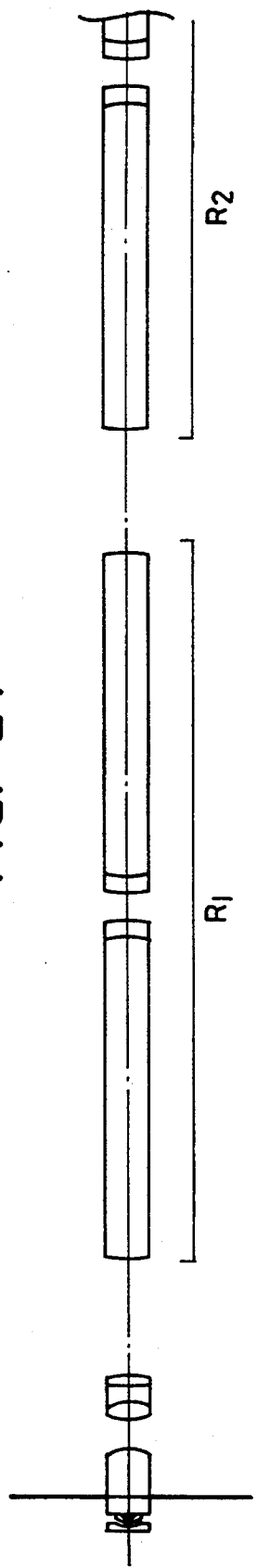
FIG. 21 and FIG. 22 show sectional views illustrating a composition of an objective lens system for endoscopes which is to be used in fourteenth and fifteenth embodiments of the present invention.

The fourteenth embodiment has the composition illustrated in FIG. 21 which comprises relay lenses for relaying an image five times and an objective lens system having a composition similar to that shown in FIG. 19 or FIG. 20. The relay lenses used in the fourteenth embodiment are different from those adopted for the first embodiment and so on.

Figure 18:
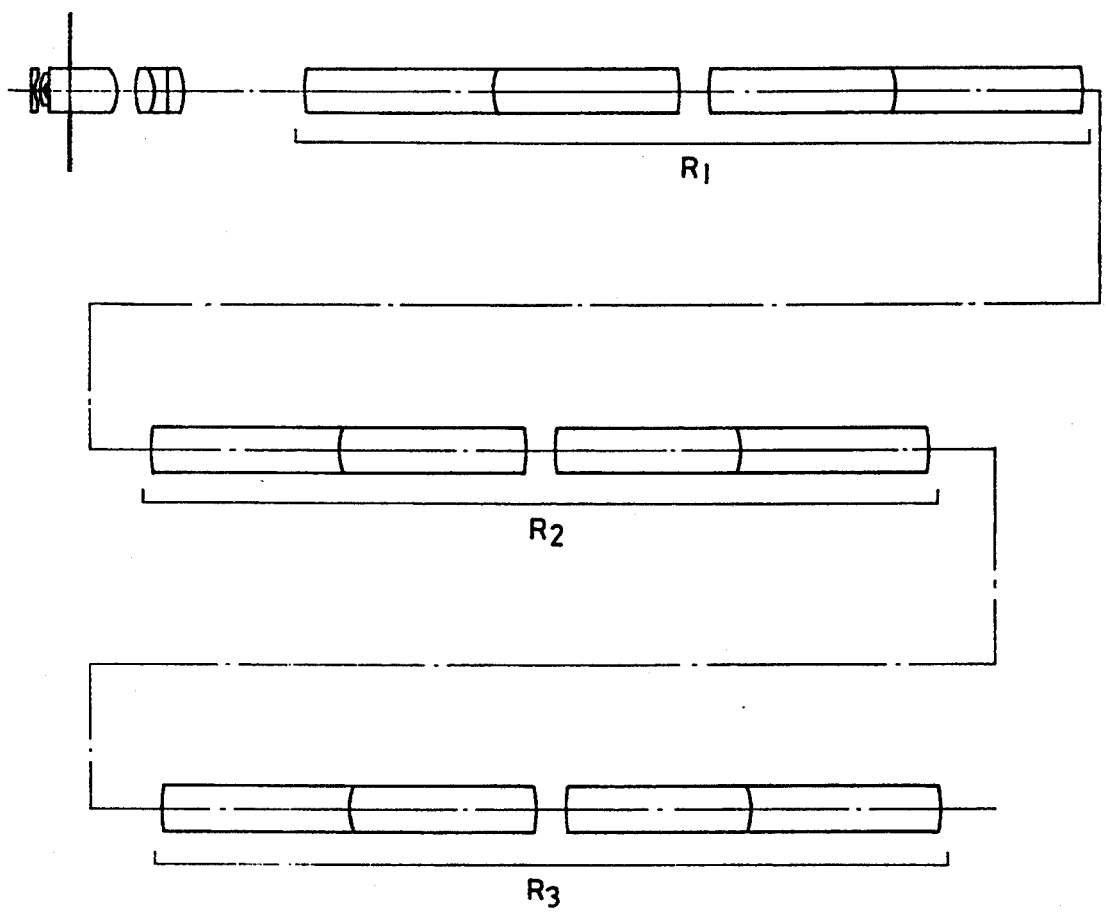
FIG. 18 shows a sectional view illustrating a composition of a first embodiment of the observation optical system for endoscopes according to the present invention.
Figure 22:
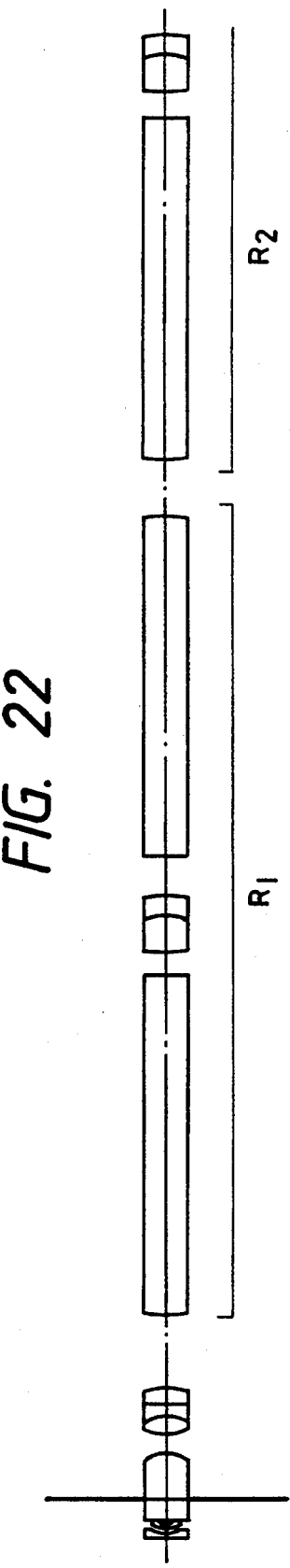

The fifteenth embodiment has the composition illustrated in FIG. 22 which comprises relay lenses for relaying an image three times and an objective lens system similar to those used in the embodiments described above. However, the fifteenth embodiment uses relay lenses which are different from those illustrated in FIG. 18 or FIG. 21.

Figure 23:
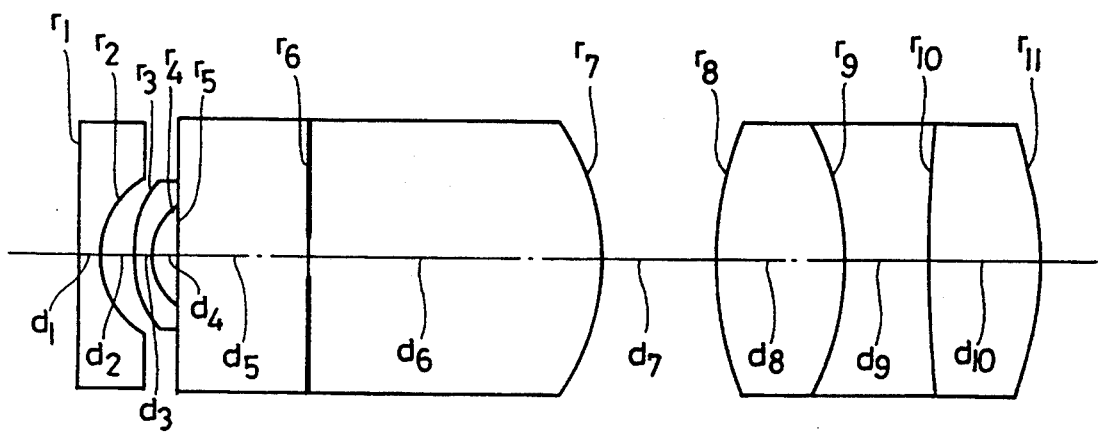
FIG. 23 shows a sectional view illustrating a composition of an objective lens system for endoscopes which is to be used in the seventeenth and eighteenth embodiments of the present invention.
Figure 24:
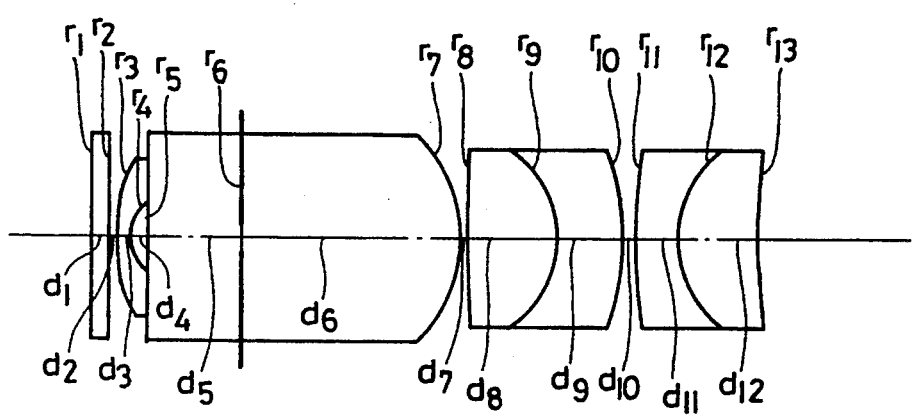
FIG. 24 through FIG. 27 show sectional views illustrating compositions of an objective lens systems for endoscopes which are to be used in nineteenth through twenty-second embodiments of the present invention.
Figure 25:
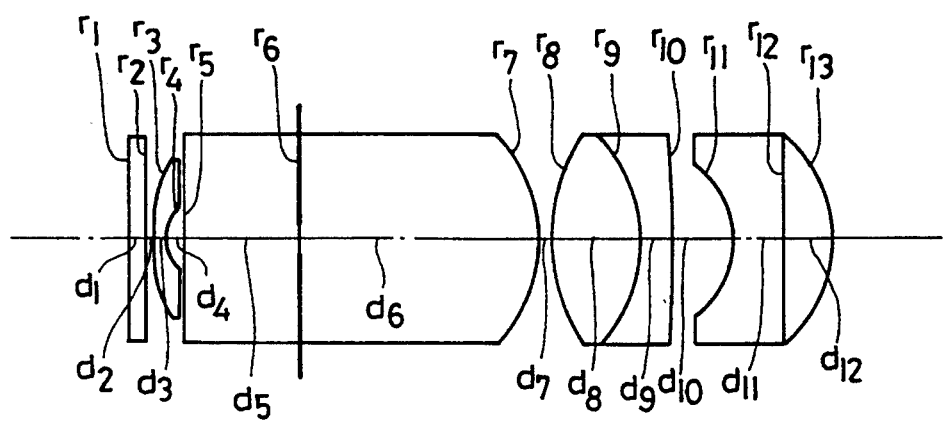
Figure 26:
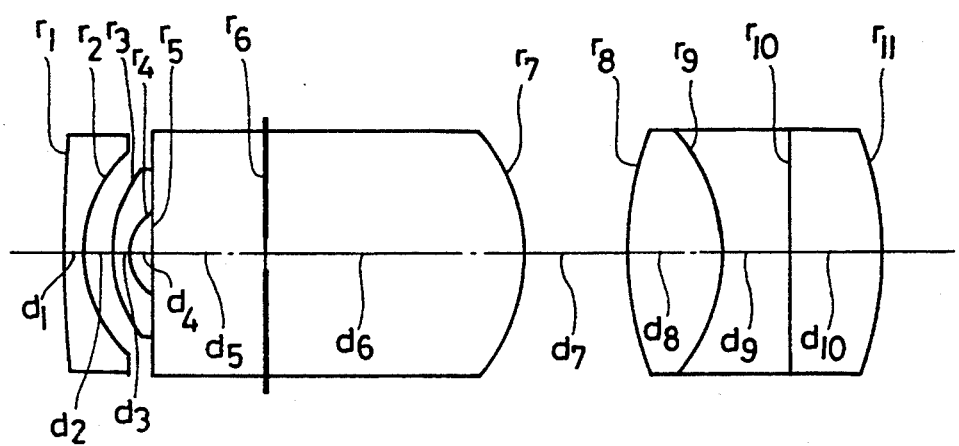

Each of the seventeenth and the eighteenth embodiment has the composition illustrated in FIG. 23. Further, the nineteenth through twenty-second embodiments have the compositions illustrated in FIG. 24 through FIG. 27 respectively.

Figure 28:
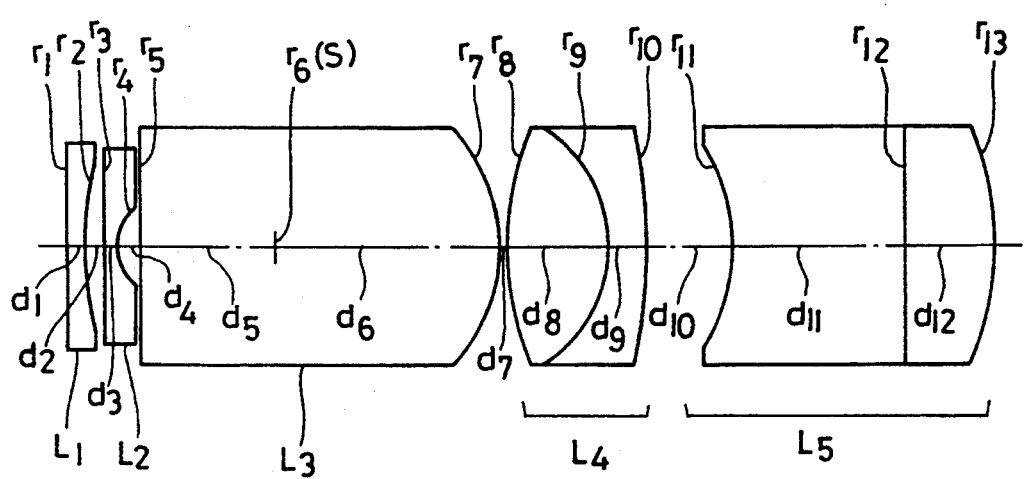
FIG. 28 shows a sectional view illustrating a composition of the objective lens system for endoscopes which is to be used in twenty-third embodiment of the present invention.
Figure 29:
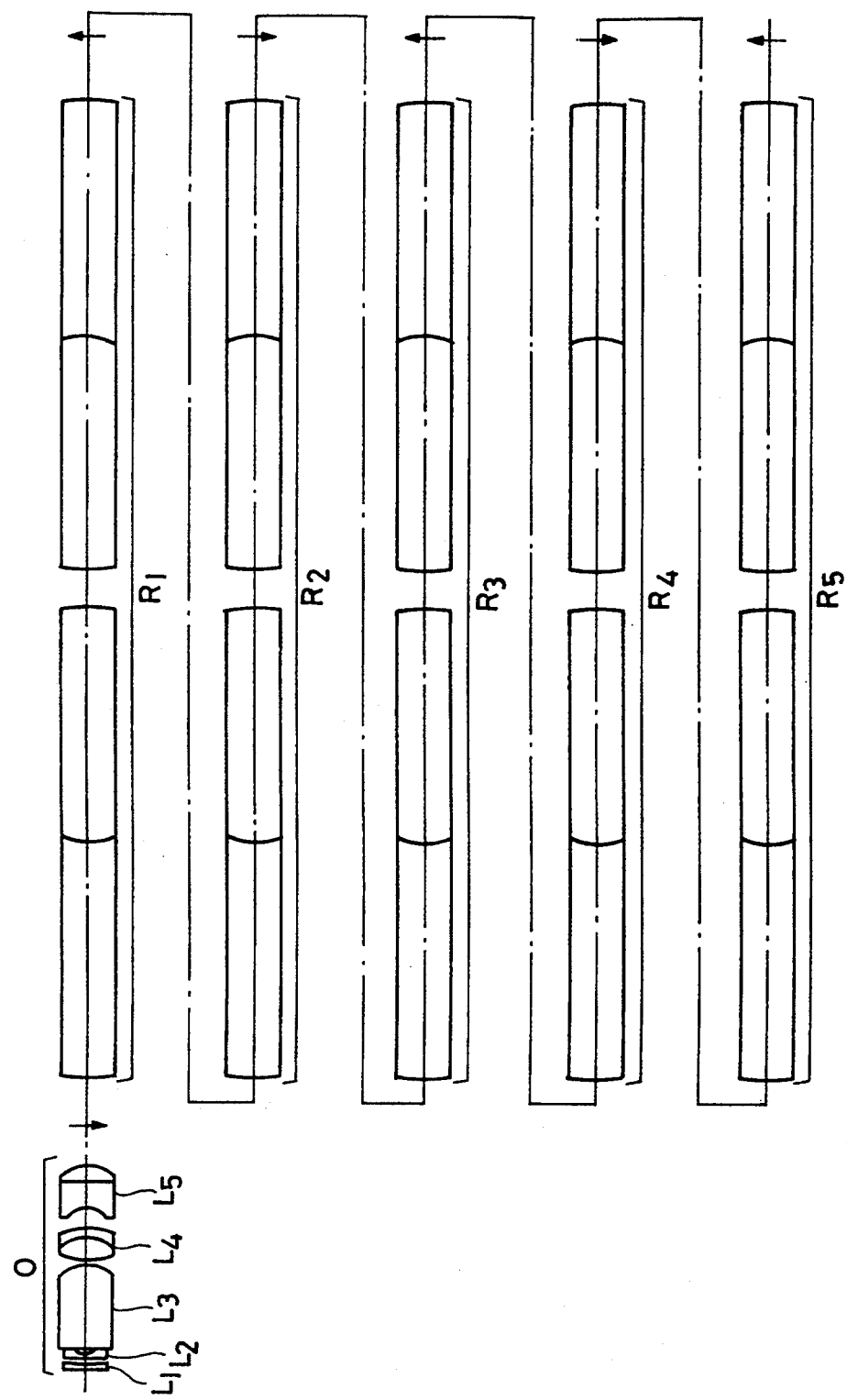
FIG. 29 and FIG. 30 show sectional views illustrating compositions of optical systems for endoscopes preferred as twenty-fourth and twenty-fifth embodiments of the present invention.

The twenty-third embodiment uses an objective lens system having the composition illustrated in FIG. 28 and relay lenses which are disposed as illustrated in FIG. 29 for relaying an image three times.

The twenty-fourth embodiment has a composition which is similar to that of the twenty-third embodiment and uses the relay lenses shown in FIG. 29 for relaying an image three times.

Figure 30:
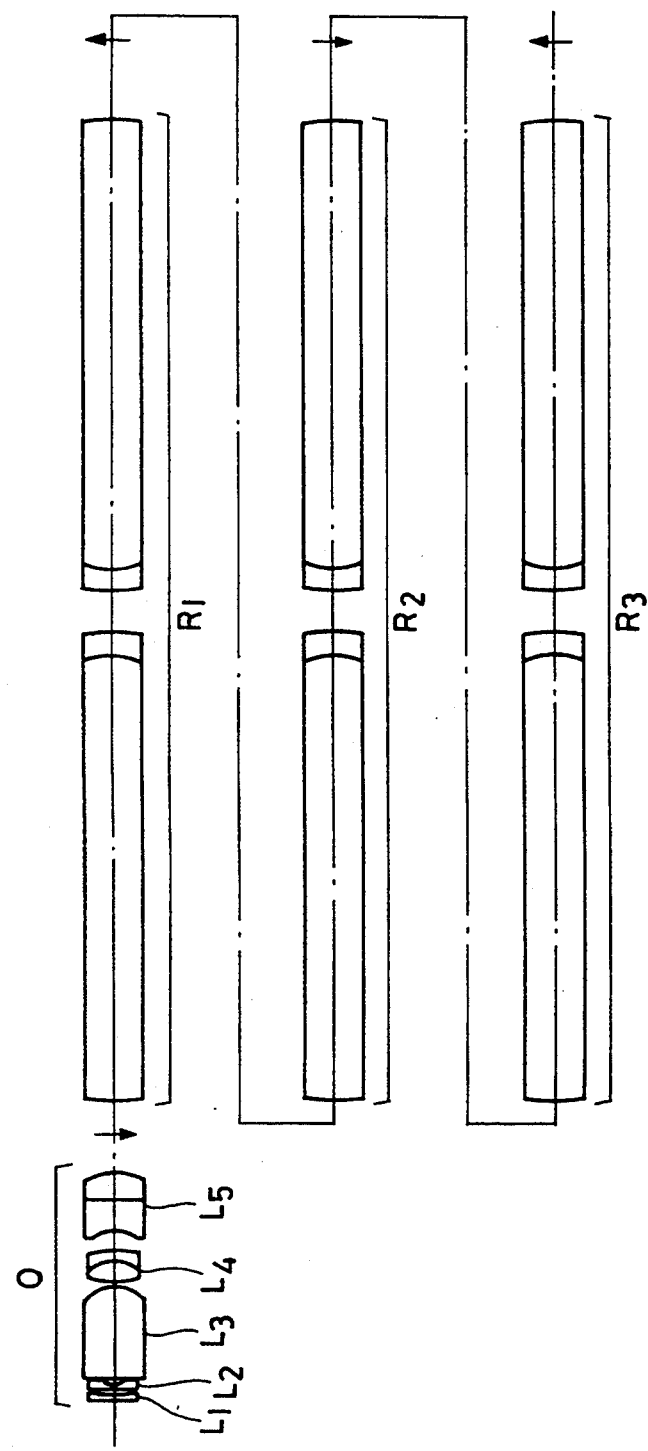

The twenty-fifth embodiment is an optical system for non-flexible endoscopes which has the composition illustrated in FIG. 30 and comprises relay lenses for relaying an image three times. The twenty-fifth embodiment adopts an objective lens system which has a composition similar to that of the objective lens system used in the twenty-third embodiment.

Figure 31:
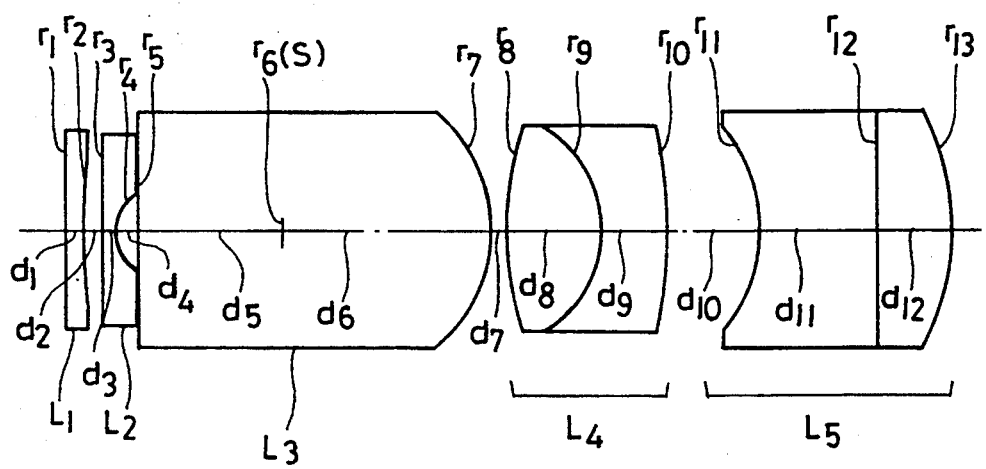
FIG. 31 shows a sectional view illustrating a composition of an objective lens system for endoscopes which is to be used in a twenty-sixth embodiment of the present invention.

The twenty-sixth embodiment is a non-flexible endoscope which uses an objective lens system having the composition illustrated in FIG. 31 and relay lenses shown in FIG. 30 for relaying an image five times.

Figure 33:
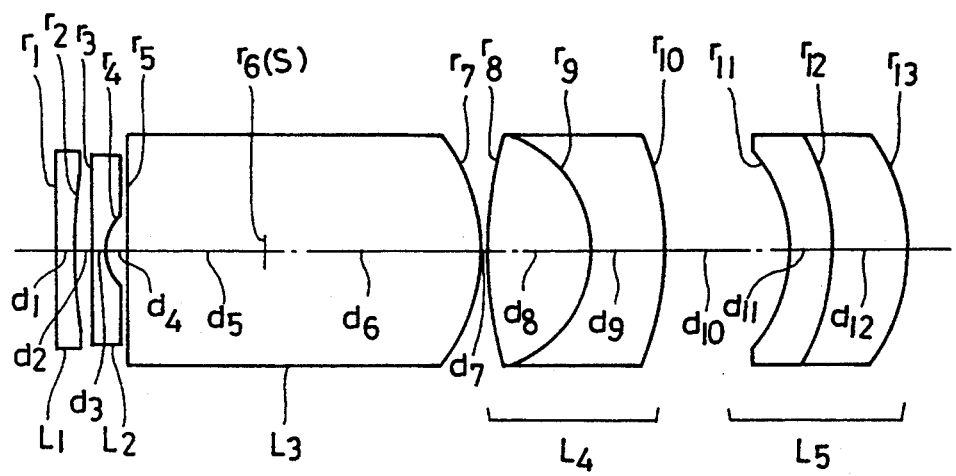
FIG. 33 and FIG. 34 show sectional views illustrating compositions of objective lens systems for endoscopes which are to be used in a twenty-eighth embodiment and a twenty-nineth embodiment respectively of the present invention.
Figure 32:
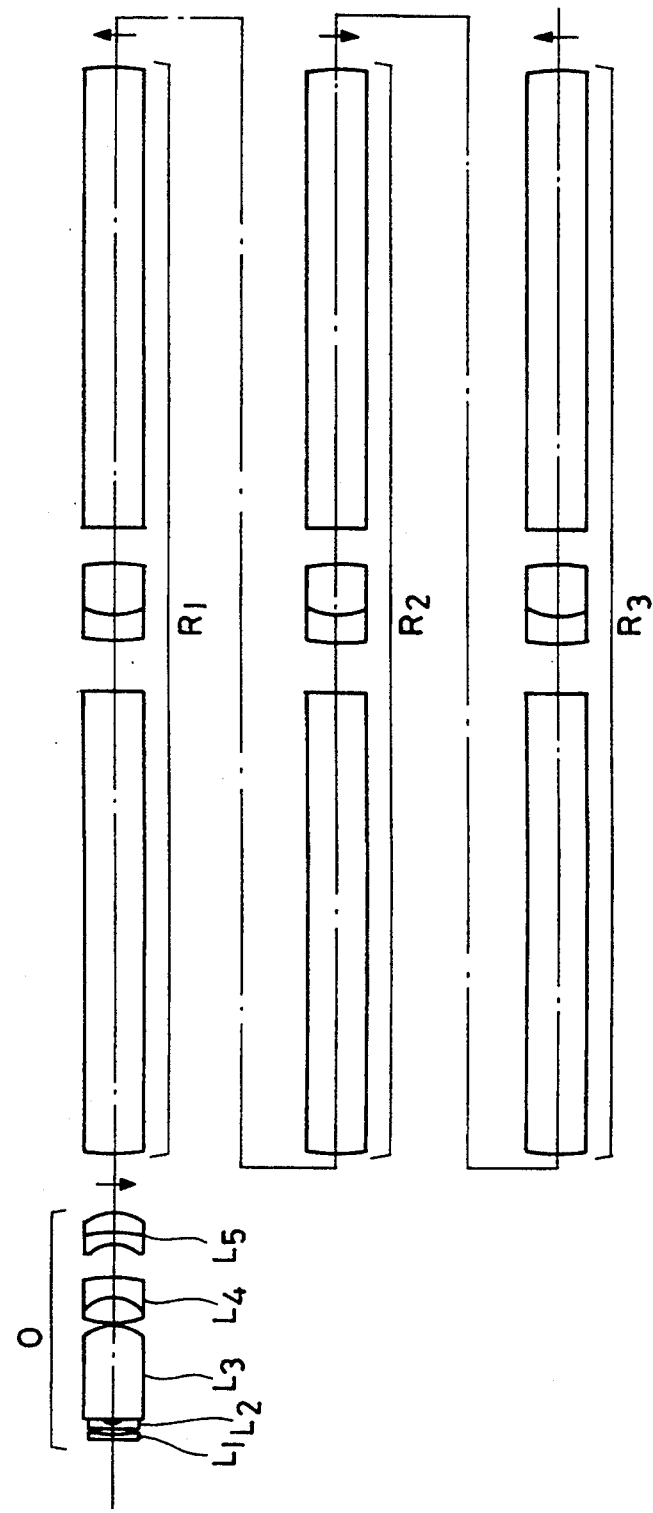
FIG. 32 shows a sectional view illustrating a composition of an optical system for endoscopes preferred as a twenty-seventh embodiment of the present invention.

The twenty-seventh embodiment is an optical system for non-flexible endoscopes which comprises relay lenses having the composition illustrated in FIG. 32 for relaying an image three times and an objective lens system having a composition similar to that of the lens system illustrated in FIG. 33.

The twenty-eighth embodiment consists of an objective lens system illustrated in FIG. 33 and relay lenses for relaying an image five times.

Figure 34:
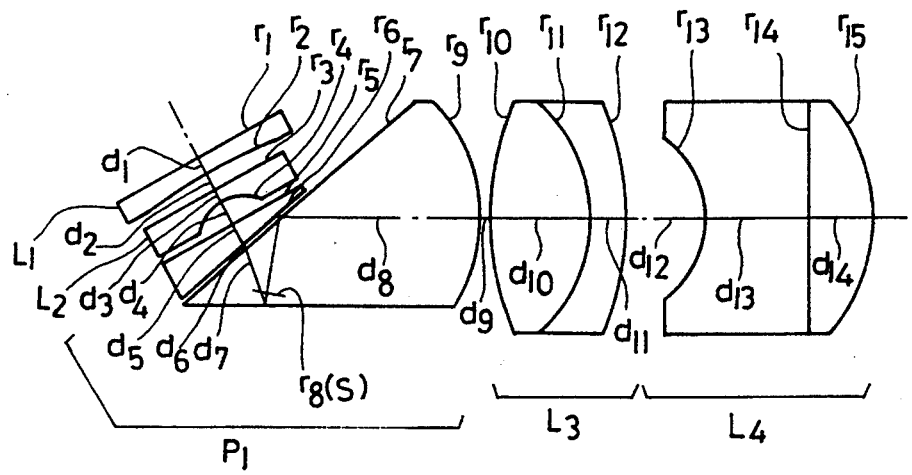
Figure 35:
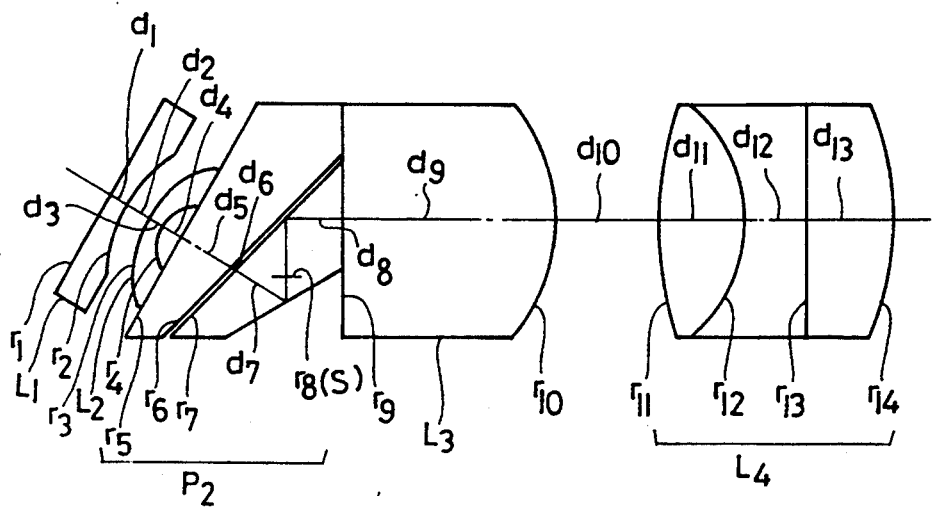
FIG. 35 and FIG. 36 show sectional views illustrating compositions of optical systems for endoscopes which are preferred as a thirtieth embodiment and a thirty-first embodiment respectively of the present invention.

Each of the twenty-ninth embodiment and the thirtieth embodiment is an example of an objective lens system comprising a prism for changing a direction toward a visual field. The twenty-ninth embodiment has the composition illustrated in FIG. 34, whereas the thirtieth embodiment has the composition shown in FIG. 35. That is to say, each of the twenty-ninth embodiment and the thirtieth embodiment comprises a prism for changing the direction toward the visual field which is disposed between the front diverging lens unit and the rear converging lens unit. Out of these embodiments, the twenty-ninth embodiment is configured so as to set an observation direction at 70° relative to the optical axis, whereas the thirtieth embodiment is configured so as to set an observation direction at 30° relative to the optical axis. Further, in the thirtieth embodiment, an aspherical surface is used as an object side surface of the second negative lens element $L_2$ and the positive lens component $L_4$ disposed in the rear converging lens unit is designed as a cemented lens component consisting of three lens elements. The thirtieth embodiment corrects, with the aspherical surface described above, distortion which is aggravated as a field angle is widened and has distortion of 50% or favorably corrected distortion in water though it has a wide field angle of 120°. Since the thirtieth embodiment has the wide field angle and permits observing images almost free from distortion as described above, the thirtieth embodiment allows to observe images almost free from distortion and is very effective, for example, for preventing erroneous diagnoses in the medical field.

Figure 36:
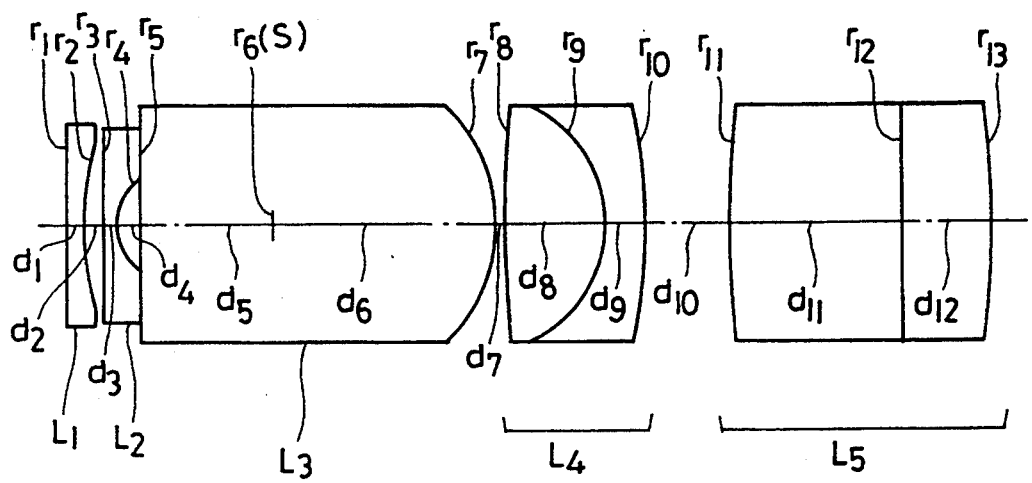
Figure 37:
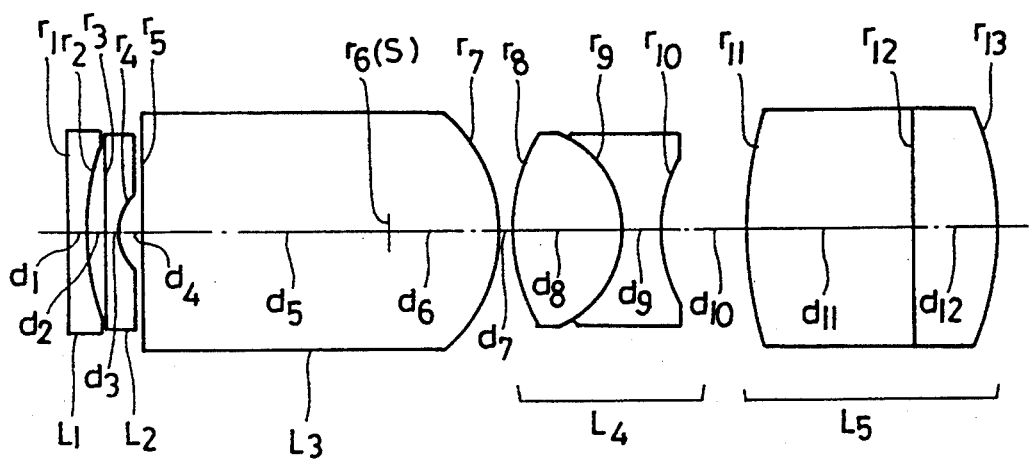
FIG. 37 shows a sectional view illustrating a composition of an objective lens system for endoscopes which is to be used in a thirty-second embodiment of the present invention.

The thirty-first and the thirty-second embodiment uses objective lens systems which have a composition illustrated in FIG. 36 or FIG. 37.

The thirty-first embodiment is an example of an objective lens system which is to be used for an optical system for non-flexible endoscopes comprising relay lenses for relaying an image three times and has a wide field angle of 140° when used in air. Further, the thirty-second embodiment is an optical system for non-flexible endoscopes which relays an image five times and uses the lens element $L_4$ in the rear converging lens unit which is the same as that adopted in the objective lens system of the thirty-first embodiment.

Figure 38:
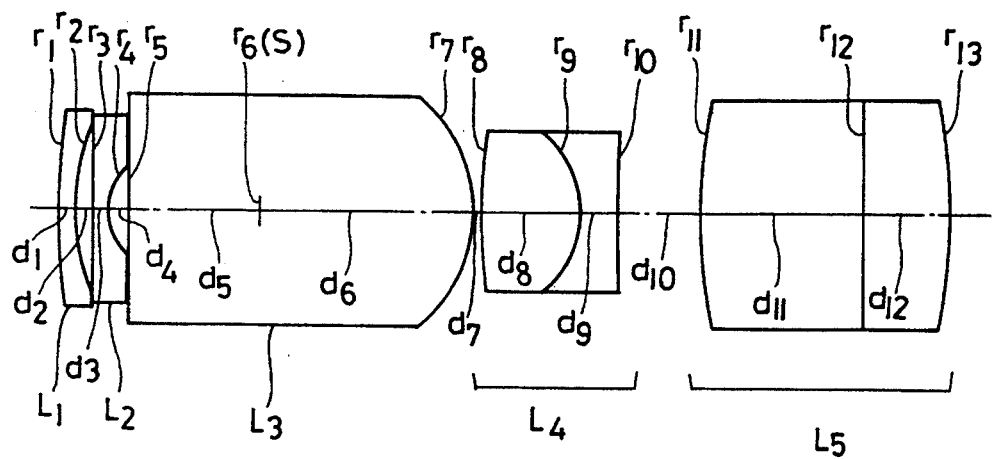
FIG. 38 shows a sectional view illustrating an optical system for endoscopes which is preferred as a thirty-third embodiment of the present invention.
Figure 39:
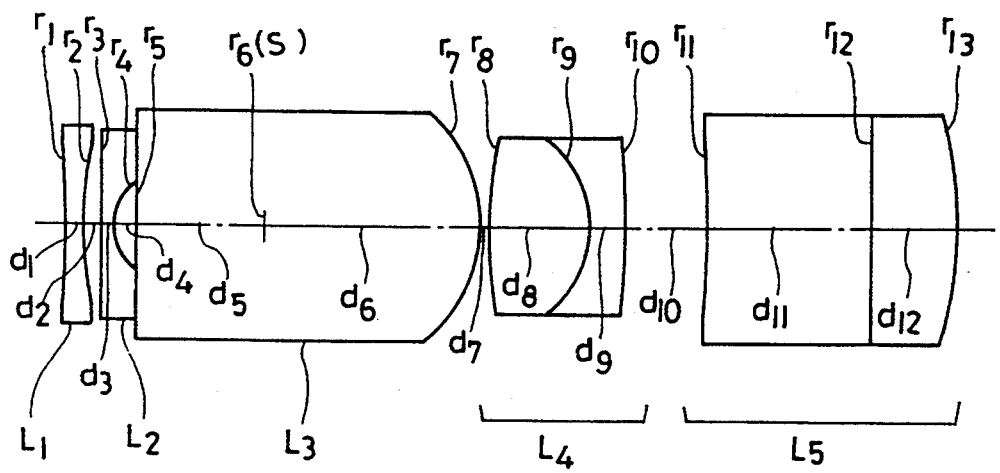
FIG. 39 shows a sectional view illustrating a composition of an objective lens system which is to be used in a thirty-fourth embodiment of the present invention.
Figures 44A, 44B, 44C, 44D:
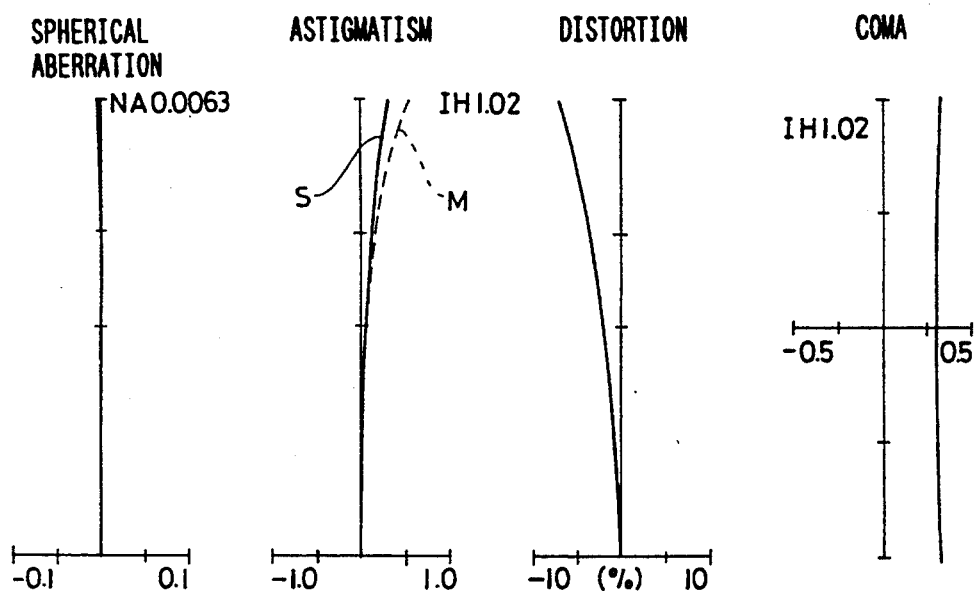
Figures 45A, 45B, 45C, 45D:
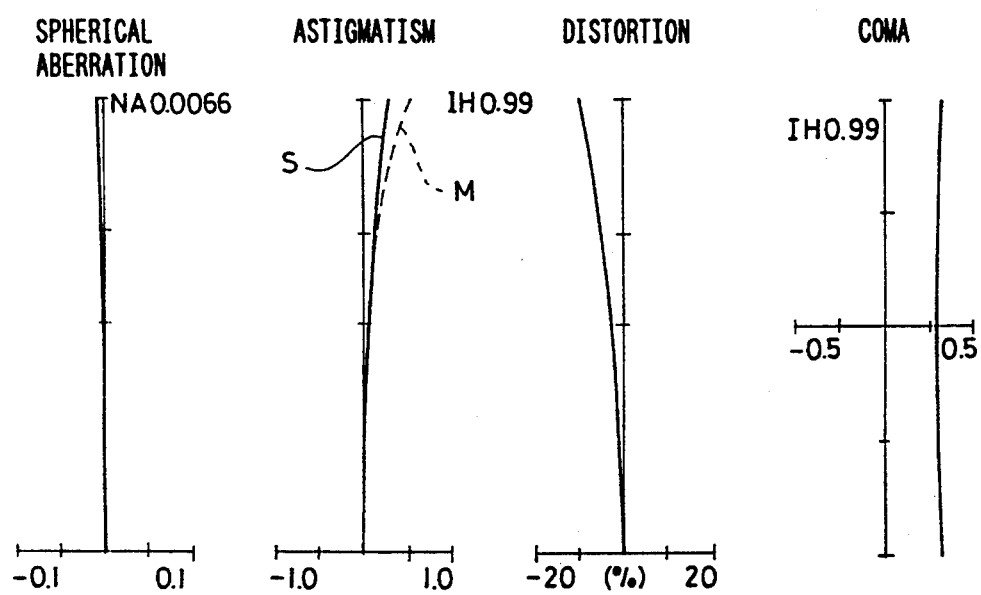
Figures 48A, 48B, 48C, 48D:
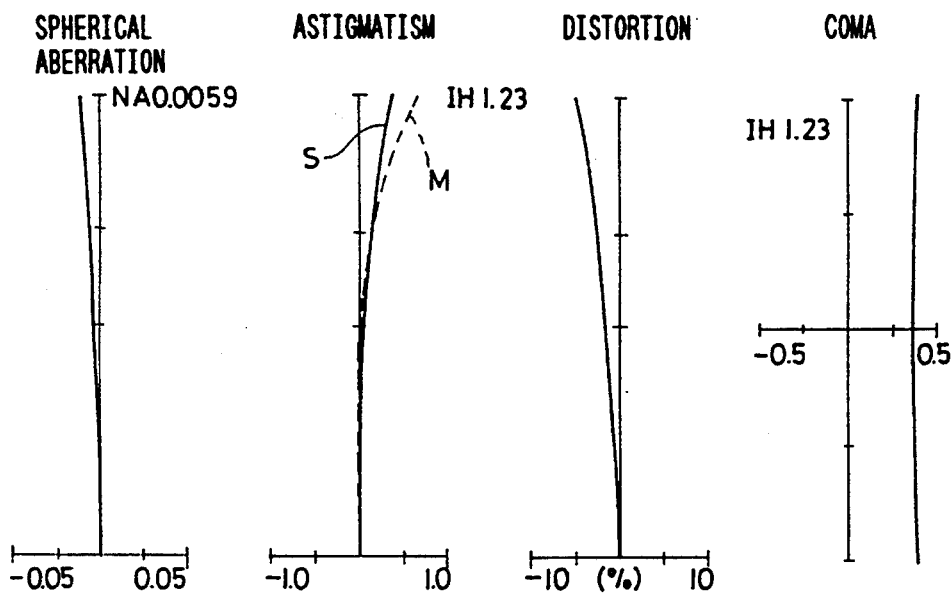
Figures 49A, 49B, 49C, 49D:
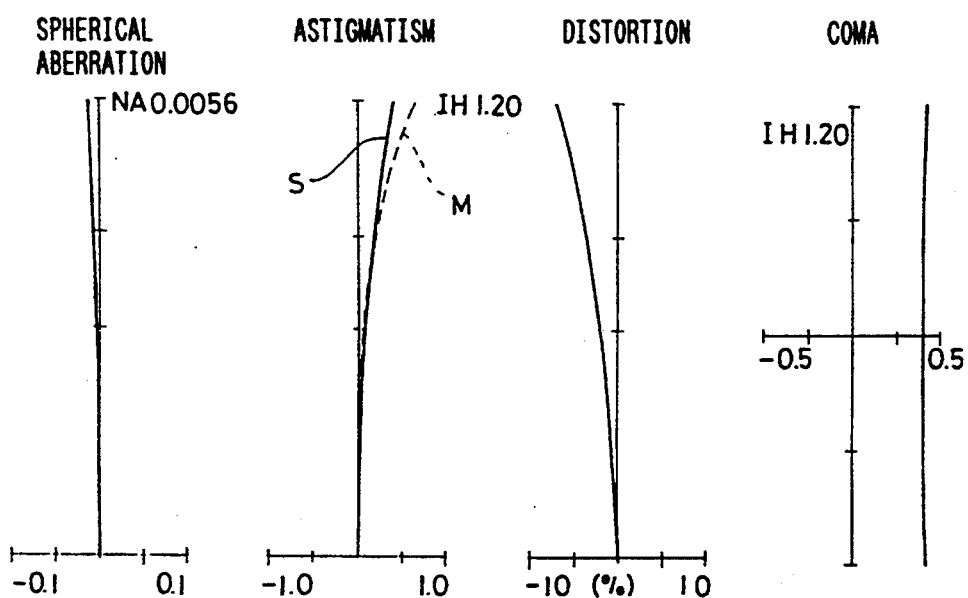
Figures 52A, 52B, 52C, 52D:
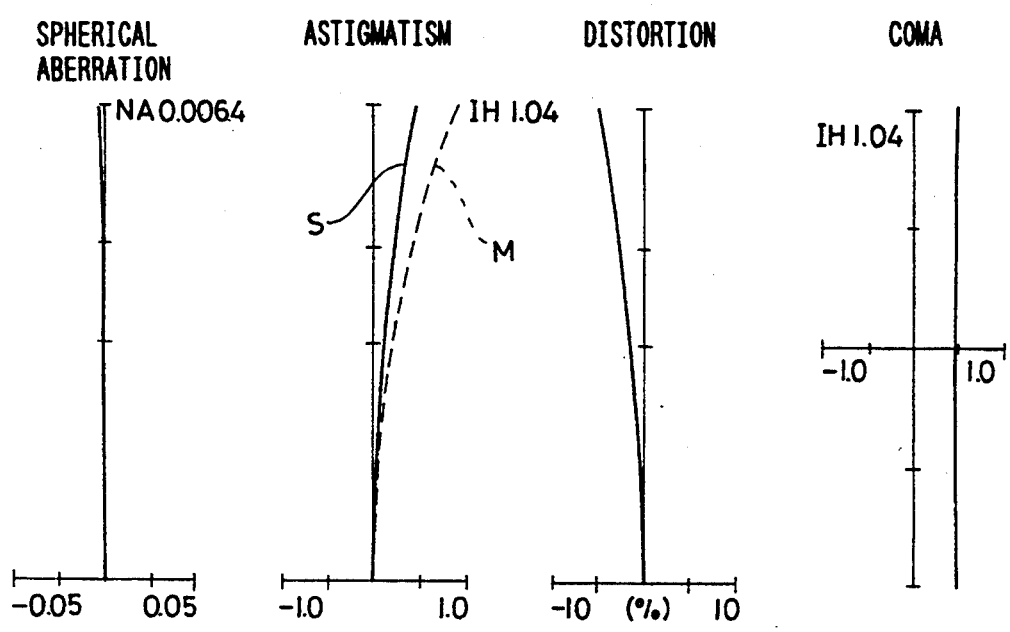
Figures 53A, 53B, 53C, 53D:
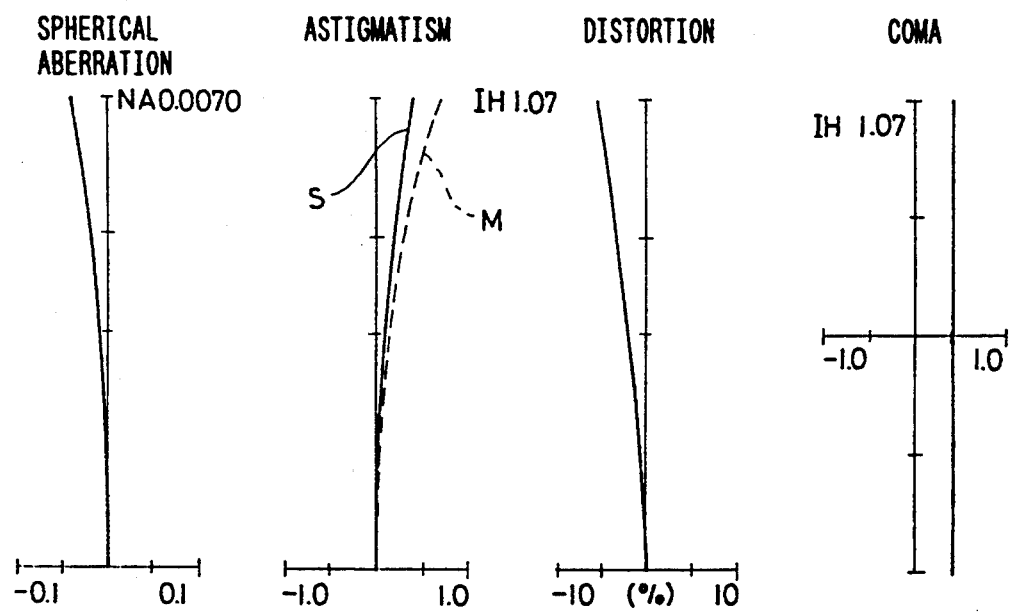
Figures 58A, 58B, 58C, 58D:
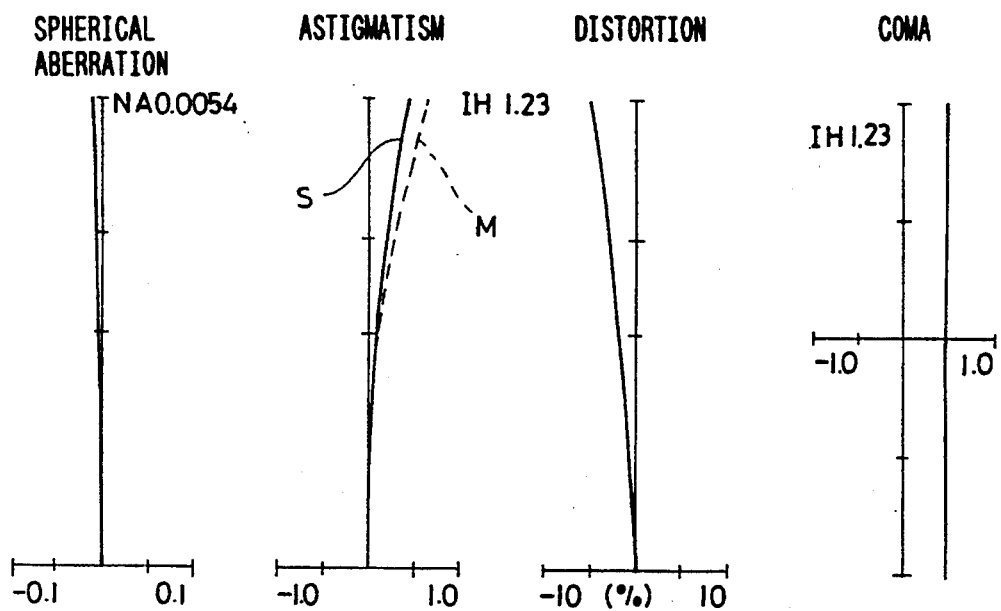
Figures 59A, 59B, 59C, 59D:
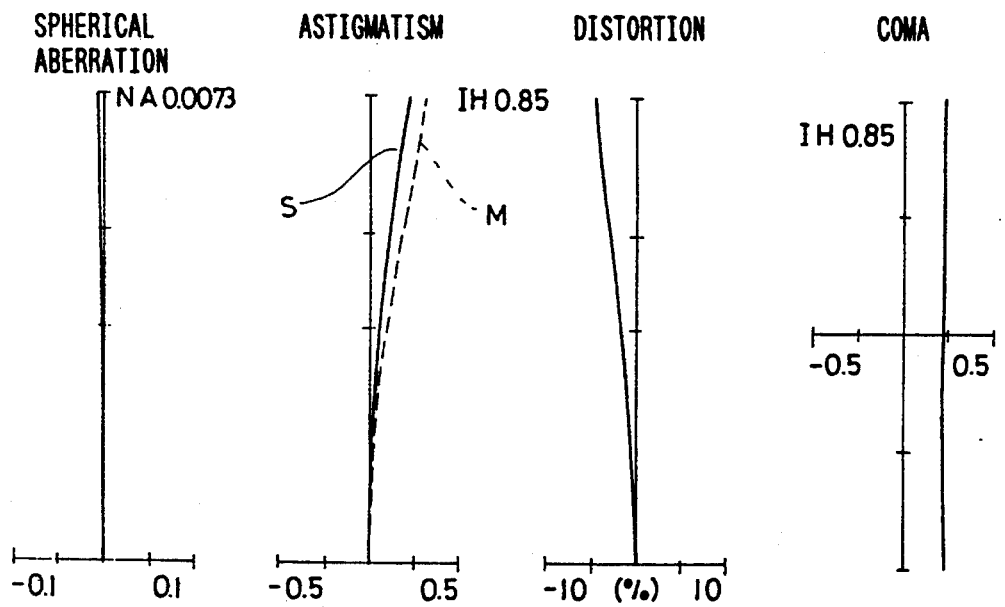
Figures 74A, 74B, 74C, 74D:
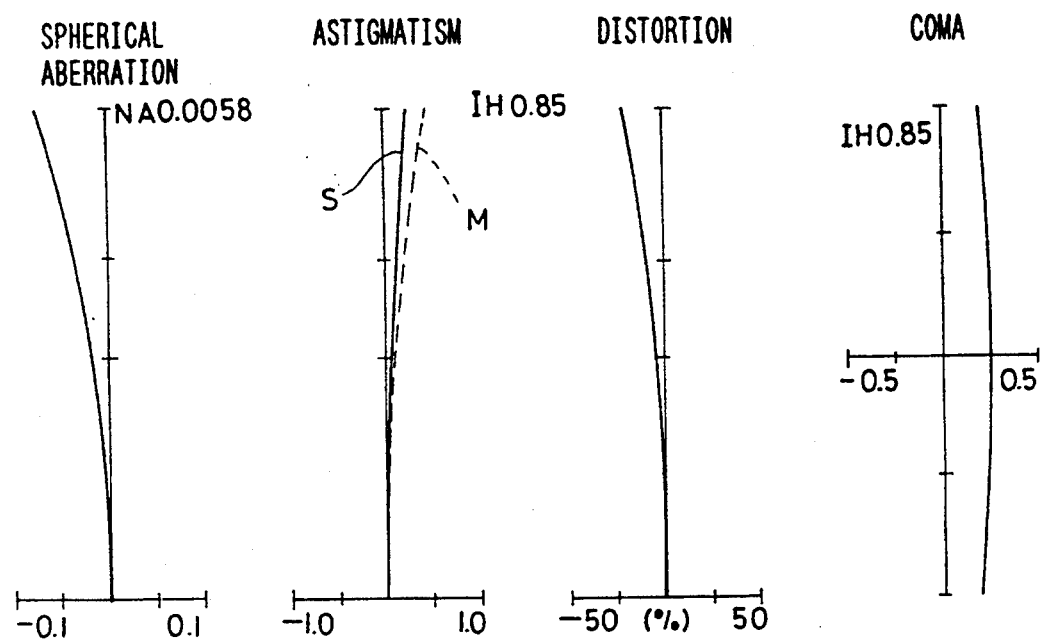

The thirty-third and the thirty-fourth embodiments are lens systems which have the compositions illustrated in FIG. 38 and FIG. 39 respectively, and use a convex surface and a concave surface respectively as the first surface of the negative lens element $L_1$ disposed on the object side.

Since the objective lens system according to the present invention adopts an additional negative lens element L1, the objective lens system comprises a large number of lens elements which make a Petzval's sum negative. Owing to this fact, the objective lens system permits reducing the burden imposed on the negative lens element $L_2$ and the lens element $L_5$ disposed in the rear converging lens unit which are required for obtaining a wide visual field and favorably correcting curvature of field in the objective lens system as a whole.

In the objective lens system for non-flexible endoscopes according to the present invention, the negative lens element $L_1$ which is disposed on the object side is made of a crystalline material which is resistant to sterilization with steam and contains $Al_2O_3$ as a main component.

Figure 27:
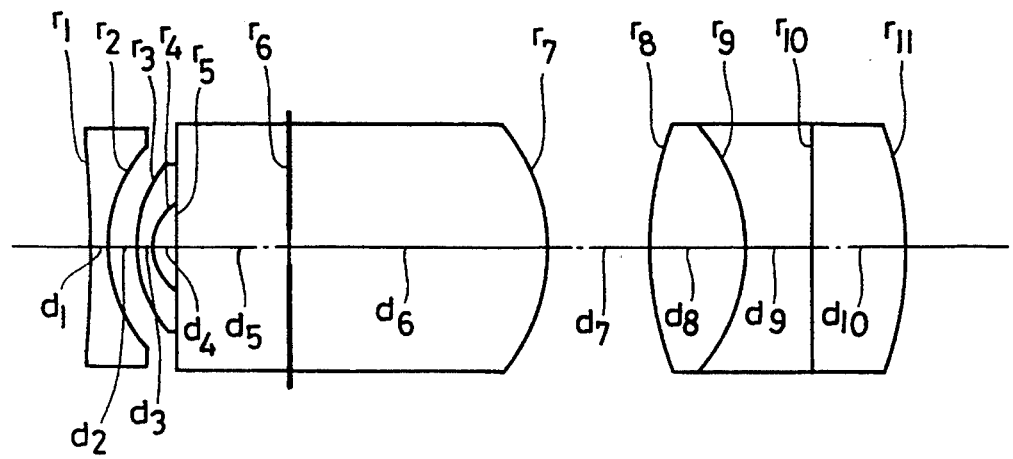
Figure 75:
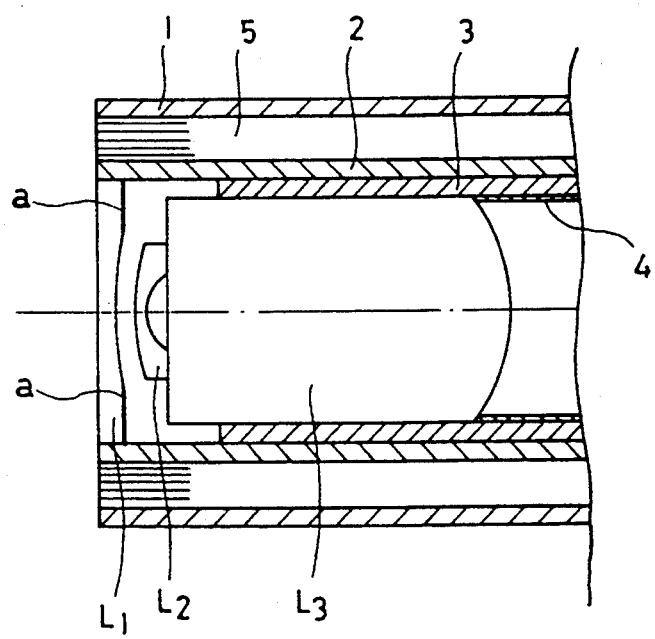
FIG. 75 shows a sectional view illustrating a distal end of an endoscopes using the objective lens system according to the present invention.
Figure 76:
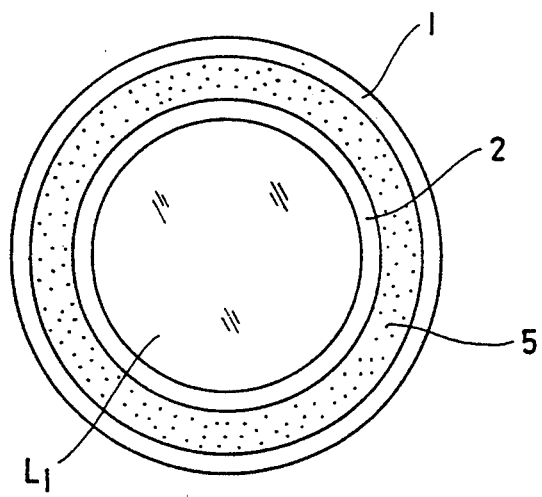
FIG. 76 shows a front view of an endoscope equipped with the distal end illustrated in FIG. 75.
Figure 77:
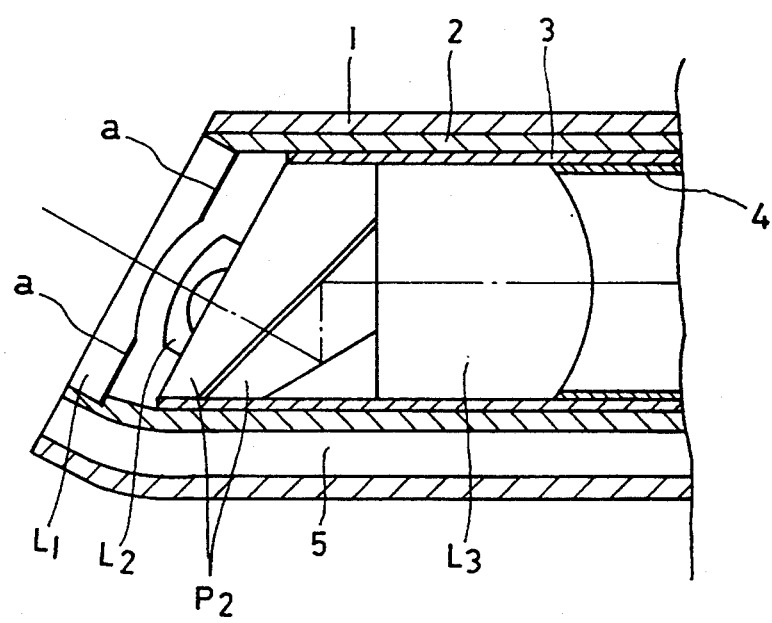
FIG. 77 shows a sectional view illustrating a distal end of an endoscope comprising the objective lens system according to the present invention.

FIG. 77 and FIG. 78 show diagrams illustrating a distal end of a non-flexible endoscope incorporating the objective lens system according to the present invention, FIG. 75 being a sectional view of the distal end and FIG. 76 being a front view of the distal end. This non-flexible endoscope is equipped with an outer cylinder 1 and an inner cylinder 2 which are arranged concentrically with each other, and disposed between these cylinders is a light guide fiber bundle 5 for illumination. The first lens element $L_1$ of the objective lens system is manufactured, for example, by polishing, coated with a metal on an outer circumferential surface thereof and fixed to the tip of the inner cylinder 2 by soldering. On the other hand, the third lens element $L_3$ of the objective lens system is fixed to a holding cylinder 3 by cementing and sustained indirectly to the holding cylinder 3 by way of the third lens element $L_3$. Further, the other lens elements and the relay lenses which are not shown in FIG. 27 are attached to the holding cylinder 3 by way of a spacing ring 4. Furthermore, the lens holding cylinder 3 is inserted into the inner cylinder 2 from the side of an eyepiece, and fixed at a position at which a predetermined spacing is reserved between the first lens element $L_1$ and the second lens element $L_2$.

Moreover, FIG. 77 shows a sectional view of a distal end of a non-flexible endoscope incorporating an objective lens system for oblique observation according to the present invention, wherein a visual field changing prism $P_2$ and the third lens element $L_3$ are fixed to the holding cylinder 3, and the second lens element $L_2$ is sustained to the front surface of the prism disposed on the object side. By configuring the distal end of the non-flexible endoscope so as to have the composition illustrated in FIG. 75 or FIG. 77, it is possible to facilitate assembly and repair.

The first lens element $L_1$ serves for obtaining a wide visual field and also has a role of a cover glass plate as described above. The first lens element $L_1$ is soldered to the inner cylinder 2 so as to prevent steam at a high temperature and a high pressure from penetrating to the lens elements which are disposed after the lens element $L_1$. Since the lens element $L_1$ is soldered to the inner cylinder 2 as described above, this lens element has an edge which is coated with a metal after being polished. For coating the lens element $L_1$ favorably with the metal when the lens element is made of a material consisting of crystals containing $Al_2O_3$ as a main component, it is desirable to manufacture the lens element so that the direction of the crystallographic axis thereof is set at 90° relative to the optical axis. Further, since flare may be produced by the metal coating, it is desirable that a black paint such as an aqueous paint or Chinese ink is applied to the circumferential portion indicated by a reference symbol a in FIG. 75 or FIG. 77.

In addition, all of the embodiments of the present invention are configured so that rays are low on the first surface and portions of endoscopes which are to be inserted into human bodies can have reduced diameters.

For lowering incident rays on the first surface as described above, it is desirable that the objective lens system satisfies the following condition:

$RH_1/I_1 \leq 2$ wherein the reference symbol $RH_1$ represents a maximum value of height of the principal ray and the reference symbol $I_1$ designates the maximum image height.

If this condition is not satisfied, rays will be high on the first surface or image height will be higher than required relative to an outside diameter of the objective lens system, thereby making it impossible to obtain bright and sharp images.

As is understood from the foregoing description, the observation optical system for endoscopes according to the present invention makes it possible to observe images having favorably corrected distortion and the other aberrations even when objects located in water are observed through the optical system. Further, the observation optical system for endoscopes according to the present invention is capable of withstanding sterilization with steam at a high temperature and at a high pressure owing to the fact that the optical system uses the first lens component of the objective lens system which serves also as a cover glass plate and is made of artificial sapphire.

In the explanation stated in the above, it is defined that the reference f represents a focal length of the objective lens. In the non-flexible endoscope of the embodiment of this application, the afocal relay lenses with a magnification of $-1 \times$ are arranged at the rear of the objective lens in order to transmit the image to the desired position. However, in this case, since the focal length of the observation optical system as a whole including the relay lens, by which the real image is formed, is not different from that of the objective lens, each condition mentioned in this specification can be satisfied though f represents the focal length of the observation optical system.

We claim:

1. An endoscope comprising an observation optical system having an observation window for receiving rays coming from an object and configured so as to allow observation of said object with said observation window kept in contact with a liquid;

wherein said observation optical system satisfies the following condition (1) or (2):

$$0.82 \leq N_w f \cdot \tan(\sin^{-1}\{(1/N_w) \cdot \sin \theta_{A1}\})/I_1 \leq 1.18 \quad (1)$$

$$0.9 \leq N_w f \cdot \tan(\sin^{-1}\{(1/N_w) \cdot \sin \theta_{A0.5}\})/I_{0.5} \leq 1.1 \quad (2)$$

wherein said reference symbol $N_w$ represents a refractive index of said liquid, said reference symbol f designates a focal length of said observation optical system, said reference symbol $\theta_{A1}$ denotes a half field angle of said observation system in air, said reference symbol $\theta_{A0.5}$ represents ½ of a half field angle of said observation optical system in air, said reference symbol $I_1$ designates maximum image height and said reference symbol $I_{0.5}$ denotes ½ of said maximum image height.

2. An endoscope according to claim 1, wherein said observation optical system comprises:
   an objective lens system for forming an image of an object; and
   relay lenses for relaying said image formed by said objective lens system a plurality of times;

said objective lens system being a retrofocus type telecentric optical system comprising:
- a front negative lens unit including a negative meniscus lens component having an object side surface configured as an aspherical surface strengthening a positive refractive power toward a marginal portion thereof, and
- a rear positive lens unit including at least two lens components including a cemented lens component;

said objective lens system having an entrance pupil located therein; and said objective lens system satisfying the following conditions (3) and (4):

$$1 \leq f_2/f \leq 10 \quad (3)$$

$$-4 \leq f_1/f \leq -0.1 \quad (4)$$

wherein said reference symbols $f_1$ and $f_2$ represent focal lengths of said front negative lens unit and said rear positive lens until respectively.

3. An endoscope according to claim 1, wherein said observation optical system comprises:
- an objective lens system for forming an image of an object; and
- relay lenses for relaying said image formed by said objective lens system a plurality of times;

said objective lens system being a retrofocus types telecentric optical system comprising:
- a front negative lens unit including a negative lens component and a negative lens component having an object side surface configured as an aspherical surface strengthening a positive refractive power toward a marginal portion thereof, and
- a rear positive lens unit including at least two lens components;

said rear positive lens unit having an object side surface configured as an aspherical surface weakening a positive refractive power toward a marginal portion thereof;

said objective lens system having an entrance pupil located therein; and said objective lens system satisfying the following conditions (3) through (6):

$$1 \leq f_2/f \leq 10 \quad (3)$$

$$-4 \leq f_1/f \leq -0.1 \quad (4)$$

$$0.2 \leq f_{12}/f_{11} \leq 1.2 \quad (5)$$

$$-0.5 \leq r_2/r_1 \leq 0.5 \quad (6)$$

wherein said reference symbols $f_1$ and $f_2$ represent focal lengths of said front negative lens unit and said rear positive lens unit respectively, said reference symbols $f_{11}$ and $f_{12}$ designate focal lengths of said negative lens components which are disposed on an object side and image side respectively in said front negative lens unit, and said reference symbols $r_1$ and $r_2$ denote radii of curvature on an object side surface and an image side surface of said negative lens component disposed on said object side in said front negative lens unit.

4. An observation optical system for endoscopes comprising:
- an objective lens system for forming an image of an object; and
- relay lenses for relaying said image formed by said objective lens system a plurality of times;

said objective lens system being a retrofocus type telecentric optical system comprising:
- a front negative lens unit including a negative meniscus lens component having an object side surface configured as an aspherical surface strengthening a positive refractive power toward a marginal portion thereof, and
- a rear positive lens unit including at least two lens components including a cemented lens component;

said objective lens system having an entrance pupil located therein; and said objective lens system satisfying the following conditions (3) and (4), and additionally satisfying the following conditions (8) through (11) when said aspherical surface is approximated by formula (7) shown below:

$$1 \leq f_2/f \leq 10 \quad (3)$$

$$-4 \leq f_1/f \leq -0.1 \quad (4)$$

$$x = \frac{y^2/r}{1 + \sqrt{1 - p(y/r)^2}} + Ey^4 + Fy^6 + Gy^8 \quad (7)$$

$$P_f = 1 \quad (8)$$

$$E_f f^3 \leq 0 \quad (9)$$

$$|E_f f^3| > |F_f f^5| \quad (10)$$

$$0.005 \leq |\Delta_f/f| \leq 0.03 \quad (11)$$

wherein said reference symbols $f_1$ and $f_2$ represent focal lengths of said front negative lens unit and said rear positive lens unit respectively, said reference symbol f represents a focal length of said observation optical system, said reference symbols x and y designate coordinates values on a coordinates system on which an optical axis is taken as an x axis regarding a direction toward said image as positive, an intersection between said optical axis and said aspherical surface is taken as an origin, and a direction perpendicular to said optical axis is taken as a y axis, said reference symbol r denotes a radius of curvature of a reference sphere of said aspherical surface, said reference symbols E, F and G represent aspherical surface coefficients of fourth, sixth and eighth orders respectively, said reference symbol $\Delta_f$ represents a departure from a reference sphere as measured at a point at which an offaxial principal ray having a maximum image height intersects with said aspherical surface (departure between said reference sphere and said aspherical surface in said x direction), said reference symbol $P_f$ designates a conical coefficient of said aspherical surface used in said front negative lens unit, and said reference symbols $E_f$ and $F_f$ denote aspherical surface coefficients of fourth and sixth orders respectively of said aspherical surface used in said front negative lens unit.

5. An observation optical system for endoscope comprising:
- an objective lens system for forming an image of an object; and
- relay lenses for relaying said image formed by said objective lens system a plurality of times;

said objective lens system being a retrofocus type telecentric optical system comprising:
   a front negative lens unit including a negative lens component and a negative lens component having an object side surface configured as an aspherical surface strengthening a positive refractive power toward a marginal portion thereof, and
   a rear positive lens unit including at least two lens components;
   said rear positive lens unit having an image side convex surface configured as an aspherical surface weakening a positive refractive power toward a marginal portion thereof;
said objective lens system having an entrance pupil located therein; and
said objective lens system satisfying the following conditions (3) through (6), and additionally satisfying the following conditions (8) through (15) when said aspherical surfaces are approximated by formula (7) shown below:

$$1 \leq f_2/f \leq 10 \quad (3)$$

$$-4 \leq f_1/f \leq -0.1 \quad (4)$$

$$0.2 \leq f_{12}/f_{11} \leq 1.2 \quad (5)$$

$$-0.5 \leq r_2/r_1 \leq 0.5 \quad (6)$$

$$x = \frac{y^2/r}{1 + \sqrt{1 - p(y/r)^2}} + Ey^4 + Fy^6 + Gy^8 \quad (7)$$

$$P_f = 1 \quad (8)$$

$$E_f f^3 \leq 0 \quad (9)$$

$$|E \cdot f \cdot f^3| > F_f f^5| \quad (10)$$

$$0.005 \leq |\Delta_f/f| \leq 0.03 \quad (11)$$

$$-2 \leq P_f \leq 0.1 \quad (12)$$

$$0.003 \leq |\Delta_r/f| \leq 0.03 \quad (13)$$

$$|E_r f^3| \leq 0.1, \ |F_r f^5| \leq 0.1 \quad (14)$$

$$0.5 \leq \Delta_r/\Delta_f \leq 2 \quad (15)$$

wherein said reference symbols $f_1$ and $f_2$ represent focal lengths of said front negative lens unit and said rear positive lens unit respectively, said reference symbol f represents a focal length of said observation optical system, said reference symbols $f_{11}$ and $f_{12}$ designate focal lengths of said negative lens components which are disposed on said object side and image side respectively in said front negative lens unit, said reference symbols $r_1$ and $r_2$ denote radii of curvature on an object side surface and an image side surface respectively of said negative lens component disposed on said object side in said front negative lens unit, said reference symbols x and y represent coordinate values on a coordinates system on which an optical axis is taken as an x axis regarding a direction toward said image as positive, an intersection between said optical axis and said aspherical surface is taken as an origin and a straight line passing through an origin and perpendicular to said optical axis is taken as a Y axis, said reference symbol r denotes a radius of curvature of a reference sphere of said aspherical surface, said reference symbol P represents a conical coefficient, said reference symbols E, F and G designate aspherical surface coefficients of fourth, sixth and eighth orders respectively, said reference symbol $\Delta_f$ represents a departure from a reference sphere as measured at a point at which a principal ray having a maximum image height intersects with said aspherical surface used in said front negative lens unit (departure between said reference sphere and said aspherical surface as measured in said x direction), said reference symbol $A_r$ represents a departure from said reference sphere of said aspherical surface at a point at which an offaxial principal ray having a maximum image height intersects with a aspherical surface used in a rear converging lens unit, said reference symbols $P_f$ and $P_r$ designate conical coefficients of said aspherical surface disposed in said front negative lens unit and said rear positive lens unit respectively, and said reference symbols $E_f$, $F_f$, $E_r$ and $F_r$ denote aspherical surface coefficients of fourth and sixth orders of said front negative lens unit and said rear positive lens unit respectively.

6. An endoscope according to any one of claims 3 or 5, wherein said rear positive lens unit comprises, in order from the object side:
   a positive lens component; and
   a triplet lens component consisting of:
      a positive lens element,
      a negative lens element, and
      a positive lens element; and
   said triplet lens component has an image side surface configured as an aspherical surface.

7. An endoscope according to any one of claims 3, 4, or 5, wherein a lens component disposed on said object side in said front negative lens unit is made of a crystalline material containing $Al_2O_3$ as a main component.

8. An observation optical system for non-flexible endoscopes comprising, in order from the object side:
   an objective lens system for forming an image of an object; and
   relay lenses for relaying said image formed by said objective lens system a plurality of times;
   said objective lens system comprising, in order from the object side:
      a front negative lens unit comprising at least two negative lens components having concave surfaces on an image side, a lens component disposed on a most objective side in said front negative lens unit being made of a crystalline material containing $Al_2O_3$, and
      a rear positive lens unit comprising at least two positive lens components.

9. An observation optical system for non-flexible endoscopes comprising, in order from the object side:
   an objective lens system for forming an image of an object; and
   relay lenses for relaying said image formed by said objective lens system;
   said objective lens system comprising, in order from the object side:
      a front negative lens unit comprising at least two negative lens components having concave surfaces on an image side, and
      a rear positive lens unit comprising at least two positive lens components; and
   said optical system satisfying the following condition:

$$-0.5 \leq r_2/r_1 \leq 0.5$$

wherein said reference symbols $r_1$ and $r_2$ represent radii of curvature on an object side surface and an image side surface of a negative lens component disposed on said object side of said objective lens system.

10. An observation optical system for non-flexible endoscopes comprising, in order from the object side:
   an objective lens system for forming an image of an object; and
   relay lenses for relating said image formed by said objective lens system;
   said objective lens system comprising, in order from the object side:
      a front negative lens unit comprising at least two negative lens components having concave surfaces on an image side, and
      a rear positive lens unit comprising at least two positive lens components; and
   said optical system satisfying the following condition:

$$1 \leq f_{11}/f_{12} \leq$$

wherein said reference symbols $f_{11}$ and $f_{12}$ represent focal lengths of a negative lens component disposed on an object side in said front negative lens unit and a negative lens component adjacent to said negative lens component.

11. An observation optical system for non-flexible endoscopes comprising, in order from the object side:
   an objective lens system for forming an image of an object; and
   relay lenses for releasing said image formed by said objective lens system;
   said objective lens system comprising in order from the object side:
      a front negative lens unit comprising at least two negative lens components having concave surfaces on an image side, and
      a rear positive lens unit comprising at least two positive lens components; and
   said optical system satisfying the following conditions:

$$0.5 \leq |f_1/f| \leq 0.8$$

$$2 \leq f_2/f \leq 4.5$$

wherein said reference symbols $f_1$ and $f_2$ represent focal lengths of said front negative lens unit and said rear positive lens unit respectively, and a focal length of said observation optical system.

12. An observation optical system for non-flexible endoscopes comprising, in order from the object side:
   an objective lens system for forming an image of an object; and
   relay lenses for relaying said image formed by said objective lens system;
   said objective lens system comprising, in order from the object side:
      a front negative lens unit comprising at least two negative lens components having concave surfaces on an image side, and
      a rear positive lens unit comprising at least two positive lens components; and
   said optical system satisfying the following condition:

$$h_1/I_{max} \leq 1.2$$

wherein said reference symbol $h_1$ represents a maximum height of a ray on a first surface of said front negative lens unit and said reference symbol $I_{max}$ designates a maximum image height of said objective lens system.

13. A non-flexible endoscope comprising:
   an elongated insertable portion including a light guide and a hollow tube with an opening at a distal end of said insertable portion;
   a lens holding member disposed inside of said hollow tube; and
   an objective lens system comprising a plurality of lens components, a first lens component disposed at an objective side in said objective lens system being fixed to said opening of said hollow tube, and other lens components of said objective lens system being fixed to said lens holding member;
   said first lens component being positioned to be separated from said other lens components with a predetermined distance.

14. An observation optical system for non-flexible endoscopes comprising, in order from the object side:
   an objective lens system for forming an image of an object; and
   relay lenses for relaying said image formed by said objective lens system;
   said objective lens system comprising, in order from the object side:
      a front negative lens unit comprising at least two negative lens components having concave surfaces on an image side, a lens component disposed on a most object side in said front negative lens unit being made of a crystalline material containing $Al_2O_3$ as a main component, and
      a rear positive lens unit comprising a positive lens component.

* * * * *